United States Patent [19]
Hamada et al.

[11] Patent Number: 6,061,525
[45] Date of Patent: May 9, 2000

[54] CAMERA AND FOCUSSING METHOD FOR THE SAME

[75] Inventors: Hisashi Hamada; Nobuhiro Aoki; Shigenori Goto; Katsuhiko Yamamoto; Tokuji Sato, all of Saitama, Japan

[73] Assignees: Fuji Photo Optical Co., Ltd., Saitama; Fuji Photo Film Co., Ltd., Kanagawa, both of Japan

[21] Appl. No.: 08/992,579

[22] Filed: Dec. 17, 1997

[30] Foreign Application Priority Data

| Dec. 17, 1996 | [JP] | Japan | 8-336731 |
| Dec. 17, 1996 | [JP] | Japan | 8-336732 |
| Dec. 17, 1996 | [JP] | Japan | 8-337355 |
| Aug. 18, 1997 | [JP] | Japan | 9-221286 |

[51] Int. Cl.[7] ............ G03B 13/36; G03B 17/00; G03B 17/04
[52] U.S. Cl. ............ 396/89; 396/210; 396/349; 396/442
[58] Field of Search ............ 396/89, 210, 349, 396/440, 441, 442, 446

[56] References Cited

U.S. PATENT DOCUMENTS 3,563,144  2/1971  Fukino .................. 396/442
5,845,869  12/1998 Makino .................. 242/584.1

FOREIGN PATENT DOCUMENTS 6-289457  10/1994  Japan.

Primary Examiner—W. B. Perkey
Attorney, Agent, or Firm—Young & Thompson

[57] ABSTRACT

A Brownie camera is loadable with a 120- and 220-type roll photo film. The 120 type includes light-shielding backing paper overlaid on the entirety of the photo filmstrip, unlike the 220 type. An exposure aperture is formed in a camera body, and disposed between a photo film supply chamber and a photo film take-up chamber, for exposing the roll photo film. A pair of rails are disposed along respective two edges of the exposure aperture extending horizontally, and contact sides of an emulsion surface of the roll photo film. A pressure plate contacts a back of the roll photo film to position the roll photo film on a rear of the exposure aperture, and is disposed behind the exposure aperture to define a photo film passageway between the pressure plate and the rails. An external selector wheel is disposed outside the camera body, for selecting one of the 120 and 220 types. A mechanism for moving the pressure plate is actuated by a shift of the selector wheel, for moving the pressure plate toward or away from the rails. The passageway is set at a wide space size when the 120 type is selected, and at a narrower space size when the 220 type is selected.

35 Claims, 35 Drawing Sheets

F I G. 1
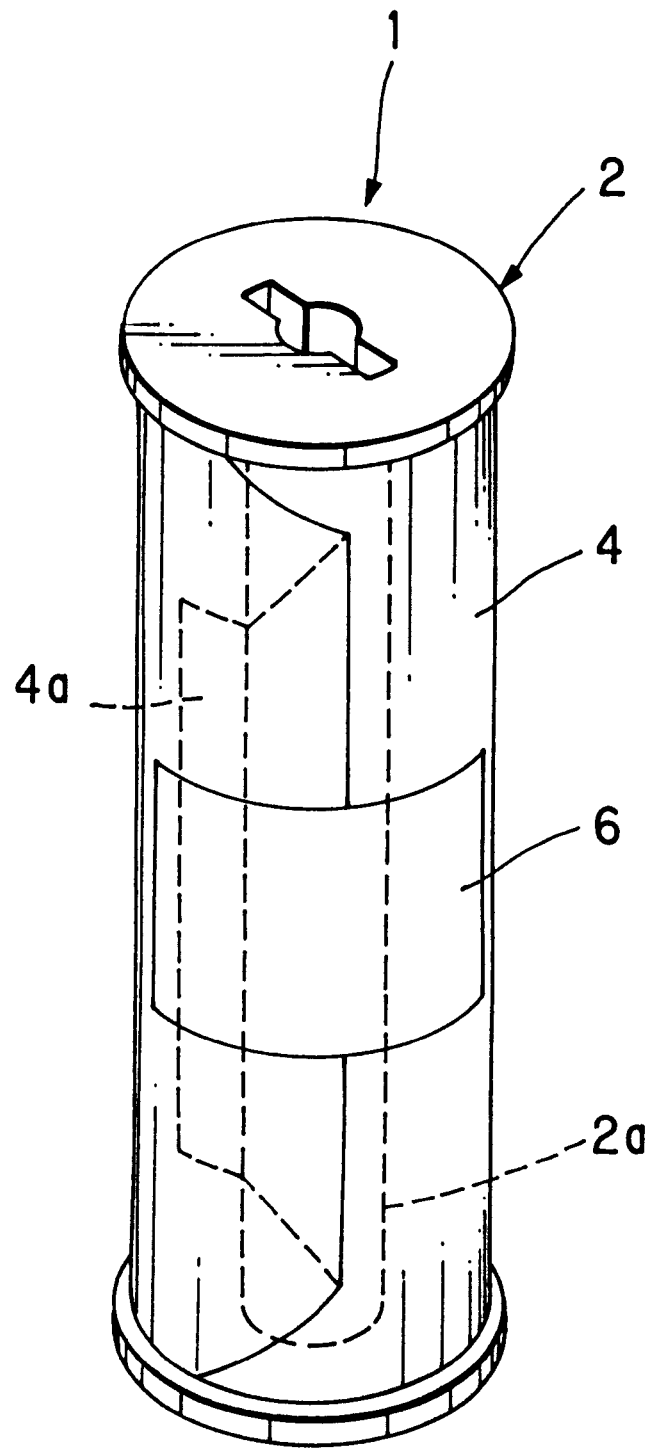

CAMERA AND FOCUSSING METHOD FOR THE SAME

BACKGROUND OF THE INVENTION

1. Field of the Invention

The present invention relates to a camera and a focussing method for the same. More particularly, the present invention relates to a camera which is adapted to plural types of photo films having different thickness and in which an object to be photographed can be focussed precisely and easily, and a focussing method for the same.

2. Description Related to the Prior Art

A roll photo film of a Brownie size is not associated with any cassette or cartridge, but has light-shielding backing paper, which is wound about a roll of photo filmstrip in a form of a commercially sold product. There are two types, 120 and 220. Those are equally wide. The 120-type roll photo film includes the backing paper longer than a photo filmstrip. The backing paper is constituted by three portions that is a leader portion, a backing portion and a trailer portion. The photo filmstrip is exactly overlaid on the backing portion, and located between the leader portion and the trailer portion. The 220-type roll photo film has leader paper and trailer paper, which are respectively secured to a front end and a rear end of the photo filmstrip.

There are plural types of photo film gates used in a camera, including a pressure type and a tunnel type. The pressure type has a pressure plate, which presses the photo film against photo film rails. The pressure type has a feature in that an emulsion surface of the photo filmstrip is not very flat due to a curling tendency of the photo film to curl in a direction rendering its back surface convex. In the tunnel type, a space size or thickness of a photo film passageway or channel defined between the pressure plate and the photo film rails is determined greater than the thickness of the photo film, so that play is created in which the photo film can be slightly shifted. This makes it possible to keep flat an emulsion surface of the photo filmstrip.

In the camera incorporating the tunnel type of photo film gate, a proper in-focus position is expectedly located in a position slightly deviated backwards behind faces of the photo film rails, nearer to the photo film.

In relation to the Brownie photo film, the 120-type photo film is thicker than the 220-type photo film by a difference as much as the thickness of the backing paper. It is necessary in the camera to change over a space size of the photo film passageway between the 120- and 220-type photo films, for the purpose of setting an emulsion surface of the photo filmstrip at a properly in-focus position.

To change over the space size of the photo film passageway, various mechanisms are known. In a camera known as New Mamiya 6 (trade name, manufactured by Mamiya P Co., Ltd.), the pressure plate inside a back lid is rotated by 90 degrees after the back lid is opened. This rotation causes the pressure plate to move back and forwards. When the pressure plate is set in a position for the 220-type photo film, the pressure plate comes in contact with plate contact rails. When the pressure plate is set in a position for the 120-type photo film, the pressure plate comes slightly away from the plate contact rails. In a camera known as Fuji GSW 680 III Professional (trade name, manufactured by Fuji Photo Film Co., Ltd.), the pressure plate is removed from the back lid after the back lid is initially opened. The pressure plate is turned over back to front, and mounted again on the back lid so as to change over the photo film passageway in the same way. In a camera known as Fuji Film GA 645 Professional (trade name, manufactured by Fuji Photo Film Co., Ltd.), the pressure plate is manually pushed toward the back lid and slid in the photo film transport direction while the back lid is opened. The photo film passageway is changed similarly.

In the camera for Brownie photo films according to the prior art, the back lid must be opened to operate the pressure plate directly before the photo film passageway can be changed over. If a user becomes aware that the pressure plate is positioned differently from what he or she intends after loading of the photo film and closing of the back lid, it is impossible to reset the position of the pressure plate properly. If the pressure plate is positioned differently from the way suitable to the photo film being loaded, there occur serious problems. An image cannot be focussed sharply. The photo film is likely to be scratched.

The 220-type photo film has the greater number of available frames than the 120-type photo film. When the pressure plate is positioned for the 220-type photo film, a frame counter of the camera is also changed over to have a wider counting range. If the pressure plate is positioned erroneously in the camera with this structure, there occurs problems in that photographing operation may be stopped before using up all the available frames, or that the entirety of the photo film cannot be wound up in a final step after taking exposures.

SUMMARY OF THE INVENTION

In view of the foregoing problems, an object of the present invention is to provide a camera which is adapted to plural types of photo films having different thickness and in which an object to be photographed can be focussed precisely and easily on any of those photo films, and a focussing method for the same.

In order to achieve the above and other objects and advantages of this invention, a camera is loadable with a roll photo film of a paper-backed type and a non-paper-backed type, the paper-backed type including a photo filmstrip, and light-shielding backing paper overlaid on the photo filmstrip, and having a leader portion protruded from a front end of the photo filmstrip and a trailer portion protruded from a rear end of the photo filmstrip, the paper-backed type being wound about a spool with the trailer portion wound inwards, and the non-paper-backed type including a photo filmstrip, a light-shielding leader portion connected to a front end of the photo filmstrip, and a light-shielding trailer portion connected to a rear end of the photo filmstrip, the non-paper-backed type being wound about a spool with the trailer portion wound inwards. There is a camera body, having a photo film supply chamber and a photo film take-up chamber, the photo film supply chamber being loaded with the roll photo film, the photo film take-up chamber adapted to winding of the roll photo film after being exposed. An exposure aperture is disposed between the photo film supply chamber and the photo film take-up chamber, for exposing the roll photo film. A pair of rails are disposed along respective two edges of the exposure aperture extending substantially horizontally, for contacting sides of an emulsion surface of the roll photo film. A pressure plate contacts a back of the roll photo film to position the roll photo film on a rear of the exposure aperture, the pressure plate being disposed behind the exposure aperture to define a photo film passageway between the pressure plate and the rails. An external selector is disposed on an outside of the camera body, for selecting one of the paper-backed type and the non-paper-backed type. Moving means is actuated by a shift of the external selector, for moving at least one of the pressure plate and a set of the rails toward or away from a remaining one of the pressure plate and the set of the rails, wherein the moving means sets the photo film passageway at a first space size when the paper-backed type is selected, and sets the photo film passageway at a second space size when the non-paper-backed type is selected, the second space size being narrower than the first space size.

In a preferred embodiment, the roll photo film has type information prerecorded in a position between a front end of the leader portion and a first frame of the photo filmstrip to be set, for representing either of the paper-backed type and the non-paper-backed type. An information reader reads the type information from the roll photo film while the roll photo film is transported. Moving means moves at least one of the pressure plate and a set of the rails toward or away from a remaining one of the pressure plate and the set of the rails. A controller controls the moving means in accordance with the type information read by the information reader, wherein the photo film passageway is set at a first space size when with the paper-backed type, and is set at a second space size when with the non-paper-backed type, the second space size being narrower than the first space size.

In still another preferred embodiment, a camera is loadable with plural types of photo film, the plural types of photo film having at least first and second thicknesses. The camera includes a lens optical system for forming an image of an object on the roll photo film. A focussing mechanism moves the lens optical system at least partially, to focus the lens optical system on the object. An input unit inputs information representing one of the plural types of photo film being loaded. A controller controls the focussing mechanism in accordance with a signal from the input unit, to set the lens optical system in a first or second set position respectively in accordance with the first or second thickness, so as to sharpen the image of the object on the photo film of any of the plural types.

BRIEF DESCRIPTION OF THE DRAWINGS

The above objects and advantages of the present invention will become more apparent from the following detailed description when read in connection with the accompanying drawings, in which:

FIG. 1 is a perspective illustrating a roll photo film;

DETAILED DESCRIPTION OF THE PREFERRED EMBODIMENTS OF THE PRESENT INVENTION

Figure 2:
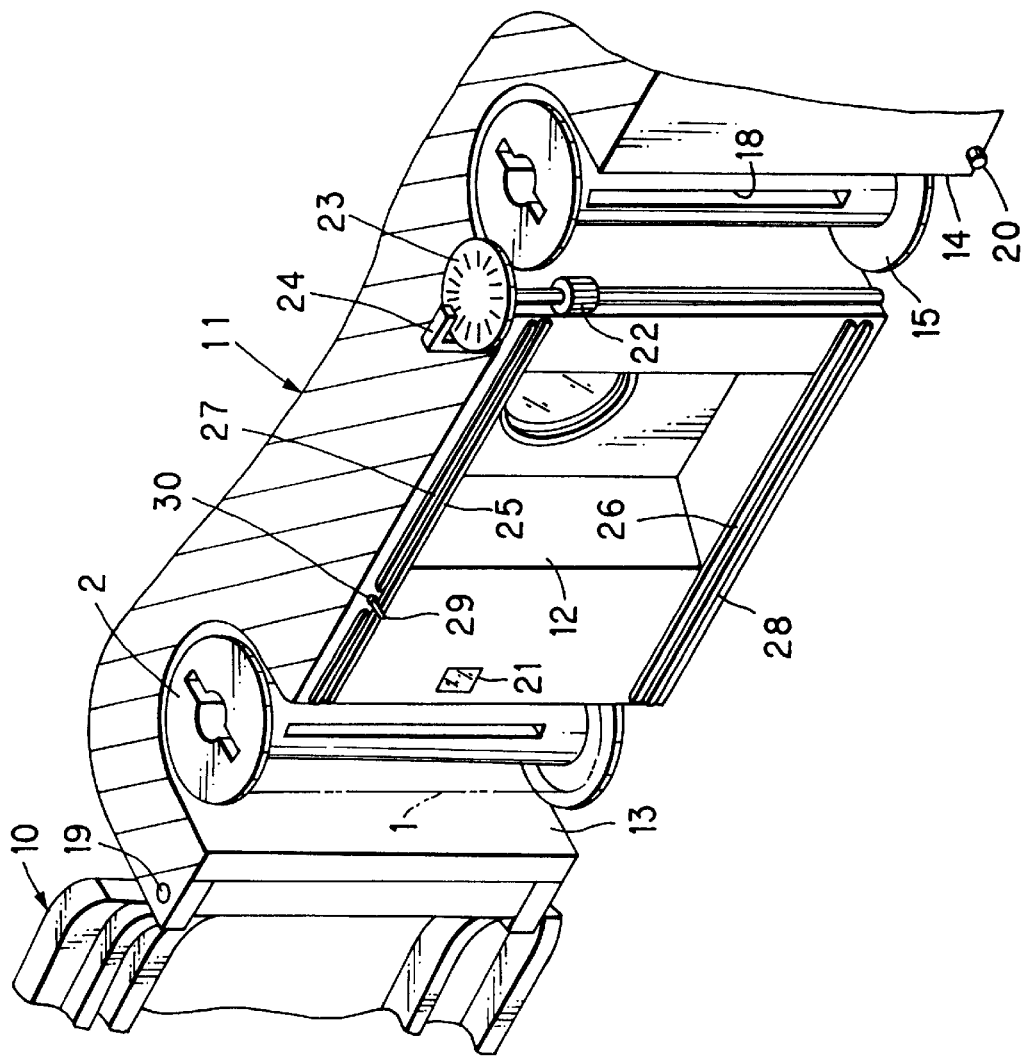
FIG. 2 is a perspective, partially broken, illustrating a rear of a camera body of a Brownie.

In FIG. 1, a Brownie photo film or roll photo film 1 of the 120 or 220 type includes a spool 2, a photo filmstrip and a leader portion or leader sheet 4. The photo filmstrip is wound about a spool core 2a of the spool 2 in a roll form. The leader sheet 4 is wound about the roll form of the photo filmstrip to shield the photo filmstrip from ambient light. A leader end 4a of the leader sheet 4 is folded inside, and attached by an adhesive closing tape 6 to form the roll photo film.

In FIG. 2, a Brownie camera is depicted. An exposure aperture 12 is located between a photo film supply chamber 13 and a photo film take-up chamber 14. A take-up spool 15 is preinserted in the photo film take-up chamber 14. The roll photo film 1, after the closing tape 6 is removed from it, is loaded into the photo film supply chamber 13 in a state with the photo filmstrip wound on the spool 2.

After the camera is loaded with the roll photo film, the leader end 4a of the leader is inserted in a groove 18 in the take-up spool 15. When a winding pushbutton (not shown) is depressed, the take-up spool 15 is rotated in the winding direction to wind the leader sheet 4 about the take-up spool 15 at an amount of two or three turns. Then a back lid 10 is closed by rotation about hinges 19. A closed state of the back lid 10 is detected, in response to which the photo film is transported automatically. When the back lid 10 stands closed, the exposure aperture 12 between the photo film supply chamber 13 and the photo film take-up chamber 14 is entirely covered by the back lid 10. The closed state is detected by contact of the back lid 10 with a lid switch 20, which is disposed on the rear of a camera body 11.

A photo reflector, or photo sensor, is disposed in a position inside a transparent window 21, which is disposed between the exposure aperture 12 and the photo film supply chamber 13. The photo reflector detects a tape between the leader sheet and the photo filmstrip by reading a difference in the reflection factor between them. After the detection, the number of pulses is counted to set a first frame on the exposure aperture 12. To count the pulses, there are a counter roller 22, a disk or impeller 23 and a photo interrupter 24. The counter roller 22 is disposed between the exposure aperture 12 and the photo film take-up chamber 14, and is rotated by transport of the photo film. The disk 23 is coupled with a top of the counter roller 22, and has a number of radially arranged slits. The photo interrupter 24 detects passage of the slits to count the pulses. Also this pulse counting is utilized for the one-frame advancement of the photo film.

There are photo film rails 25 and 26 extending in parallel with horizontal sides of the exposure aperture 12. The photo film rails 25 and 26 project toward the back lid 10 to a small extent, and has a small width in the width direction of the photo film. Projecting faces of the photo film rails 25 and 26 are photo film run faces which are contacted by edge portions defined outside an effective exposure region and on an emulsion surface of the photo film. There are plate contact projections 27 and 28 by way of pressure plate receiver faces, which extend in parallel with the photo film rails 25 and 26. Projecting faces of the plate contact projections 27 and 28 project beyond the faces of the photo film rails 25 and 26 toward the back lid 10 to a small extent. An interval between the plate contact projections 27 and 28 is equal to or slightly greater than a width of the photo film. A difference between levels of the projecting faces of the photo film rails 25 and 26 and those of the plate contact projections 27 and 28 constitutes a "photo film channel" as a term in the field of camera, and is defined suitably for the photo film with a smaller thickness, that is the 220-type photo film. Also the plate contact projections 27 and 28 operate in contact with lateral edges of the photo film, prevents the photo film from being deviated vertically.

The plate contact projection 27 located on the upper side is split in two portions at any suitable position, at which a switch segment 29 is located to project for detection of changeover positions of the pressure plate. When the switch segment 29 is depressed, a switch 30 is turned on to signal the information that the photo film passageway has the space size for the 120-type photo film. When the switch segment 29 is left without being depressed, the switch 30 is turned off to signal the information that the photo film passageway has the space size for the 220-type photo film. The information is sent to a controller (not shown) in the camera body 11, and used in control for the frame counting, changeover operation of one-frame advance of the photo film.

Figure 3:
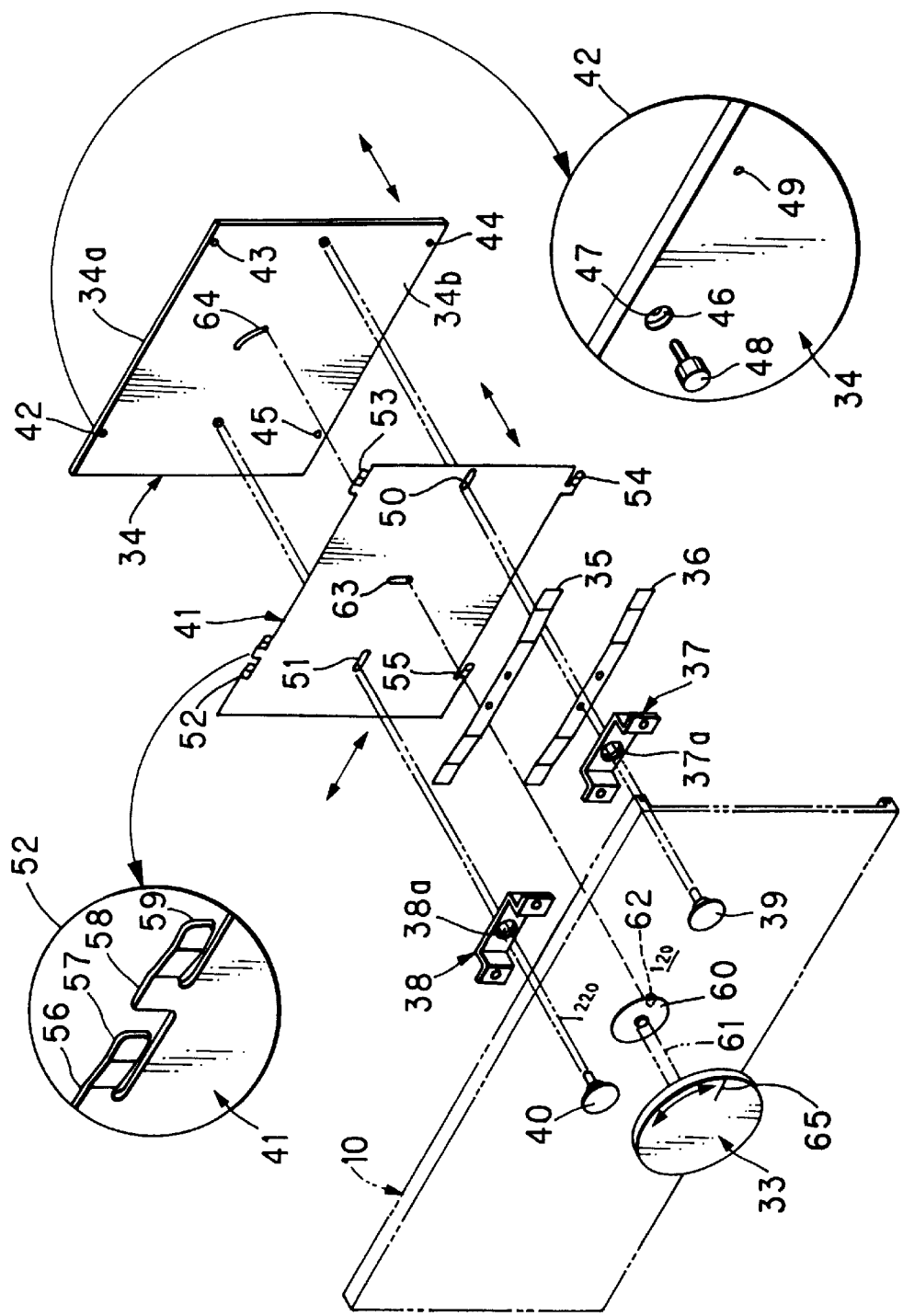
FIG. 3 is an exploded perspective illustrating a moving mechanism for moving a pressure plate.

In FIG. 3, an external selector and a pressure plate moving mechanism in combination are constituted by a selector wheel 33, a pressure plate 34, pressure plate springs 35 and 36, a pair of support plates 37 and 38, a pair of support pins 39 and 40, a changeover slider plate 41 and the like. Those are disposed on the back lid 10. The pressure plate 34 lies to form a photo film passageway. The selector wheel 33 is located on the outside of the back lid 10, and externally shifted in accordance with one of the two thicknesses of the photo film.

The support pins 39 and 40 are secured to a rear surface 34b of the pressure plate 34 by use of screws. The support plates 37 and 38 are secured to the back lid 10, and are respectively shaped in a letter Ω (omega), or a channel, as viewed in section. The support pins 39 and 40 are inserted in respective support openings 37a and 38a in the support plates 37 and 38, so that the pressure plate 34 is supported on the back lid 10 in a manner movable in a direction of a photographic optical axis, which is vertical to the photo film transport direction. The support pins 39 and 40 have respective heads of which a diameter is greater than that of the support openings 37a and 38a, and are prevented by them from dropping away from the support plates 37 and 38. Thus the pressure plate 34 is movable between front and rear positions, and when moved in the front position by closing the back lid 10, comes in contact with the plate contact projections 27 and 28, and when moved in the rear position, comes closer to the back lid 10. The pressure plate 34 has a front surface 34a by which the plate contact projections 27 and 28 are contacted.

There are four positions 42–45 which correspond to four corners of the rear surface 34b of the pressure plate 34 confronted with the back lid 10. The position 42 among them is depicted in enlargement. Each of the positions 42–45 has a retracted surface 46, a through hole 47 and one of push pins 48. The through hole 47 opens in the retracted surface 46. The push pins 48 are respectively inserted in the through hole 47 by movement forward through the retracted surface 46. The retracted surface 46 has such a depth that heads of the push pins 48 are partially contained in its space. When the heads of the push pins 48 are pushed forwards to contact the retracted surface 46, the front tips of the push pins 48 move through the through hole 47, exit from the front surface 34a, and contact the plate contact projections 27 and 28. The pressure plate 34 has a through opening 49 formed in a position associated with the switch segment 29 protruding from the camera body 11. When the back lid 10 is closed, the through opening 49 allows the switch segment 29 to project toward the rear surface 34b of the pressure plate 34 directed to the back lid 10.

There are holes 50 and 51 formed in the changeover slider plate 41, disposed behind the pressure plate 34, for receiving insertion of the support pins 39 and 40. The holes 50 and 51 are long to extend in the photo film transport direction. The changeover slider plate 41 is both slidable and movable back and forward, or slidable in the photo film transport direction between the pressure plate 34 and the support plates 37 and 38, and movable toward and away from the back lid 10.

There are four positions 52–55 which correspond to the push pins 48 and are defined on the changeover slider plate 41. Each of the positions 52–55 has a push surface 56 and a retracted surface 57. The position 52 among them is depicted in enlargement. The push surface 56 pushes each head of the push pins 48. The retracted surface 57 allows the push pins 48 to retreat in the backward direction toward the back lid 10. Each combination of the push surface 56 and the retracted surface 57 has an inclined portion at which the changeover slider plate 41 are bent with obtuse angles. The pressure plate springs 35 and 36 bias the changeover slider plate 41 toward the pressure plate 34 in a symmetrically balanced manner.

The changeover slider plate 41 includes a push surface 58 and a retracted surface 59 with forms of bends, and in positions associated with the switch segment 29. The push surface 58 depresses the switch segment 29 when slid. The retracted surface 59 leaves the switch segment 29 without depression when confronted with the switch segment 29.

The selector wheel 33 has a rotational shaft 61 and a small disk 60. The rotational shaft 61 is supported on the back lid 10 in a rotatably manner. The small disk 60 is connected by the rotational shaft 61 to a wheel portion of the selector wheel 33, and keeps the selector wheel 33 from dropping away from the back lid 10. A connector pin 62 protrudes from a front surface of the small disk 60 in an eccentric position from the rotational shaft 61. A vertical opening 63 is formed in the changeover slider plate 41, and receives the connector pin 62, which moves the changeover slider plate 41 in the photo film transport direction in response to rotation of the selector wheel 33. In the present embodiment, the pressure plate 34 moves in the direction perpendicular to the transport direction. There is a recess 64 formed in the pressure plate 34 to allow a tip of the connector pin 62 to move rotationally.

A mark line 65 is printed, formed, or by any means prerecorded on the outside of the selector wheel 33. On the outside of the back lid 10, signs of "120" and "220" are printed, formed, or prerecorded to indicate the 120- and the 220-type photo films. To set one of the two types, the selector wheel 33 is rotated to direct the mark line 65 at either of the signs "120" and "220" on the back lid 10.

Figure 4:
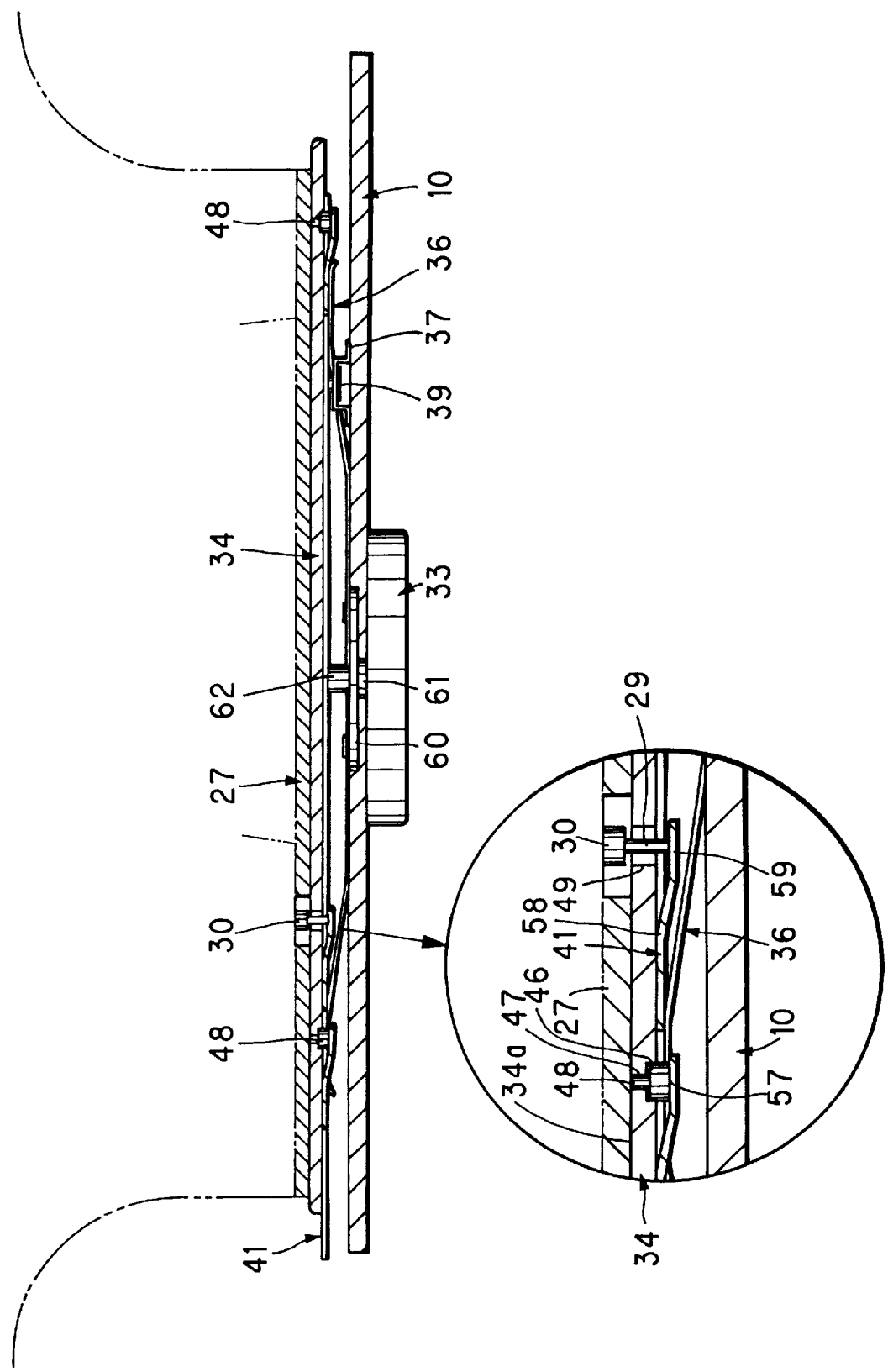
FIG. 4 is a horizontal section, partially in enlargement, illustrating a state where the moving mechanism sets the pressure plate with a space size for the 220-type roll photo film.
Figure 5:
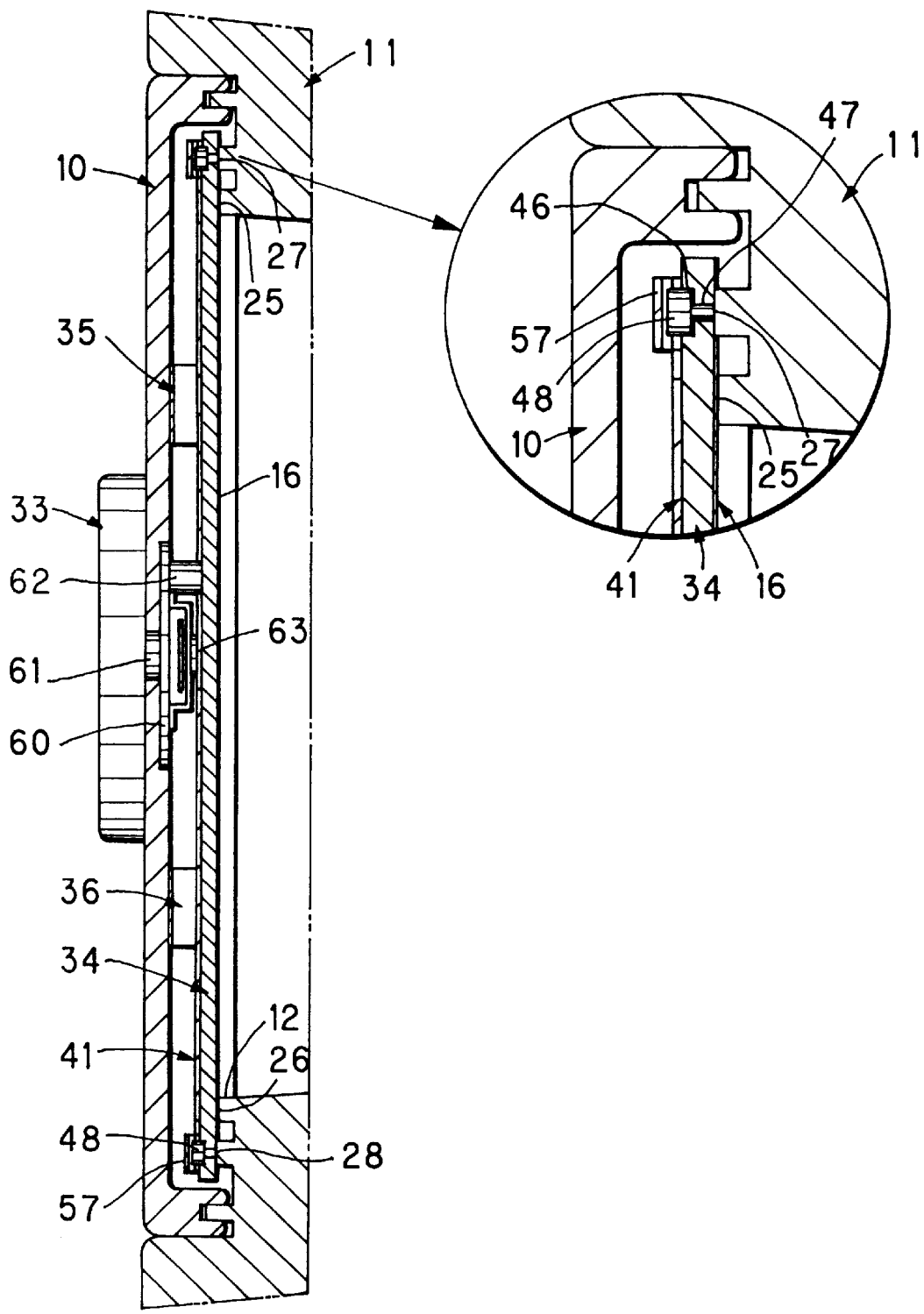
FIG. 5 is a cross section, partially in enlargement, illustrating the state of FIG. 4.

When the mark line 65 is set at the sign "220", the retracted surface 57 of the changeover slider plate 41 is horizontally slid to a position confronted with each head of the push pins 48 as illustrated in FIGS. 4 and 5. The push pins 48 are released from being depressed, and become free.

The bias of the pressure plate springs 35 and 36 pushes the changeover slider plate 41, and presses the front surface 34a of the pressure plate 34 against the plate contact projections 27 and 28. The photo film passageway is defined between the photo film rails 25 and 26 and the plate contact projections 27 and 28. The front surface 34a of the pressure plate 34 is in a position such as to keep an emulsion surface of the 220-type photo film in an in-focus position, which is a focal plane of the taking lens. Note that, in FIG. 5, the 120-type photo film 16 is illustrated as a non-paper-backed type.

The switch segment 29, which protrudes through the through opening 49 toward the back lid 10, is confronted with the retracted surface 59 of the changeover slider plate 41, and remains without being depressed. The switch 30 remains turned off, so that the controller of the camera is electrically informed of the state where the photo film passageway has the space size of the 220-type photo film.

Figure 6:
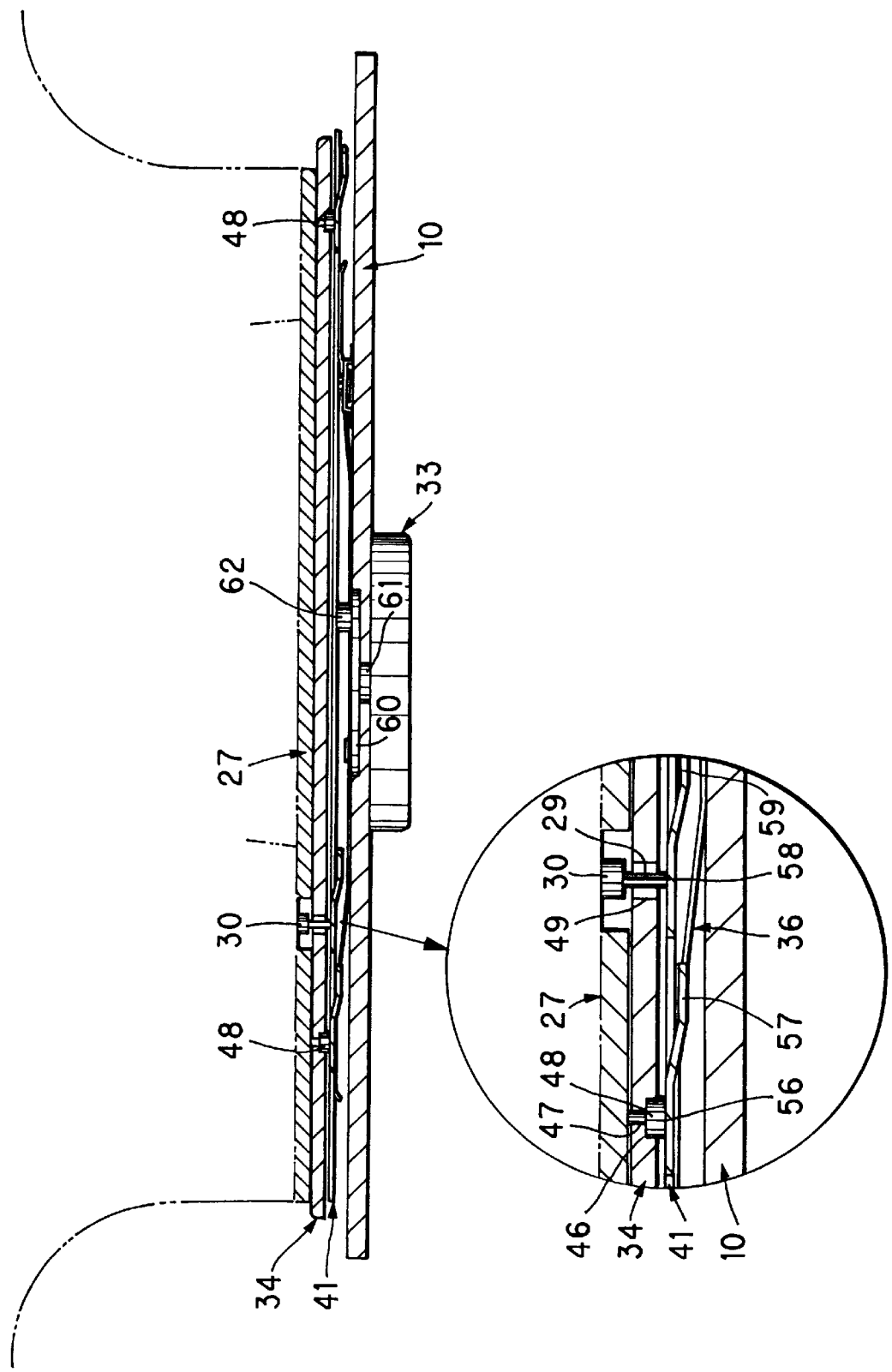
FIG. 6 is a horizontal section, partially in enlargement, illustrating a state where the moving mechanism sets the pressure plate with a space size for the 120-type roll photo film.
Figure 7:
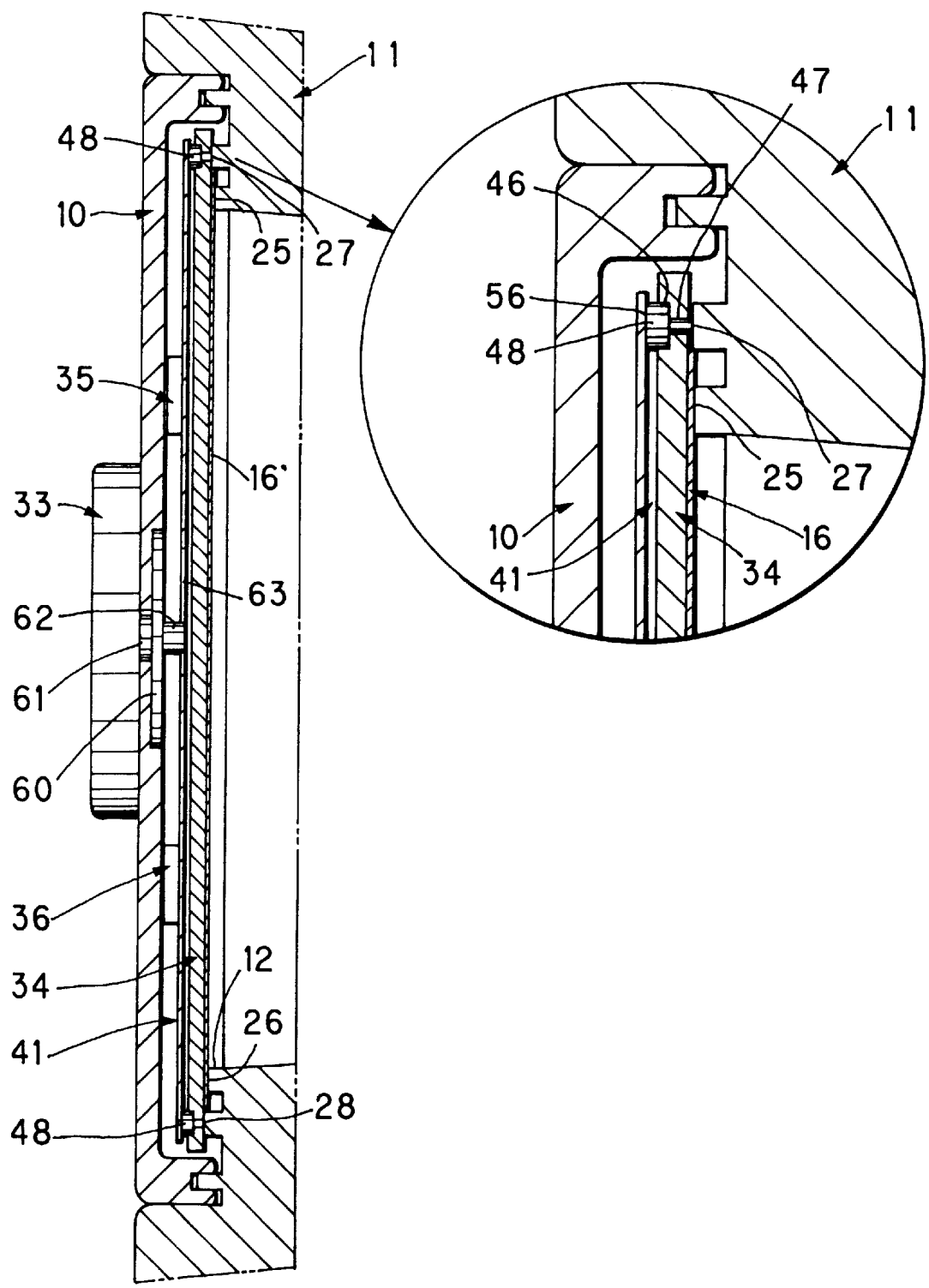
FIG. 7 is a cross section, partially in enlargement, illustrating the state of FIG. 6.

When the mark line 65 is set at the sign "120", the push surface 56 of the changeover slider plate 41 is horizontally slid to a position confronted with each head of the push pins 48 as illustrated in FIGS. 6 and 7. As the changeover slider plate 41 is biased toward the pressure plate 34 by the pressure plate springs 35 and 36, the push surface 56 pushes the push pins 48 toward the retracted surface 46. When the push pins 48 are pushed forwards, the front tips of the push pins 48 move through the through hole 47, exit from the front surface 34a, and contact the plate contact projections 27 and 28. The changeover slider plate 41 contacts heads of the push pins 48, so that the bias of the pressure plate springs 35 and 36 to the pressure plate 34 is intercepted. The pressure plate 34 is now movable in a range of play created between the retracted surface 46 and the heads of the push pins 48.

When the leader sheet of the 120-type roll photo film 16' as a paper-backed type has passed the photo film passageway in the course of the photo film transport, the photo filmstrip comes to it in a state backed by the backing paper. With the 120-type roll photo film 16' located in the photo film passageway, thickness and curling tendency of the 120-type roll photo film 16' curling in its width direction push the pressure plate 34 toward the back lid 10, and cause the retracted surface 46 to contact the heads of the push pins 48. The front surface 34a of the pressure plate 34 is in a position such as to keep an emulsion surface of the 120-type photo film in an in-focus position for the taking lens.

After the changeover slider plate 41 is moved, the switch segment 29 in the through opening 49 is confronted with the push surface 58 of the changeover slider plate 41. The push surface 58 depresses the switch segment 29. The switch 30 is turned on, so that the controller of the camera is electrically informed of the state where the photo film passageway has the space size of the 120-type photo film.

Note that a problem is likely to occur in that the photo film passageway has an excessive thickness when the 120 type is selected, and that longitudinal edges of the backing paper fail to be regulated by the plate contact projections 27 and 28. See FIG. 7. Thus it is preferable that the push pins 48 extending through the front surface 34a regulate longitudinal edges of the backing paper in the vertical direction. Moreover it is possible to dispose guide bosses in addition to the push pins 48, for the purpose of regulating longitudinal edges of the backing paper.

In the present embodiment, the pressure plate 34 is likely to be unstable if the selector wheel 33 should be changed over for the 120-type photo film without inserting any photo film. To overcome such a problem, it is preferable on the back lid 10 to use a plate spring with biasing force weaker than that of the pressure plate springs 35 and 36. This plate spring can bias the pressure plate 34 toward the back lid 10. It is possible with high reliability to shift the pressure plate 34 toward the back lid 10 when the pressure plate 34 is changed over for the 120-type photo film.

In the above embodiment, the four push pins 48 are used. But any number of plural push pins may be used. At least three push pins should be used for the purpose of keeping the pressure plate 34 in parallel with the photo film run faces. If such three push pins are used, one of them should be located near to either the top or the bottom of the exposure aperture 12, and the remaining two of them should be located near to the remaining one of the top and the bottom of the exposure aperture 12. In the above embodiment, the push pins 48 are slid back and forth by movement of the changeover slider plate 41 in the photo film transport direction. Alternatively a changeover slider plate may be slid up and down in a vertical direction for the purpose of sliding the push pins 48.

In the above embodiment, the photo film passageway adapted to the 120-type photo film depends upon an amount of advancing movement of the push pins 48 out of the front surface 34a of the pressure plate 34. Alternatively the photo film passageway adapted to the 120-type photo film may be positioned by use of two steps of pressure plate contact projections different in the projecting level.

Figure 8:
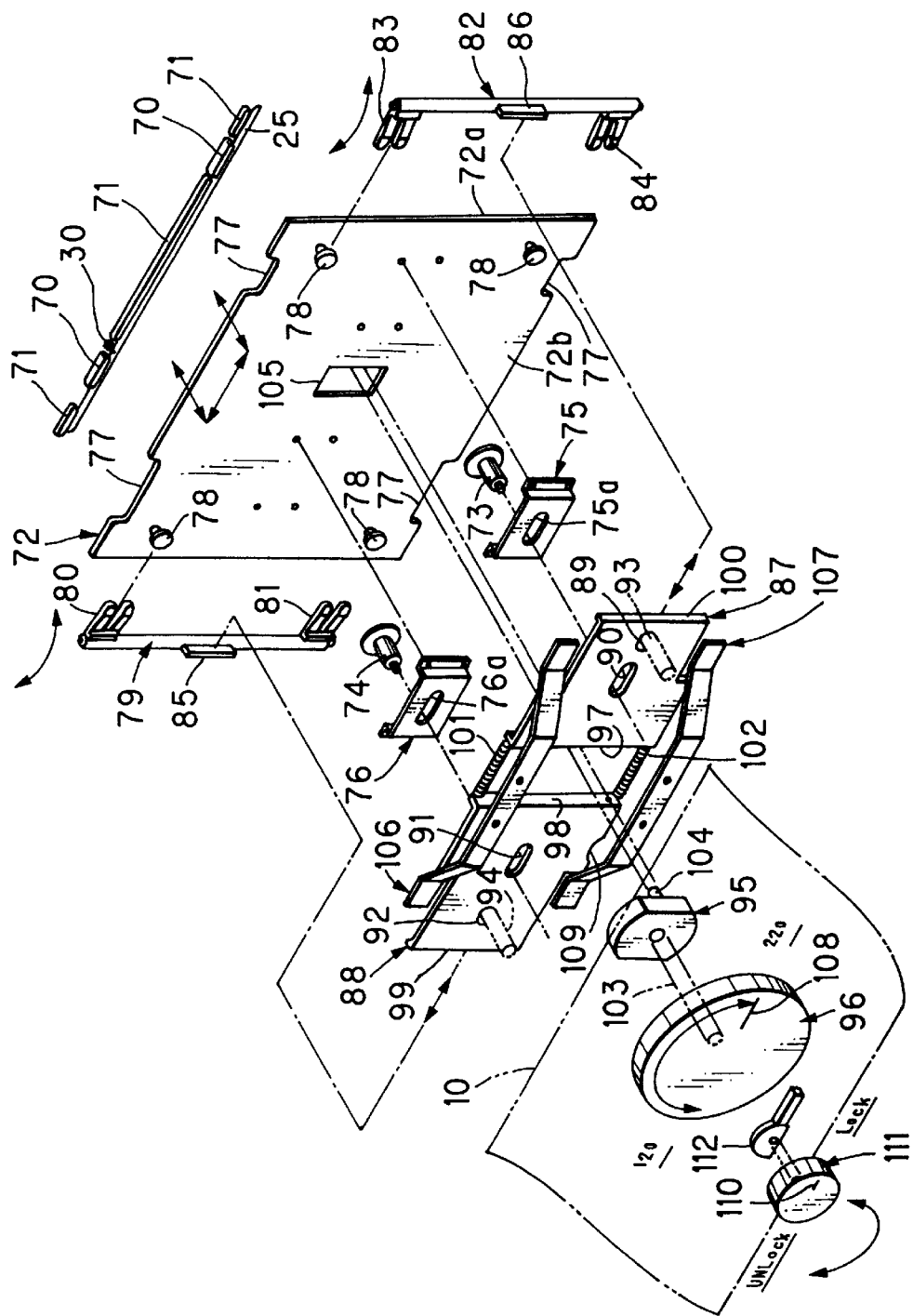
FIG. 8 is an exploded perspective illustrating another preferred mechanism for moving a pressure plate.

Another preferred camera is described, in which the photo film passageway is changed by sliding movement of the pressure plate. In FIG. 8, surfaces of a camera body for receiving a pressure plate include are constituted by first contact projections 71 and second contact projections 70. The first contact projections 71 are adapted to setting the photo film passageway for the 220-type photo film. The second contact projections 70 are adapted to setting the photo film passageway for the 120-type photo film. An upper group of projections included in the first and second contact projections 70 and 71 lies on a straight line which is above the photo film rail 25 and parallel with it. In this upper group, the second contact projections 70 are arranged in an alternate manner with the first contact projections 71. Similarly, a lower group of projections included in the first and second contact projections 70 and 71 lies on a straight line which is below the photo film rail 26 and parallel with it. In this lower group, the second contact projections 70 are arranged in an alternate manner with the first contact projections 71.

The second contact projections 70 protrude toward the back lid 10 beyond the level of the first contact projections 71. The first contact projections 71 protrude backwards slightly beyond the faces of the photo film rails 25 and 26. A pressure plate 72 is pressed against a selected one of the first and second contact projections 70 and 71 to change over the space size of the photo film passageway. In FIG. 7, only upper parts of the first and second contact projections 70 and 71 are depicted without lower parts of them, for the purpose of simple illustration in view of convenience in understanding.

A pair of guide pins 73 and 74 are secured to the rear of the back lid 10 by use of screws. Support plates 75 and 76 are secured to a rear surface 72b of the pressure plate 72 by use of screws, and are respectively shaped in a letter Ω (omega), or a channel, as viewed in section. The guide pins 73 and 74 are inserted in respective support openings 75a and 76a which are formed in the support plates 75 and 76 and have forms extending in the photo film transport direction. The guide pins 73 and 74 have respective heads of which a diameter is greater than that of the support openings 75a and 76a, and are prevented by them from dropping away from the support plates 75 and 76. Thus the pressure plate 72 is supported on the back lid 10 in a manner slidable in the photo film transport direction, and also movable in a direction of a photographic optical axis vertical to the transport direction.

The second contact projections 70 are located in four positions, which are symmetric horizontally about the optical axis. Note that the second contact projections 70 may be disposed on any plural number of positions. Of course it is desirable that those positions should be symmetric both horizontally and vertically so as to balance the pressure plate 72 without instability when the pressure plate 72 is pushed away from the back lid 10.

The pressure plate 72 has recesses 77 formed therein and located respectively to receive the second contact projections 70. The pressure plate 72 is slidable in the photo film transport direction between first and second side positions, and when slid in the first side position, causes a front surface 72a of the pressure plate 72 to contact the first contact projections 71, and when slid in the second side position, causes the front surface 72a of the pressure plate 72 to contact the second contact projections 70 with the recesses 77 slid away from the second contact projections 70. Note that, if the pressure plate 72 slides in a simply straight manner, there occurs a problem in that edges of the recesses 77 strike edges of the second contact projections 70 to break off portions of the pressure plate 72 or the second contact projections 70.

It may be conceivable to form ends of the second contact projections 70 with an inclination for the purpose of avoiding abrasion of the ends. However it is likely with long use that scratches occur in the pressure plate 72 at the width of the second contact projections 70 to cause irregularity in the photo film passageway. In view of this situation, the present embodiment is constructed in combination of the slide and back-and-forward movement. At first the pressure plate 72 is moved straight toward the back lid 10 at an amount enough to move the recesses 77 backwards away from the second contact projections 70. Then the pressure plate 72 is slid in the photo film transport direction. Afterwards the pressure plate 72 is moved forwards straight to the photo film and caused to push the second contact projections 70.

Four support pins 78 are disposed in positions near to respective four corners of the rear surface 72b of the pressure plate 72, and secured to it by screws. Left-hand two of the support pins 78 are respectively inserted in forks 80 and 81, which are located on the top and the bottom of a rotating shifter 79. Right-hand two of the support pins 78 are respectively inserted in forks 83 and 84, which are located on the top and the bottom of a rotating shifter 82. The rotating shifters 79 and 82 are supported on the back lid 10 in a rotatable manner about respective axes which extend in the photo film width direction, and rotate in directions reverse to each other, to move the pressure plate 72 in a direction vertical to the photo film transport direction. The forks 80, 81, 83 and 84 have such a great depth that the support pins 78 do not drop away from them even when the pressure plate 72 slides in the photo film transport direction.

Respective push plates 85 and 86 are formed with the middle of the rotating shifters 79 and 82, and protrude toward the back lid 10. There are slider plates 87 and 88 disposed between the push plates 85 and 86. Openings 89 and 90 and openings 91 and 92 are formed in the slider plates 87 and 88, and are all long in the photo film transport direction. The openings 90 and 91 receive insertion of the guide pins 73 and 74. The openings 89 and 92 receive insertion of guide pins 93 and 94. The guide pins 93 and 94 are secured to the back lid 10 by means of screws. Therefore the slider plates 87 and 88 are supported between the back lid 10 and the pressure plate 72 in a movable manner in the photo film transport direction.

There a cam 95 of a plate shape disposed between the slider plates 87 and 88. The cam 95 has a contour including two straight sides parallel with each other, and two arcs protruding in opposite directions between the straight sides and defining cam surfaces. The cam 95 is connected to a selector wheel 96 by a portion through the back lid 10. The selector wheel 96 is selectively set in one of the two positions in accordance with the photo film type. The cam 95 contacts inner ends 97 and 98 of the slider plates 87 and 88 in accordance with the set position of the selector wheel 96, and causes the slider plates 87 and 88 to move between first and second positions. In the first position, outer ends 99 and 100 of the slider plates 87 and 88 respectively contact the push plates 85 and 86. In the second position, the outer ends 99 and 100 move away from the push plates 85 and 86. There are springs 101 and 102, secured to the push plates 85 and 86, to bias them for keeping the inner ends 97 and 98 in contact with the periphery of the cam 95.

The cam 95 has a rotational shaft 103. A slider pin 104 is disposed to project from the cam 95 toward the pressure plate 72 in a position eccentric from the rotational shaft 103. When the pressure plate 72 is moved up to the back lid 10, the slider pin 104 enters a slider opening 105, which is formed in the pressure plate 72. The slider opening 105 has a vertical range longer than a diameter of the slider pin 104, and a horizontal range longer than the diameter of the slider pin 104. The vertical play of the slider opening 105 is for the purpose of extracting a horizontal component of movement from rotating movement of the slider pin 104. The horizontal play of the slider opening 105 operates for delay with which the pressure plate 72 is slid at the end of displacement of the pressure plate 72 toward the back lid 10. Pressure plate springs 106 and 107 are secured to the inside of the back lid 10 for biasing the pressure plate 72 toward the first and second contact projections 70 and 71.

A mark line 108 is disposed on the outside of the selector wheel 96. The outside of the back lid 10 has indicia of "120" and "220" for the photo film types. The selector wheel 96 is manually rotated to set the mark line 108 at either of the indicia of "120" and "220".

Figure 10:
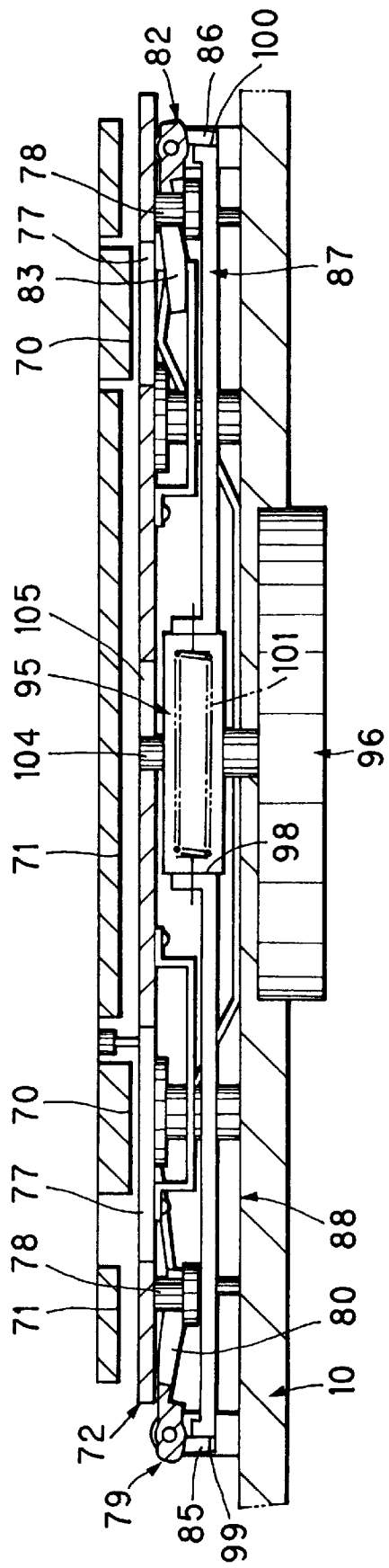
FIG. 10 is a horizontal section illustrating a state where the pressure plate is being changed over between space sizes for the 220- and 120-type roll photo films.

When the mark line 108 is set at the sign "220", the second contact projections 70 are received in the recesses 77 in the pressure plate 72. The front surface 72a contacts the first contact projections 71 as depicted in FIG. 10. The slider pin 104 contacts a right edge of the slider opening 105 of the pressure plate 72, which is in a rightward slid position. Accordingly the front surface 72a of the pressure plate 72 comes to a position such as to keep the emulsion surface of the 220-type photo film in an in-focus position, which is a focal plane of the taking lens. The switch segment 29 enters the recesses 77 to turn off the switch 30, so that the controller of the camera is electrically informed of the state where the photo film passageway has the space size of the 220-type photo film.

When the selector wheel 96 is rotated counterclockwise from the position of FIG. 8, the cam 95 rotates together to cause its periphery to push the inner ends 97 and 98 of the slider plates 87 and 88 in directions away from each other. In response to this, the outer ends 99 and 100 push the push plates 85 and 86 of the rotating shifters 79 and 82, which are rotated in their directions defined reverse to each other. The slider pin 104 also rotates. The slider opening 105 has a sufficient range in the photo film transport direction, so that the pressure plate 72 is not slid in this direction.

When the rotating shifters 79 and 82 rotate, the forks 80, 81, 83 and 84 contact the respective heads of the support pins 78, and push the support pins 78 toward the back lid 10. The pressure plate 72 is moved toward the back lid 10 substantially straight against bias of the pressure plate springs 106 and 107. In FIG. 10, the recesses 77 are moved away from the second contact projections 70. At the same time the slider pin 104 enters the slider opening 105 in the pressure plate 72. Longer-diameter portions of the cam 95 are contacting the inner ends 97 and 98.

Figure 11:
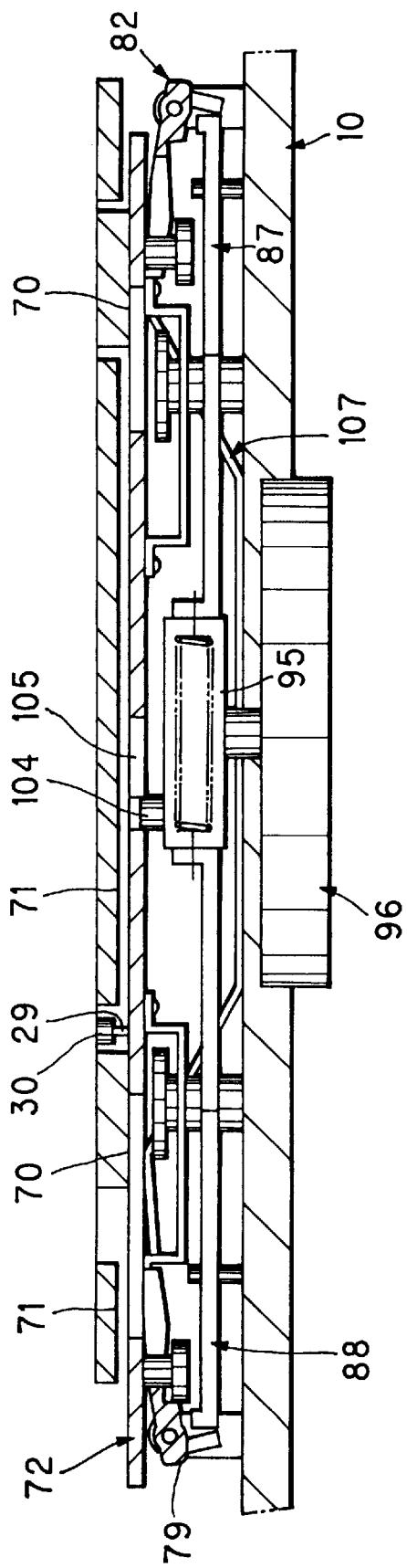
FIG. 11 is a horizontal section illustrating a state where the moving mechanism of FIG. 8 sets the pressure plate with the space size for the 120-type roll photo film.

The selector wheel 96 continues being rotated. The slider pin 104 contact the left edge of the slider opening 105, to slide the pressure plate 72 in the transport direction. The slider pin 104 rotates together with the cam 95. While the pressure plate 72 slides, contact positions of the cam surfaces of the cam 95 come to have a smaller radius. The inner ends 97 and 98 are moved toward each other by the bias of the springs 101 and 102. Upon the finish of, or shortly before the finish of the slide of the pressure plate 72, the pressure plate 72 starts being moved toward the photo film by the bias of the pressure plate springs 106 and 107. In FIG. 11, the front surface 72a of the pressure plate 72 contacts the second contact projections 70. The pressure plate 72 finishes sliding before the contact with the second contact projections 70. The slider pin 104 has a state contact with the left edge of the slider opening 105.

Accordingly the front surface 72a of the pressure plate 72 comes to a position such as to keep the emulsion surface of the 120-type photo film in an in-focus position of the taking lens. The switch segment 29 is pushed by the front surface 72a to turn on the switch 30, so that the controller of the camera is electrically informed of the state where the photo film passageway has the space size of the 120-type photo film.

When the mark line 108 is set at the sign "220" by shifting the selector wheel 96 next, the cam 95 moves the slider plates 87 and 88 again in directions away from one another, to rotate the rotating shifters 79 and 82 in direction reverse to one another. Thus the pressure plate 72 is moved toward the back lid 10. At the same time the slider pin 104 is moved from the left edge to the right edge of the slider opening 105, without causing the pressure plate 72 to slide in the photo film transport direction.

Figure 9:
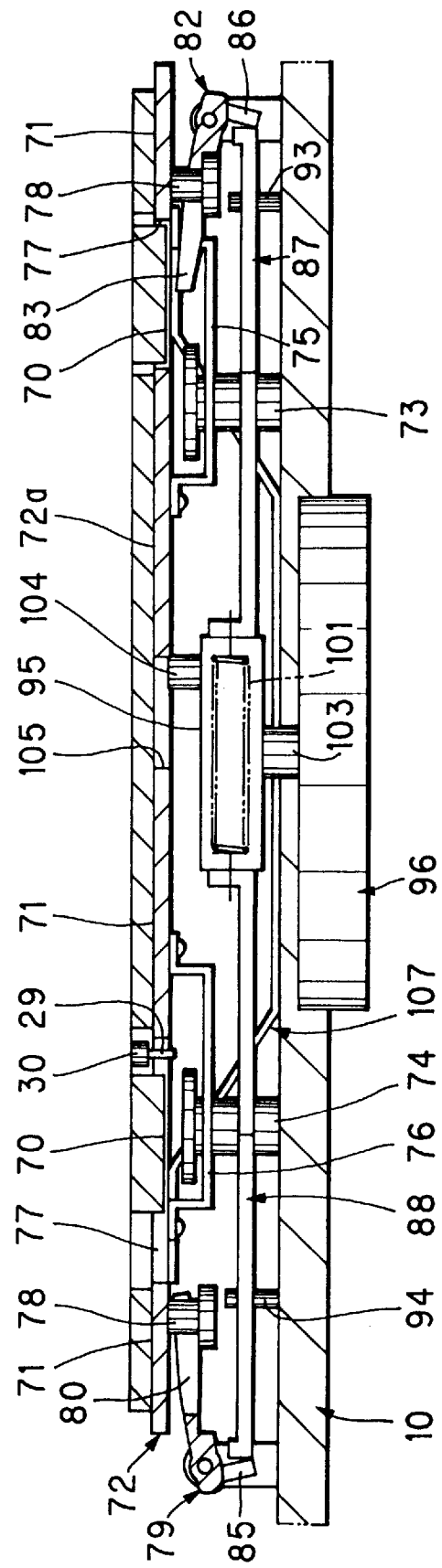
FIG. 9 is a horizontal section illustrating a state where the moving mechanism of FIG. 8 sets the pressure plate with a space size for the 220-type roll photo film.

When the pressure plate 72 is moved backward toward the back lid 10, the continued operation of the selector wheel 96 causes the slider pin 104 to push the right end of the slider opening 105 to slide the pressure plate 72 in the photo film transport direction or to the right. Upon the finish of the slide or shortly before the finish of the slide, the pressure plate 72 is moved toward the photo film. Then the recesses 77 come fitted on the second contact projection 70. The front surface 72a of the pressure plate 72 comes in contact with the first contact projection 71, to return to the state of FIG. 9.

In the above embodiments, if the selector wheel 33, 96 is erroneously shifted after being properly set, the photo film passageway is changed to an unwanted space size. It is desirable to structure a lock mechanism for keeping the selector wheel 33, 96 from moving after the proper setting.

A preferred embodiment in which such a lock mechanism is used in the structure of FIG. 8. An operable lock wheel 111 is disposed outside the back lid 10 in a rotatable manner in addition to the selector wheel 96. The lock wheel 111 is connected with a lock lever 112, which is disposed on the inner face of the back lid 10. The lock lever 112 is rotatable between first and second positions, and when rotated to the first position by operation of the lock wheel 111, is received in a recess 109 formed in the slider plate 88, and when rotated to the second position, is away from the recess 109.

When the lock wheel 111 is rotated to set a mark line 110 at an indicia "Lock" disposed on the outside of the back lid 10, the lock lever 112 is fitted in the recess 109. The slider plate 88 is hindered from sliding horizontally. Also the selector wheel 96 is kept from rotating. When the lock wheel 111 is rotated to set the mark line 110 at an indicia "UNLock" disposed on the outside of the back lid 10, the lock lever 112 is moved out of the recess 109 to allow the slider plate 88 to slide. Again the selector wheel 96 becomes rotatable.

In each of the above embodiments, the selector wheel 33, 96 as external selector is disposed on the outside of the back lid 10. Alternatively the selector wheel 33, 96 may be disposed on the outside of the camera body 11 which lies in front of the back lid 10. The selector wheel 33, 96 are rotatable for selecting operation. Instead a selector as sliding mechanism may be used.

Still another preferred camera is described now, in which a pressure plate is pushed by a mechanism in a camera body, which is in front of a back lid, to change over a photo film passageway.

Figure 12:
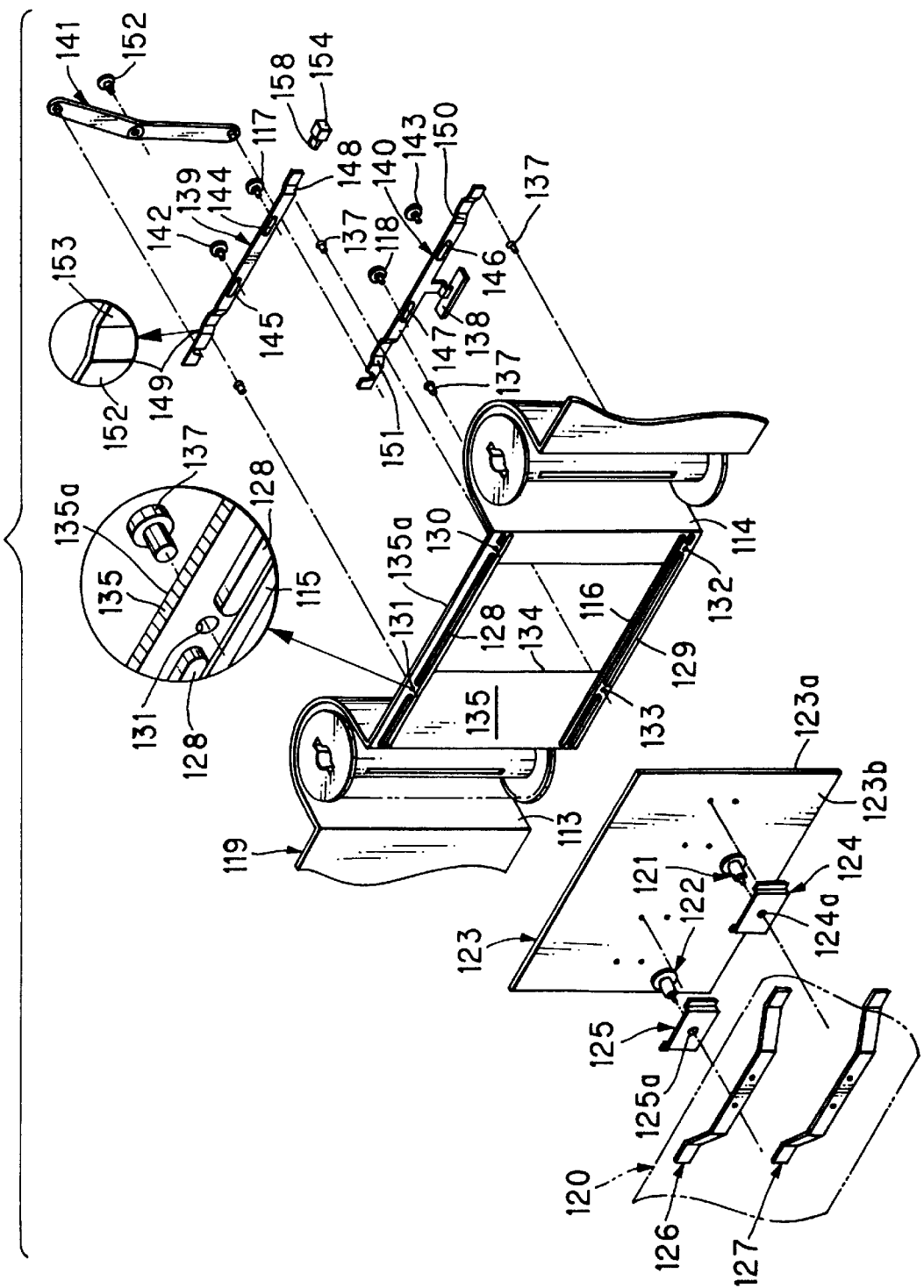
FIG. 12 is an exploded perspective illustrating still another preferred mechanism for moving a pressure plate.

In FIG. 12, a back lid 120 has a pair of guide pins 121 and 122 which are secured to its inside by use of screws. A rear surface 123b of a pressure plate 123 directed to the back lid 120 has support plates 124 and 125, which are respectively shaped in a letter Ω (omega), or a channel, as viewed in section. There are openings 124a and 125a respectively formed in the support plates 124 and 125. The guide pins 121 and 122 are respectively inserted in the openings 124a and 125a. The guide pins 121 and 122 have heads each of which has a diameter greater than that of the openings 124a and 125a, and are kept from moving away from the support plates 124 and 125. Accordingly the pressure plate 123 is supported on the back lid 120 in a movable manner in the direction of the photographic optical axis, which is perpendicular to the photo film transport. There are pressure plate springs 126 and 127 secured to the inside of the back lid 120. The pressure plate springs 126 and 127 bias the pressure plate 123 in a direction causing the pressure plate 123 to contact plate contact projections 128 and 129.

Figure 14:
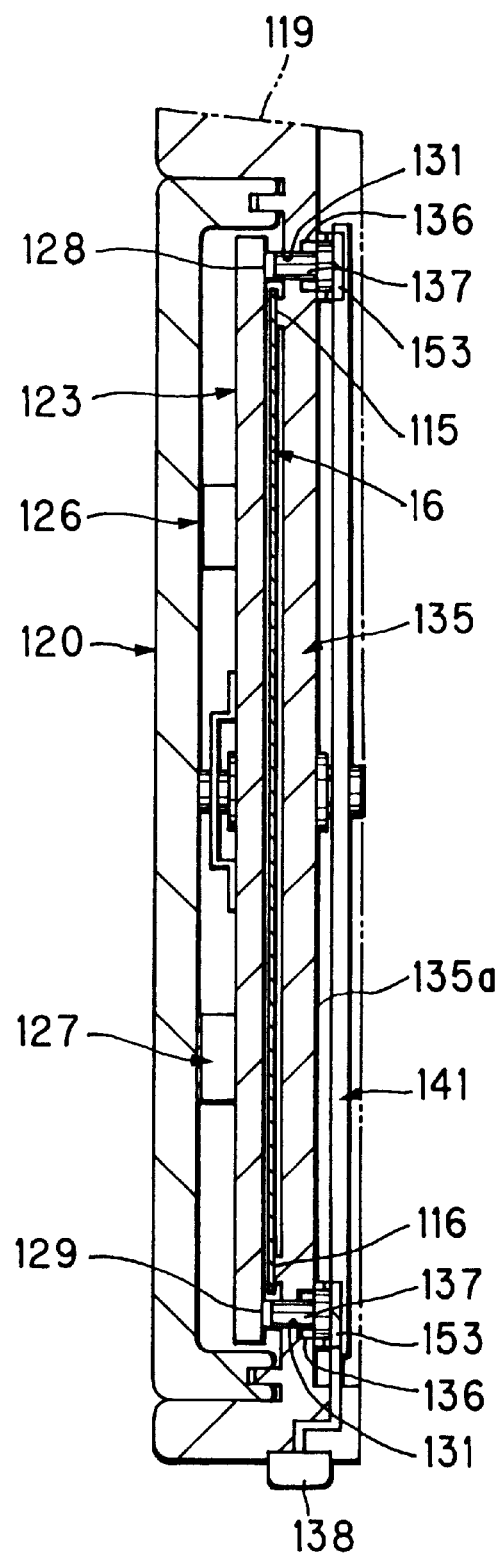
FIG. 14 is a cross section illustrating the state of FIG. 13.

A camera body 119 has the plate contact projections 128 and 129, which are respectively split into three portions arranged in the direction of the photo film transport. There are through holes 130–133 disposed in gaps between the portions of the plate contact projections 128 and 129. The through holes 130–133 are disposed symmetrically with respect to both a vertical direction and a horizontal direction about an optical axis, which lies through the center of an exposure aperture 134. The through holes 130–133 are formed in a rear wall 135 having the exposure aperture 134 in the camera body 119. The rear wall 135 has a front surface 135a. As is depicted in FIG. 14, the front surface 135a has a recess formed therein, of which a bottom is a retracted surface 136. Of course each of the through holes 130–133 opens in the retracted surface 136. Respective push pins 137 are inserted in the through holes 130–133 by movement backward through the retracted surface 136. The retracted surface 136 has such a depth that heads of the push pins 137 are contained in its small space. When the heads of the push pins 137 are pushed backwards to contact the retracted surface 136, the rear tips of the push pins 137 move through the through holes 130–133 and more backward than the plate contact projections 128 and 129, to push the pressure plate 123 toward the back lid 120. The push pins 137 and the retracted surface 136 constitute a positioning mechanism.

The pressure plate moving mechanism shifts the push pins 137 back and forth from the camera body 119 to move the pressure plate 123. This mechanism is constituted by the push pins 137, a selector lever 138, a pair of slider plates 139 and 140, a linker plate 141 and the like. The selector lever 138 is secured to the slider plate 140. A portion of the selector lever 138 externally appears through the bottom of the camera body 119, and operable in correspondence with respective thicknesses of the photo film. The selecting operation is a slide in parallel with the photo film transport.

The slider plate 139 extends in the photo film transport direction to cover the heads of upper two of the push pins 137. Also the slider plate 140 extends to cover the heads of lower two of the push pins 137. There are guide pins 117, 118, 142 and 143 projecting from the front surface 135a of the rear wall 135. The slider plates 139 and 140 have holes 144–147, in which the guide pins 117, 118, 142 and 143 are inserted. The holes 144–147 are long, to extend in the photo film transport direction, so that the slider plates 139 and 140 are supported in a slidable manner.

There are four positions 148–151 which correspond to the push pins 137 and are defined on the slider plates 139 and 140. Each of the positions 148–151 has a push surface 152 and a retracted surface 153. The position 149 among them is depicted in enlargement. The push surface 152 pushes each head of the push pins 137. The retracted surface 153 allows the push pins 137 to retreat in the forward direction of the camera body 119. Each combination of the push surface 152 and the retracted surface 153 has an inclined portion at which the slider plates 139 and 140 are bent with obtuse angles.

The linker plate 141 is connected to ends of the slider plates 139 and 140. Between the slider plates 139 and 140, the linker plate 141 has a rotational center, at which the linker plate 141 is rotatably supported on a support shaft which is disposed on the front surface 135a to extend in the forward direction in the camera body 119. When the slider plate 140 is slid, the linker plate 141 is rotated about the center to cause the slider plate 139 to slide in a direction reverse to the slider plate 140.

There is a switch 154 of which a switch segment 158 is disposed in a sliding path of the slider plate 139 and opposite to the linker plate 141. When the switch segment 158 is depressed, the switch 154 is turned on to generate a signal representing the space size of the photo film passageway for the 120-type roll photo film. When the switch segment 158 stands without being depressed, the switch 154 is turned off to generate a signal representing the space size for the 220-type roll photo film. There are a photo film supply chamber 113, a photo film take-up chamber 114, and photo film rails 115 and 116 in the camera.

The outside of the selector lever 138 has a mark line. The bottom of the camera body 119 has two indicia for the photo film types, 120 and 220. In consideration of one of the types of the photo film to be used, the selector lever 138 is slid to set the mark line at either indicia of 120 and 220 on the camera body 119.

Figure 13:
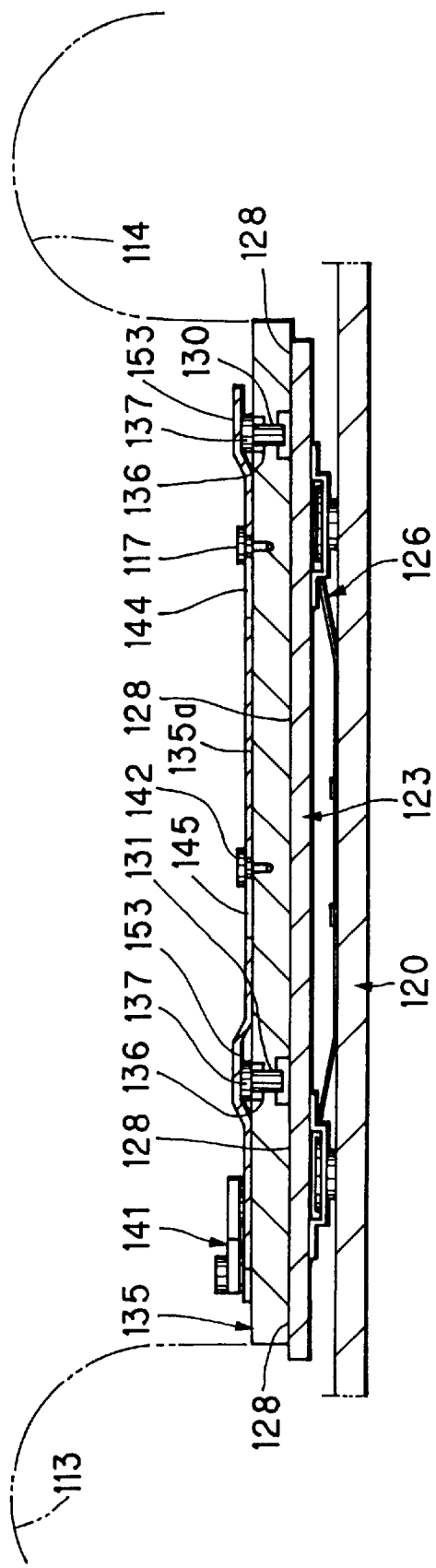
FIG. 13 is a horizontal section illustrating a state where the moving mechanism of FIG. 12 sets the pressure plate with a space size for the 220-type roll photo film.

When the mark line is set at the sign "220", the retracted surface 153 of the slider plates 139 and 140 is horizontally shifted to a position confronted with each head of the push pins 137 as illustrated in FIGS. 13 and 14. The push pins 137 are released from being depressed, and become free. The bias of the pressure plate springs 126 and 127 presses a front surface 123a of the pressure plate 123 against the plate contact projections 128 and 129. The photo film passageway is defined between the photo film rails 115 and 116 and the plate contact projections 128 and 129. The front surface 123a of the pressure plate 123 is in a position such as to keep an emulsion surface of the 220-type photo film in an in-focus position, which is a focal plane of the taking lens.

As the slider plate 139 is slid to the left as viewed in FIG. 12, the switch segment 158 remains without being depressed. The switch 154 remains turned off, so that the controller of the camera is electrically informed of the state where the photo film passageway has the space size of the 220-type photo film.

Figure 15:
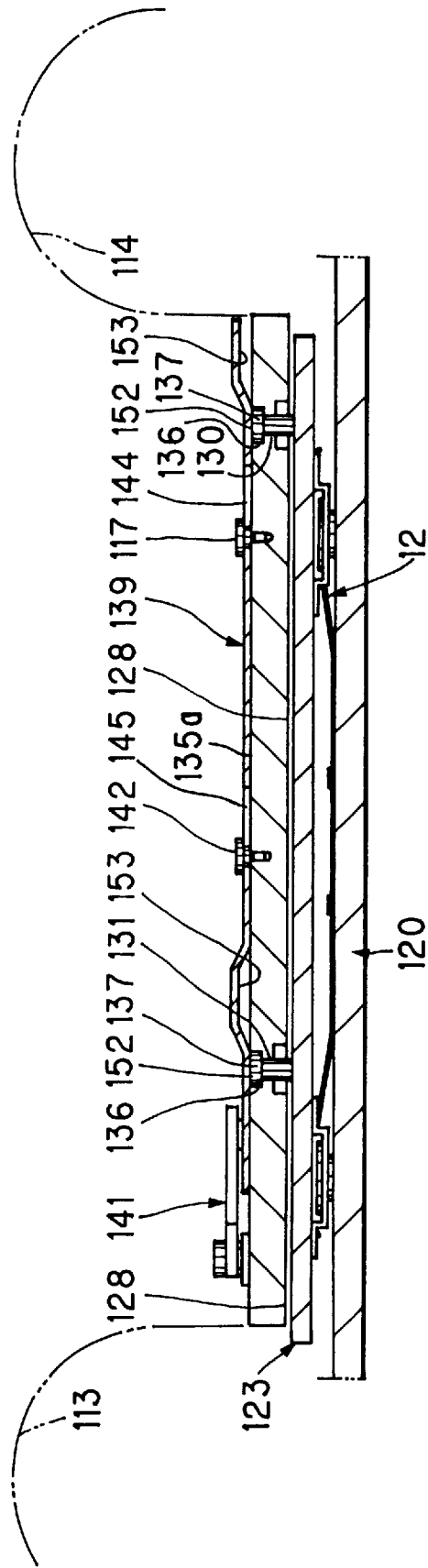
FIG. 15 is a horizontal section illustrating a state where the moving mechanism of FIG. 12 sets the pressure plate with a space size for the 120-type roll photo film.
Figure 16:
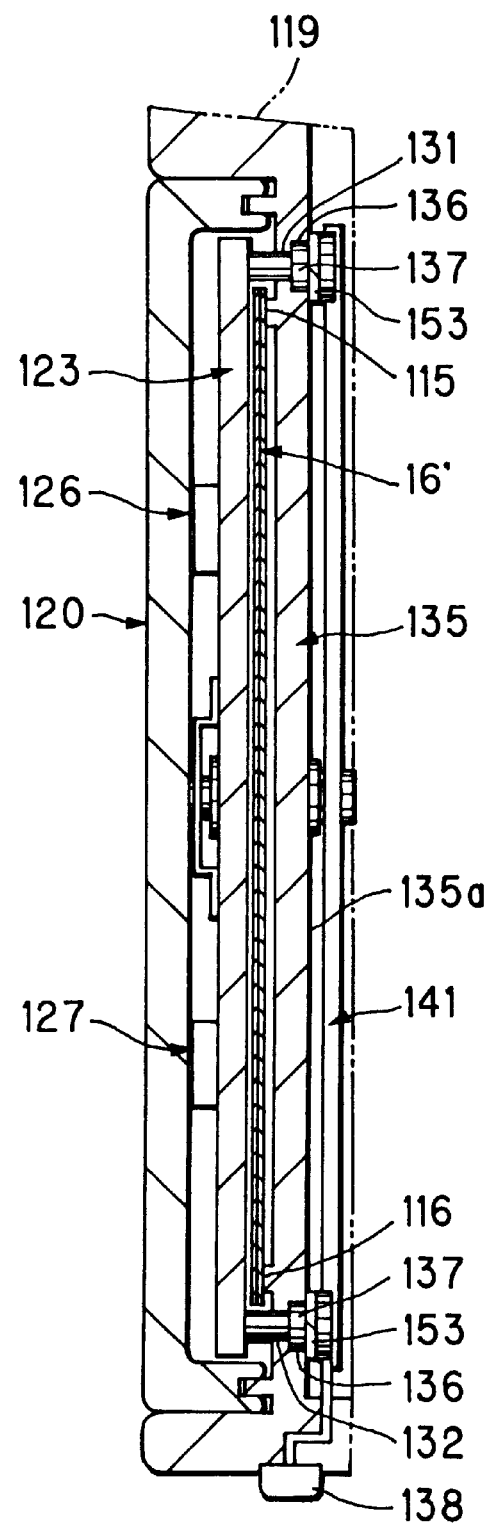
FIG. 16 is a cross section illustrating the state of FIG. 15.

When the mark line of the selector lever 138 is set at the sign "120", the slider plate 140 is slid to the right as viewed in FIG. 12. In response to this, the linker plate 141 is rotated to slide the slider plate 139 to the left as viewed in the same drawing. As depicted in FIGS. 15 and 16, the push surface 152 of the slider plates 139 and 140 comes to a position confronted with each head of the push pins 137. The push surface 152 pushes the push pins 137 backwards. The backward push of the push surface 152 is limited in a range defined by contact of the retracted surface 136 with the head of the push pins 137. The rear tips of the push pins 137 protrude toward the back lid 120 beyond a level of the plate contact projections 128 and 129, and push the pressure plate 123 toward the back lid 120 against the bias of the pressure plate springs 126 and 127. The length of the push pins 137, with which the push pins 137 are movable toward the back lid 120 more backward than the plate contact projections 128 and 129, is predetermined in consideration of the thickness of the 120-type roll photo film 16'. The pressure plate 123 is so positioned as to keep an emulsion surface of the 120-type photo film 16' in the in-focus position, which is the focal plane of the taking lens.

After the slider plate 139 is slid to the right in FIG. 12, its right end depresses the switch segment 158. The switch 154 is turned on, so that the controller of the camera is electrically informed of the state where the photo film passageway has the space size of the 120-type photo film.

Figure 17:
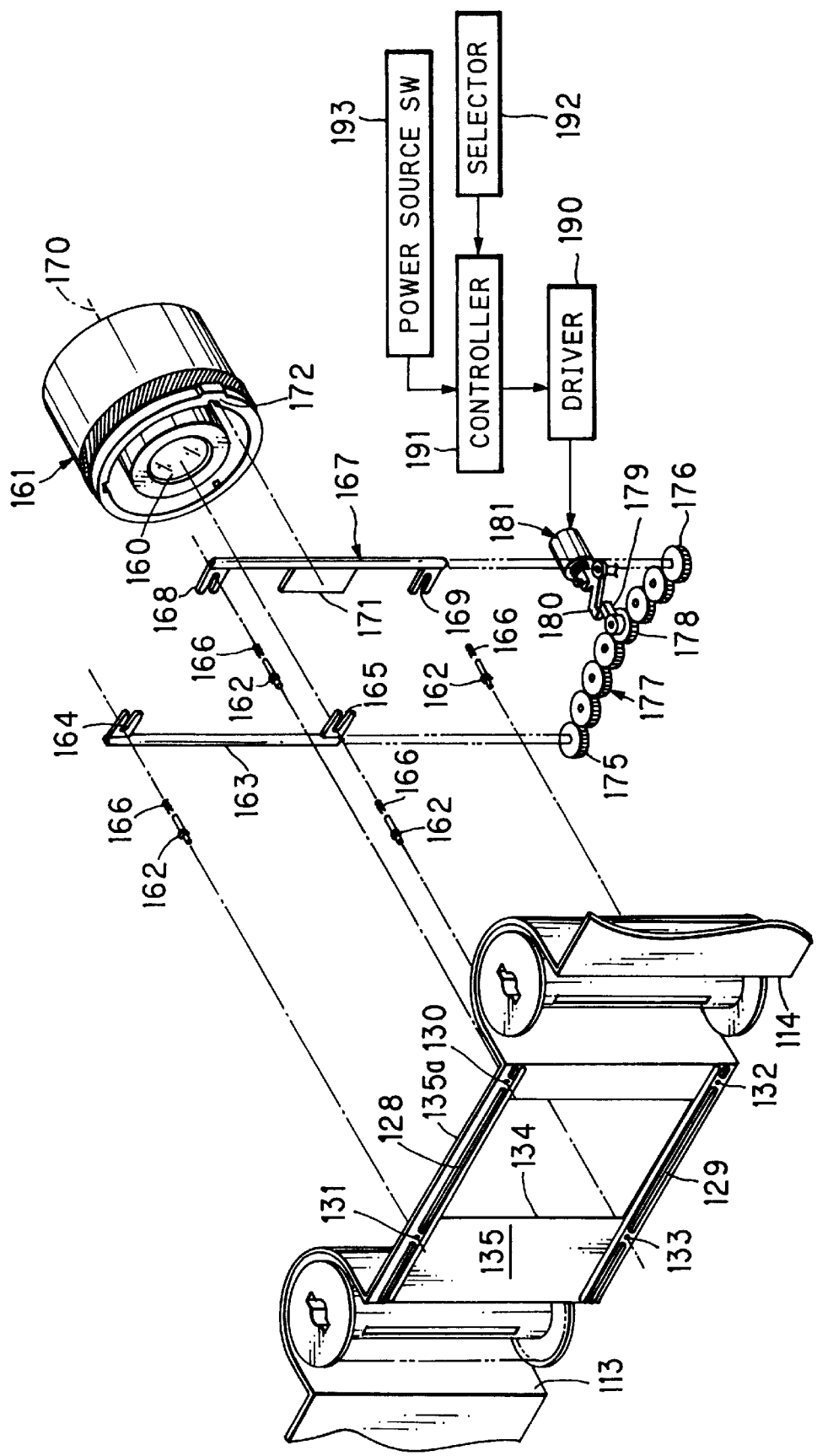
FIG. 17 is an explanatory view in perspective, illustrating still another preferred mechanism for moving a pressure plate.

FIG. 17 illustrates a camera with another preferred moving mechanism, in which a pressure plate is moved in association with movement of a movable lens barrel 161 having a taking lens or lens optical system 160 to a collapsed position. Elements similar to those of FIG. 12 are designated with identical reference numerals in FIG. 17. Note that a mechanism for supporting a pressure plate the back lid 120 in a movable manner is not shown in FIG. 17 for the purpose of simplifying the depiction. This support mechanism is still incorporated in the same manner as that in FIG. 12.

In the rear wall 135 having the exposure aperture 134, the front surface 135a has the retracted surface 136 described by referring to FIG. 12. See FIG. 18. Each of the through holes 130–133 opens in the retracted surface 136. Respective push pins 162 are inserted in the through holes 130–133 backwards through the retracted surface 136. The retracted surface 136 has such a depth that heads of the push pins 162 are contained in its small space. When the heads of the push pins 162 are pushed to contact the retracted surface 136, the rear tips of the push pins 162 come more backward than the plate contact projections 128 and 129, to push the pressure plate toward the back lid.

The push pins 162 have an engageable shaft located on a side opposite to their head. In FIG. 17, forks 164 and 165 are disposed on a top and a bottom of a rotating shifter 163. Two of the push pins 162 are engaged with the forks 164 and 165. A compression coil spring 166 is positioned in each combination of one of the push pins 162 and one of the forks 164 and 165. Also on the right side, forks 168 and 169 are disposed on a top and a bottom of a rotating shifter 167. The remaining two of the push pins 162 are engaged with the forks 168 and 169. The compression coil spring 166 is positioned in each combination of one of the push pins 162 and one of the forks 168 and 169. Shaft portions of the rotating shifters 163 and 167 are supported on the front surface 135a of the rear wall 135 in a rotatable manner, and are rotated in directions reverse to each other. The rotating shifters 163 and 167 are rotated between a protruded position and a retracted position, and when rotated in the protruded position, cause the push pins 162 to protrude toward the back lid beyond the level of the plate contact projections 128 and 129, and when rotated in the retracted position, cause the push pins 162 to retreat in the forward direction of the camera or toward a photographic field of view.

There is a push plate 171 formed in a middle of the rotating shifter 167 and protruded toward a photographic optical axis 170. When the lens barrel 161 is moved to the collapsed position, a rear end 172 of the lens barrel 161 contacts the push plate 171. The collapsed position is used for containing the lens barrel 161 within a contour of the camera body, and not used for taking exposures. The contact of the rear end 172 with the push plate 171 of the rotating shifter 167 causes the rotating shifter 167 rotationally to stay in the protruded position. Note that the collapsed position of the lens barrel 161 may be defined such that its front end is protruded slightly beyond a front face of the camera body, without being completely contained within the contour of the camera body.

Gears 175 and 176 are respectively fixed on the bottoms of the rotating shifters 163 and 167 in an integrally rotatable manner. The gears 175 and 176 are interconnected by a gear train 177. The gear train 177 consists of a combination of plural gears, of which the numbers of teeth are so predetermined that the gears 175 and 176 rotate at an equal rotational speed. When the rotating shifter 167 is rotated, its rotation is transmitted by the gear train 177 to the rotating shifter 163, which rotates at the speed equal to that of the rotating shifter 167 but in a direction reverse to the latter. A top of a gear 178 included in the gear train 177 has a ridge 179. Of course the ridge 179 rotates together with the gear 178. When the rotating shifter 167 rotates from the protruded position toward the retracted position, the gear 178 rotates in a counterclockwise direction.

Figure 18:
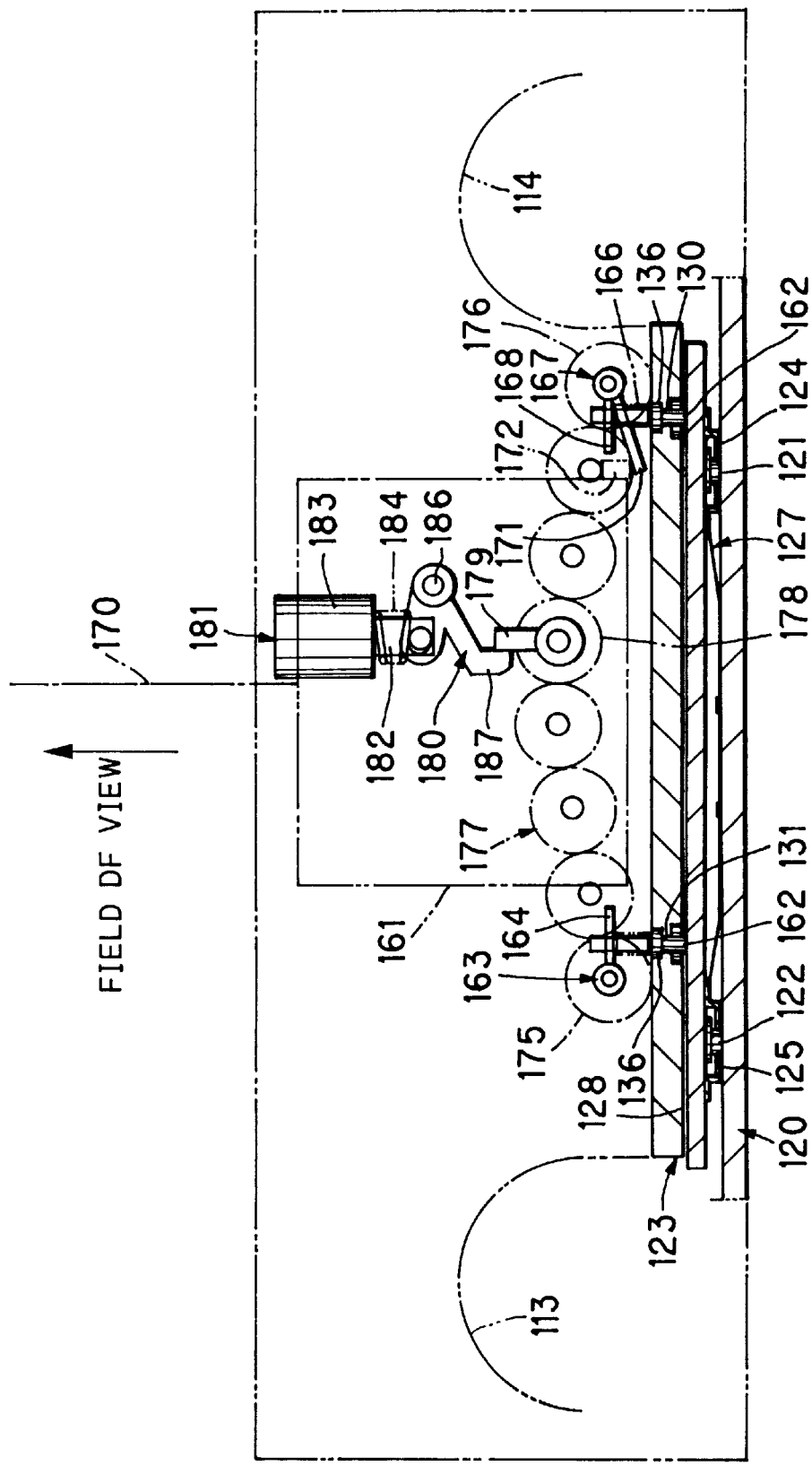
FIG. 18 is an explanatory view in plan and section, illustrating a state where the moving mechanism of FIG. 17 sets the pressure plate with a space size for the 120-type roll photo film.

In FIG. 18, a lever 180 is disposed near to the ridge 179. An end of the lever 180 is coupled with a plunger 182 of a solenoid 181. There is a compression coil spring 184 inserted between a coil portion 183 and a connective portion of the lever 180. The solenoid 181 is shifted between an attracting state and a projecting state. The solenoid 181 is energized to be in the attracting state, to attract and retract the plunger 182 into the coil portion 183 against the bias of the coil spring 184. The energization to the solenoid 181 is stopped to shift it to the projecting state, to allow the coil spring 184 to protrude the plunger 182 from the coil portion 183.

The lever 180 is V-shaped, is rotatable about a rotational shaft 186 disposed at its bend position, and includes a hook portion 187 disposed at its end. The lever 180 is rotated to a blocking position when the solenoid 181 is in the projecting state, and rotated to an non-blocking position when the solenoid 181 is in the attracting state. When the lever 180 is in the blocking position, the hook portion 187 lies in a rotational path of the ridge 179 to hinder the gear 178 from rotating counterclockwise. When the lever 180 is in the non-blocking position, the hook portion 187 comes away from the rotational path of the ridge 179 to allow the gear 178 to rotate counterclockwise.

The solenoid 181 is controlled by a controller 191 of the camera via a driver 190. There are a selector 192 and a power source switch 193 disposed outside the camera. When the power source switch 193 is turned off, the controller 191 causes the lens barrel 161 to move to the collapsed position, and stops supplying the camera with power. The selector 192 is manually operated according to the photo film type. When the power source switch 193 is turned on, the controller 191 determines whether the solenoid 181 should be energized according to one of the two set positions of the selector 192, and then causes the lens barrel 161 to move toward the field of view along the optical axis 170. If the selector 192 is positioned for the 120-type photo film, the solenoid 181 is kept without being energized. If the selector 192 is positioned for the 220-type photo film, the solenoid 181 is energized.

When the power source switch 193 is turned off, the rear end 172 of the lens barrel 161 contacts the push plate 171 of the rotating shifter 167, to keep the rotating shifters 163 and 167 moved in the protruded position. See FIG. 18. The pressure plate is pushed toward the back lid by the push pins 162 against the bias of the springs. The protruded amount of the push pins 162 is limited by the contact of their heads with the retracted surface 136. Accordingly the photo film passageway has the space size defined for the 120-type roll photo film while the camera is not powered, in a manner irrespective of positions of the selector 192.

Then the power source switch 193 is turned on after setting the selector 192 in the position for the 120-type photo film. The controller 191 controls for advancement of the lens barrel 161 without energizing the solenoid 181. The hook portion 187 of the lever 180 is located in the rotational path of the ridge 179 to hinder the ridge 179 from rotating counterclockwise. The lens barrel 161 moves on the optical axis 170 toward the photographic field of view from the collapsed position. The rear end 172 of the lens barrel 161 is moved out of the rotational path of the rotating shifter 167. The gear train 177 is stopped from rotating because the ridge 179 is kept from rotating by the hook portion 187. As a result the rotating shifters 163 and 167 are retained in the protruded position.

Figure 19:
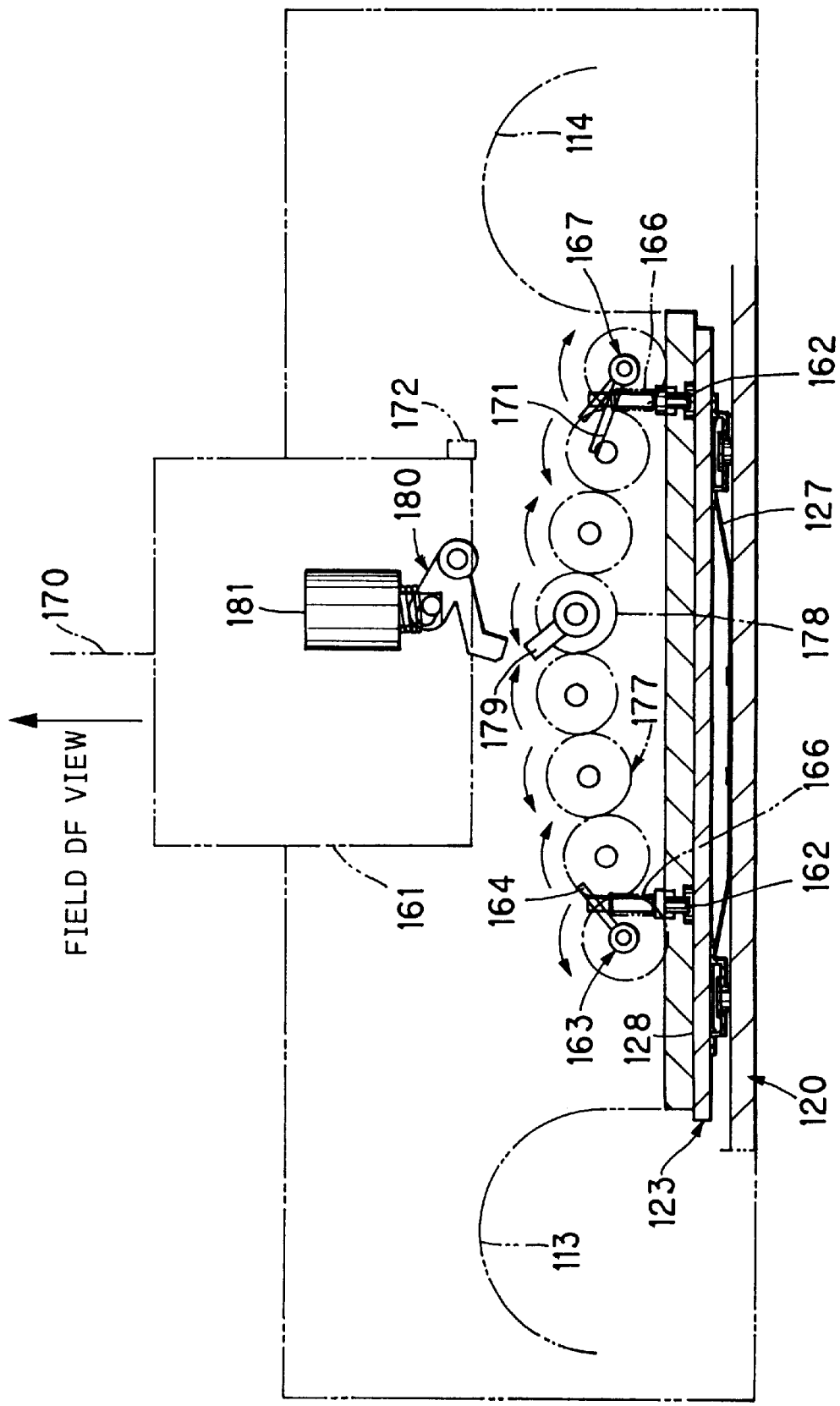
FIG. 19 is an explanatory view in plan and section, illustrating a state where the moving mechanism of FIG. 17 sets the pressure plate with a space size for the 220-type roll photo film.

After the power source switch 193 is turned off, the selector 192 is shifted to the position for the 220-type roll photo film. Then the power source switch 193 is turned on, so that the controller 191 energizes the solenoid 181. In the solenoid 181, the plunger 182 is attracted to retreat inside the coil portion 183. The lever 180 is caused to rotate to the non-blocking position, to move the hook portion 187 away from the rotational path of the ridge 179. As the rear end 172 of the lens barrel 161 is still contacting the pus h plate 171, the rotating shifter 167 does not rotate toward the retracted position. Afterwards the lens barrel 161 advances from the collapsed position toward the field of view in the direction of the optical axis 170, to move the rear end 172 away from the push plate 171. The lever 180 is in the non-blocking position. The gear train 177 rotates as well as the rotating shifter 167. The rotating shifters 163 and 167 rotate to the retracted position to have the condition depicted in FIG. 19.

When the rotating shifters 163 and 167 rotate to the retracted position, the coil spring 166 is released from compression. The push pins 162 are pushed by the back lid 120 biased by the pressure plate springs 126 and 127, and move forwards to positions flush with or retracted from the plate contact projections 128 and 129. The back lid 120 comes in contact with the plate contact projections 128 and 129, to form the photo film passageway defined for the 220-type photo film.

In the present embodiment, the photo film passageway is set with the initial space size defined for the 120-type roll photo film while the camera is not used. This is because an initial space size, if defined for the 220-type roll photo film in an alternative camera, would cause failure. Let a camera stand for a long time while the photo film passageway is kept with the smaller space size and the paper-backed photo film remain positioned. The photo film would be kept pushed by the pressure plate. Under an environmentally severe condition, the photo film would be likely to adhere to the pressure plate. Vibration or shock might occur to the camera, and cause scratches to photo film.

If a user becomes aware of his or her error in setting the selector 192, it is possible to turn on the power source switch 193, and reset the selector 192 before the power source switch 193 is turned on. If the selector 192 is operated without turning off the power source switch 193, the photo film passageway will be set properly upon next operation of turning off and on the power source switch 193.

Figure 20:
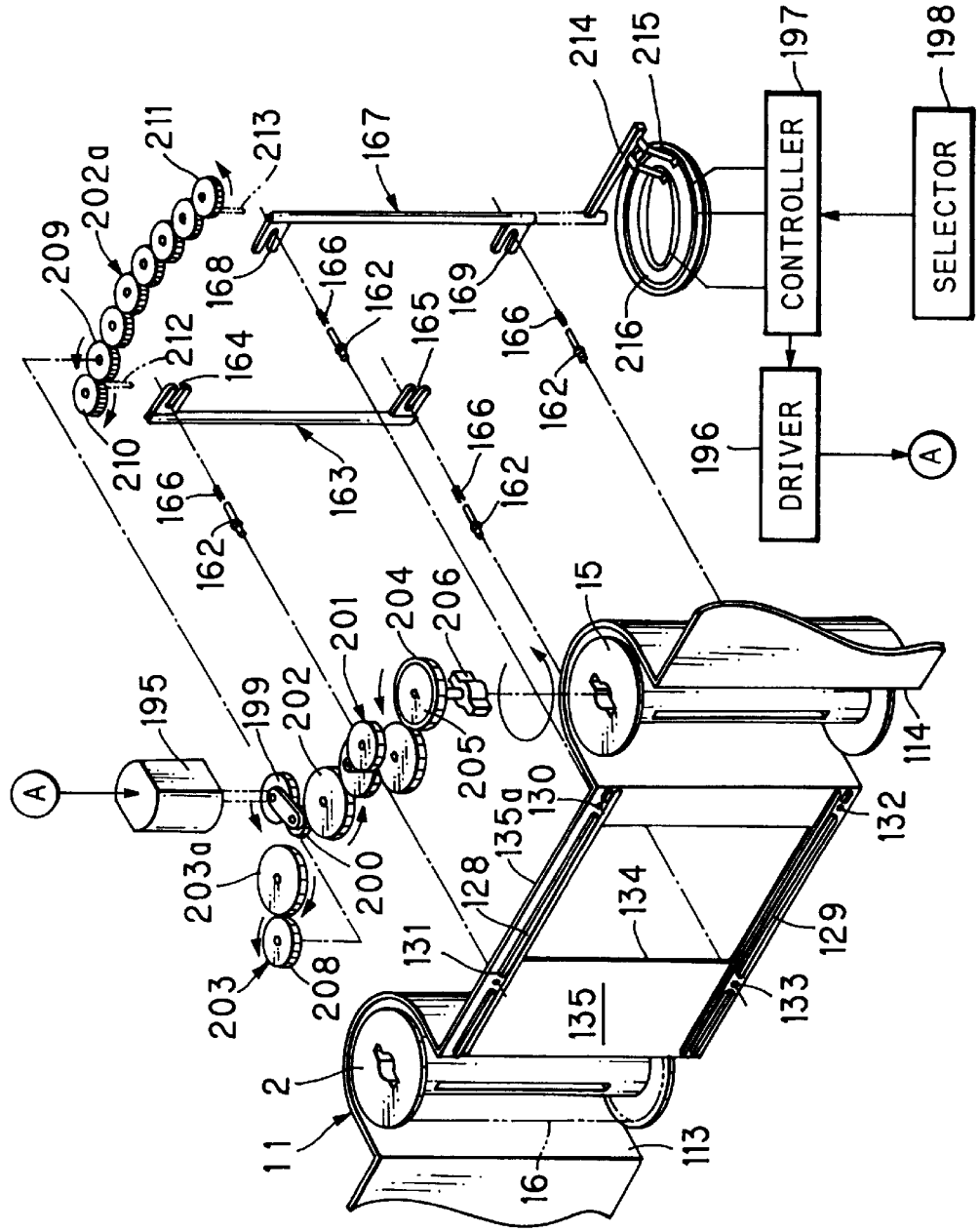
FIG. 20 is an explanatory view in perspective, illustrating another preferred mechanism for moving a pressure plate.

In FIG. 20, another preferred camera is illustrated, in which a motor for the photo film transport is used to move the pressure plate.

The photo film transport of widely used cameras for the Brownie photo film is in the one direction to wind the 220-type roll photo film 16. In view of the photo film transport, only one direction in the rotation of a motor 195 is used. The direction opposite to this direction is not used. In the present embodiment, the pressure plate is moved by utilizing rotation of the motor in this opposite direction. Elements similar to those in FIG. 17 are designated with identical reference numerals. In FIG. 17, the back lid is not depicted. However the same back lid is used and supported in the movable manner in parallel with the optical axis, and biased by the springs toward the plate contact projections 128 and 129.

The motor 195 is connected to a controller 197 via a driver 196. The controller 197 causes the motor 195 to rotate in the direction of the photo film transport, or in one of two directions changed over by a set position of a selector 198. A drive gear of the motor 195 is a sun gear 199, with which a planet gear 200 is meshed. When the motor 195 is rotated in a forward direction to rotate the sun gear 199 counterclockwise, then the planet gear 200 comes in mesh with an input gear 202 of a gear train 201. The gear train 201 operates as transmission mechanism for the photo film winding. When the motor 195 is rotated in a reverse direction to rotate the sun gear 199 clockwise, then the planet gear 200 comes in mesh with an input gear 203a of a gear train 203. The gear train 203 operates as another transmission mechanism for moving the pressure plate.

The gear train 201 for the photo film winding has an output gear 204, to which a drive shaft 206 is connected via a one-way clutch 205. The drive shaft 206 is engaged with the take-up spool 15 of the photo film take-up chamber 114, and rotates the take-up spool 15 in the photo film winding direction counterclockwise in FIG. 20. The one-way clutch 205 transmits only rotation in the direction to rotate the drive shaft 206 in the winding direction, and not in the direction reverse to it.

In the present embodiment, transmission for the motor 195 is automatically changed over by the planetary gear mechanism between the photo film transport mechanism and the pressure plate moving mechanism. If the motor 195 is driven in the reverse direction with the planet gear 200 meshed with the gear train 201, there is a problem in that a small initial part of the rotation of the motor 195 is transmitted to the gear train 201. To eliminate this problem, the one-way clutch 205 is used to keep the take-up spool 15 from rotating in reverse to the photo film winding, and keep the roll photo film from being unwound.

The stop of the motor 195 in the course of the photo film transport is in the same manner as described with FIG. 2. The controller 197 counts the pulses generated from the photo interrupter 24, and stops the motor 195 when the count value comes up to the preset count value for one frame. The control of transporting the photo film includes initial advancement, one-frame advancement and final advancement. In the initial advancement, a first frame is set on the exposure aperture. The one-frame advancement is effected after each operation of releasing the shutter. The final advancement is effected after exposing a final frame for winding the entirety of the 220-type roll photo film 16 about the take-up spool 15.

An upper gear 208 of the double gear is meshed with the input gear 203*a* for the pressure plate moving mechanism. A lower gear 209 of the double gear is included in a gear train 202*a*, which is arranged in the photo film transport direction. There are projecting pins 212 and 213, which respectively projects from the bottom of gears 210 and 211 of the gear train 202*a*. The projecting pins 212 and 213 are eccentric on the gears 210 and 211. The gears 210 and 211 are rotated commonly by the motor 195, but in directions reverse to each other. The fork 164 of the rotating shifter 163 lies in a rotational path of the projecting pin 212. The fork 168 of the rotating shifter 167 lies in a rotational path of the projecting pin 213. Of course the rotating shifters 163 and 167 are those the same as described with reference to FIG. 17. Engagement of the projecting pins 212 and 213 with the forks 164 and 168 causes them to rotate between the protruded and retracted positions.

A lever 214 is formed integrally with a bottom of the rotating shifter 167. A brush 215 as position detector is disposed on a bottom of the lever 214, and moves in contact with a patterned plate 216, which is disposed under the brush 215. The patterned plate 216 includes first and second patterns respectively for detection of the protruded and retracted positions. When the rotating shifter 167 rotates to the protruded position, the brush 215 contacts the first pattern to send the controller 197 a signal representing the protruded position. When the rotating shifter 167 rotates to the retracted position, the brush 215 contacts the second pattern to send the controller 197 a signal representing the retracted position. When either signal for the position set by the selector 198 from the patterned plate 216 is received by the controller 197, the controller 197 stops the motor 195 from rotating in reverse.

Figure 21:
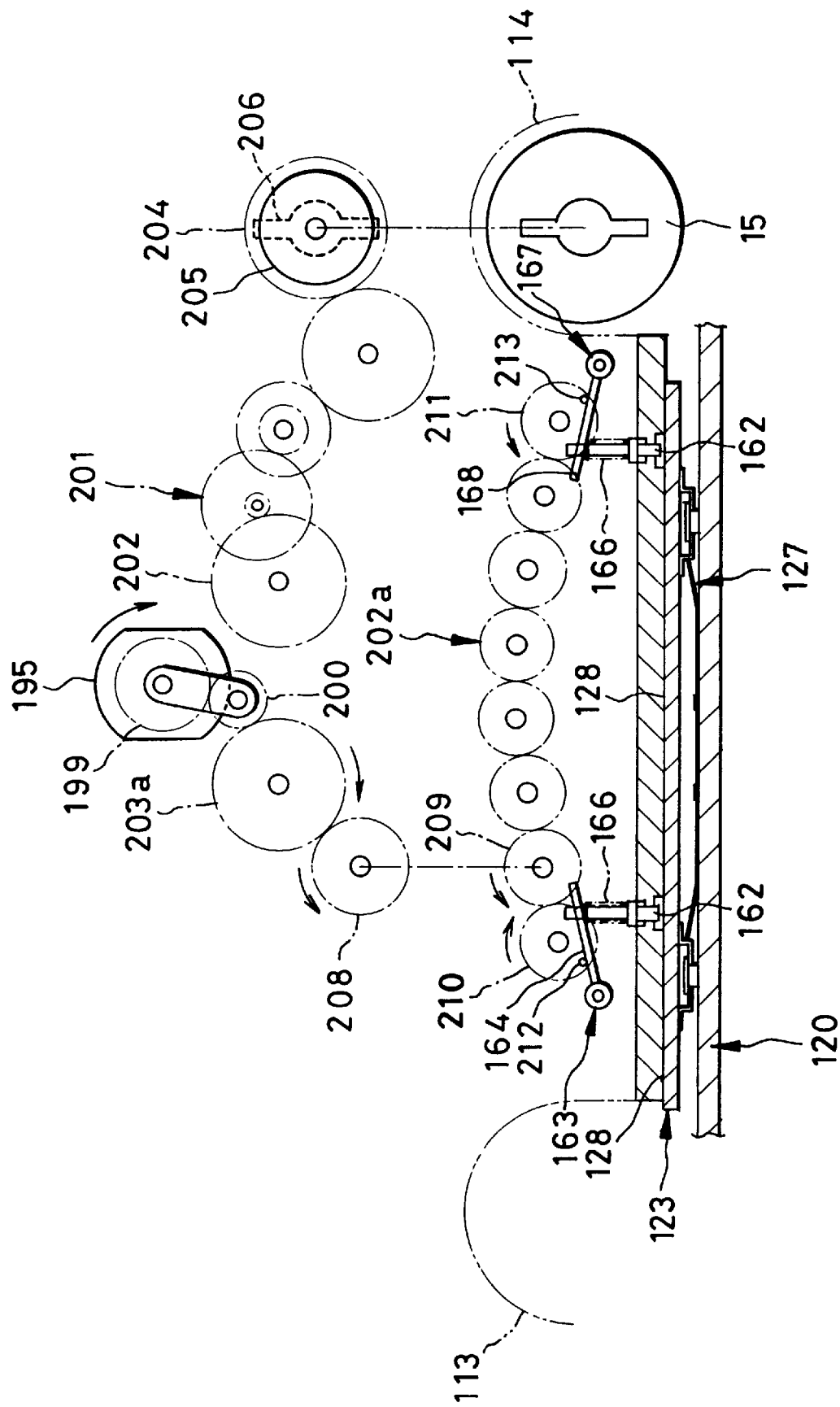
FIG. 21 is an explanatory view in plan and section, illustrating a state where the moving mechanism of FIG. 20 sets the pressure plate with a space size for the 220-type roll photo film.

The selector 198 is located on the outside of the camera. When the selector 198 is operated, a selection signal is sent to the controller 197. The controller 197 drives the motor 195 in reverse upon receipt of the selector signal before or after taking an exposure or before or after transport of the photo film. If the selector signal is received while an exposure is taken or during transport of the photo film, the controller 197 disables the motor 195 from rotating in reverse, and upon a finish of the exposure or the transport, starts rotation of the motor 195. When the motor 195 rotates in reverse, the sun gear 199 rotates in the clockwise direction in FIG. 21. The planet gear 200 is caused to revolve in the clockwise direction about the sun gear 199 and rotate in the counterclockwise direction about its own axis. The rotation is transmitted by the upper gear 208, the lower gear 209 and the gear train 202*a* to the gears 210 and 211.

Figure 22:
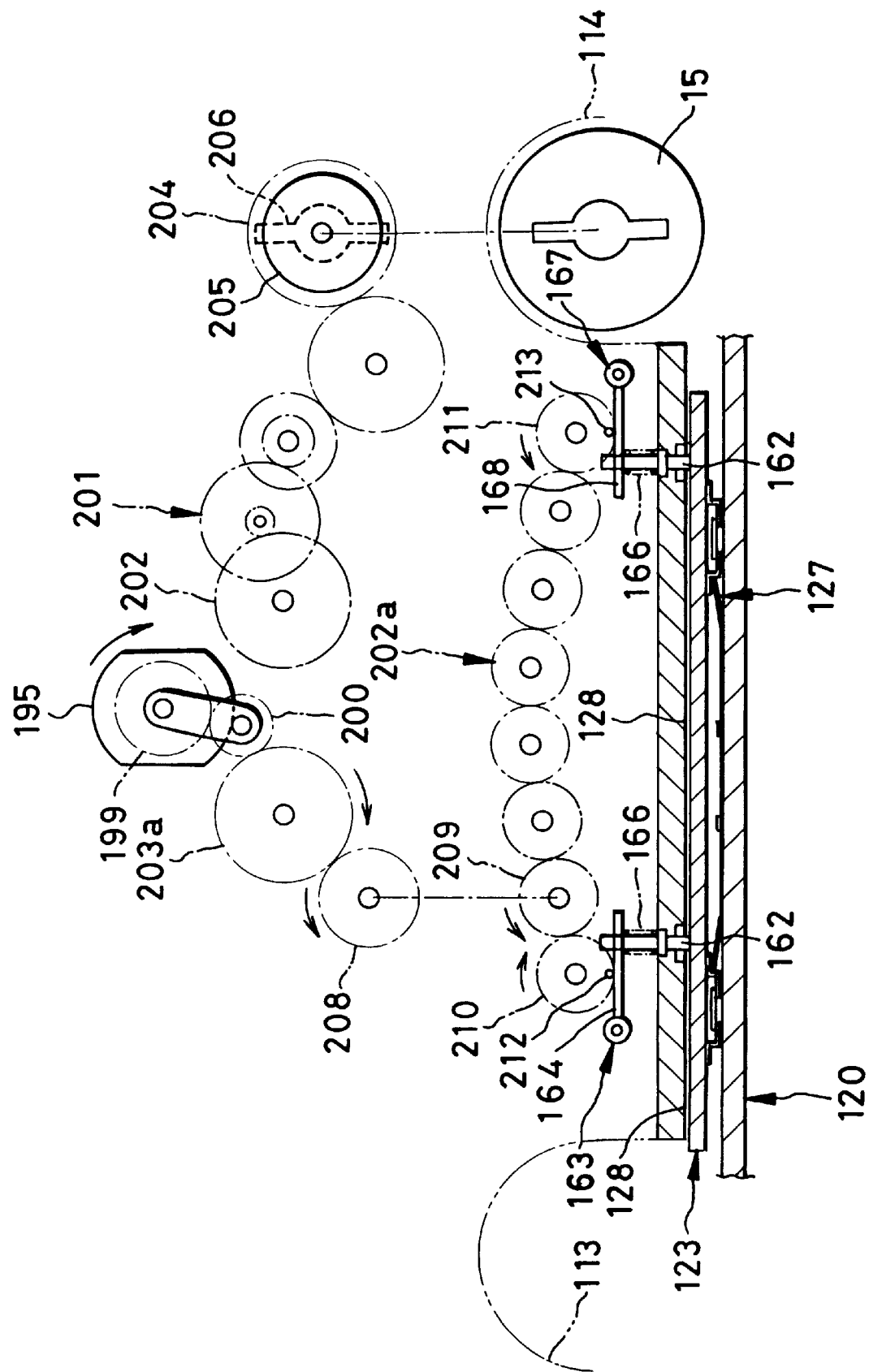
FIG. 22 is an explanatory view in plan and section, illustrating a state where the moving mechanism of FIG. 20 sets the pressure plate with a space size for the 120-type roll photo film.

The gear 210 rotates clockwise. The gear 211 rotates counterclockwise. Each of those does not rotate in reverse. The projecting pin 212 rotates together with the gear 210, and the projecting pin 213 with the gear 211. The projecting pin 212 is engaged with the fork 164 to rotate the rotating shifter 163 between the protruded and retracted positions. Also the projecting pin 213 is engaged with the fork 168 to rotate the rotating shifter 167 between the protruded and retracted positions. When the rotating shifter 167 rotates to either of the protruded and retracted positions, the brush 215 comes in contact with either of the first and second patters on the patterned plate 216. The controller 197 responsively receives either signal for one of the protruded and retracted positions of the rotating shifters 163 and 167, to stop the motor 195. If the 220-type roll photo film is used, then the space size of the photo film passageway becomes smaller. See FIG. 21. If the 120-type roll photo film is used, then the space size of the photo film passageway becomes greater. See FIG. 22.

Still another preferred embodiment is described now, in which photo film rails are movable forwards and backwards in parallel with the optical axis.

Figure 23:
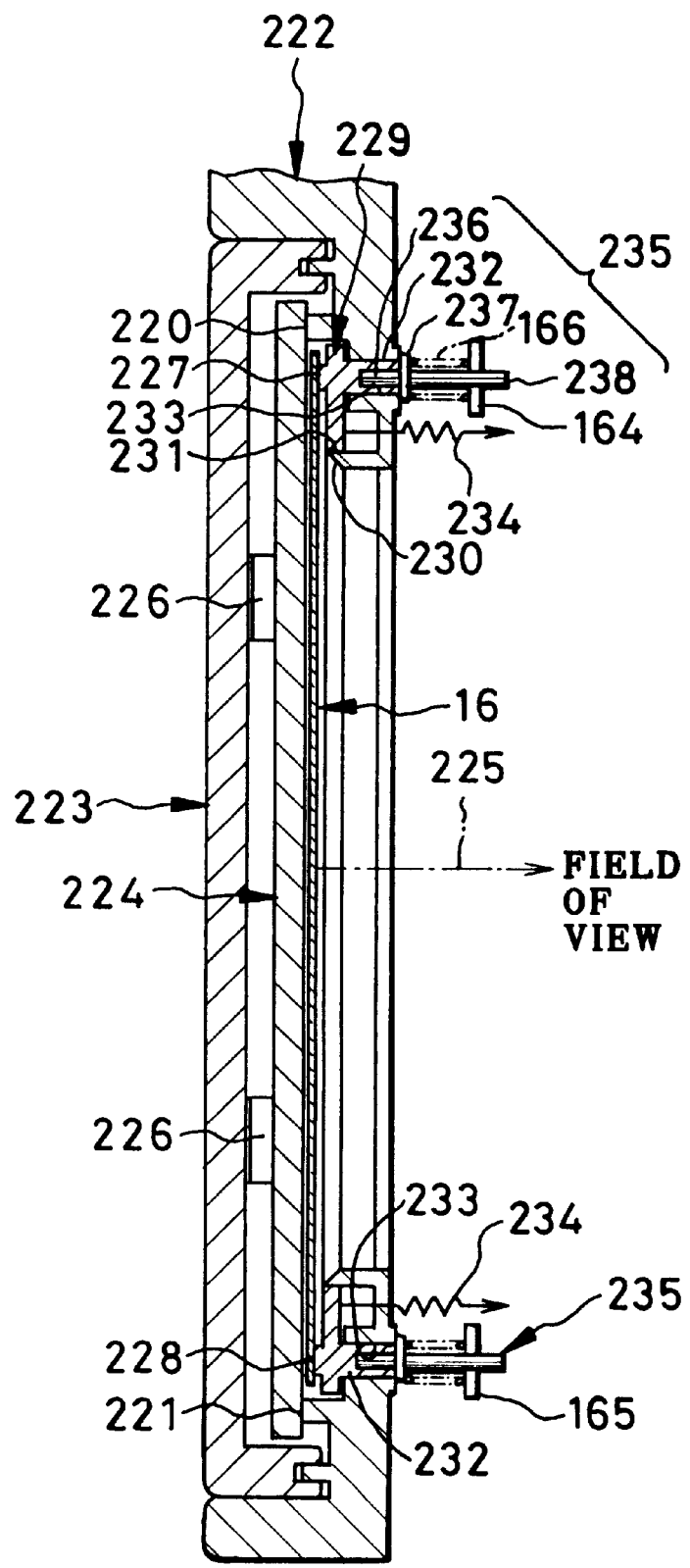
FIG. 23 is a cross section illustrating a preferred embodiment in which rails are movable back and forwards, and which is in a state where a moving mechanism sets the rails with a space size for the 220-type roll photo film.
Figure 24:
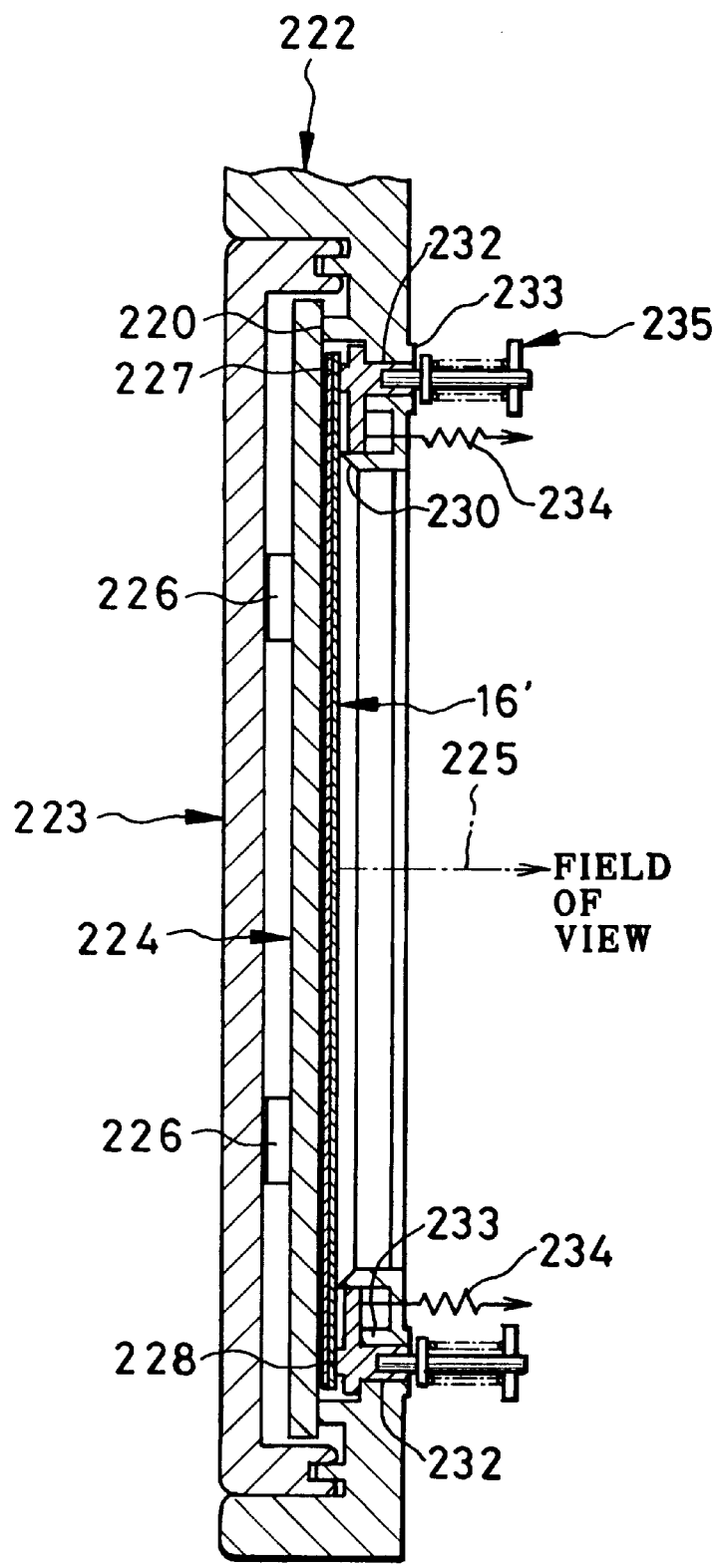
FIG. 24 is a cross section illustrating a state where the moving mechanism of FIG. 23 sets the rails with a space size for the 120-type roll photo film.

In FIGS. 23 and 24, plate contact projections 220 and 221 are disposed on a camera body 222 in a stationary manner. A pressure plate 224 is disposed on a back lid 223 in a movable manner relative to the back lid 223 in parallel with a photographic optical axis 225, and biased by a spring plate 226 in the forward direction toward a photographic field of view. The pressure plate 224 contact the plate contact projections 220 and 221, and is positioned in its fixed position. Photo film rails 227 and 228 are formed integrally with a movable rail plate 229, which is separate from the camera body 222. A rectangular opening 231 is formed in the movable rail plate 229, and has inner edges which contact outer edges along horizontal sides of an exposure aperture 230. A rod portion 232 is formed at each of four corners of the shape of the opening 231, and protrudes forwards toward the photographic field of view. The camera body 222 has a through hole 233, into which the rod portion 232 is inserted and by which the rod portion 232 is supported in a slidable manner in parallel with the optical axis 225. The rod portion 232 is biased by a spring 234 in a forward direction toward the photographic field of view. The rod portion 232 and the through hole 233 constitute a structure for supporting the photo film rails 227 and 228 movably in parallel with the optical axis 225.

An end 236 of push pins 235 are engaged with an end of the rod portion 232 inserted in the through hole 233. The push pins 235 have an engageable shaft 238, which is extended forwards and disposed opposite to the end 236. Also a flange 237 is formed with the push pins 235. Each of the forks 164, 165, 168 and 169 of the rotating shifters 163 and 167 is engaged with the engageable shaft 238 via the coil spring 166 described with FIG. 20. A structure to drive the rotating shifters 163 and 167 is the same as described with reference to FIG. 20. See the above.

When the rotating shifters 163 and 167 rotate, the movable rail plate 229 moves between narrow and wide positions. In the narrow position, the forks 164 and 165 and the forks 168 and 169 push the push pins 235 toward the back lid 223 via the coil spring 166, so that the movable rail plate 229 comes the nearest to the back lid 223. In the wide position, the forks 164 and 165 and the forks 168 and 169 do not push the push pins 235, so that the movable rail plate 229 comes forward toward the field of view and the farthest from the back lid 223. The photo film passageway, when set in the narrow position, has the space size adapted to the 220-type roll photo film 16. See FIG. 23. The photo film passageway, when set in the wide position, has the space size adapted to the 120-type roll photo film 16'. See FIG. 24.

In the present embodiment, the spring plate 226 is used to bias the pressure plate 224. However the spring plate 226 may be eliminated, because the pressure plate 224 can be fixedly retained inside the camera on the back lid 223.

In the embodiment of FIGS. 23 and 24, the photo film rails are moved straight in parallel with the optical axis. Alternatively the photo film rails may be slidable in the direction of the photo film transport direction to shift forwards and backwards in an inclined path. A cam mechanism can be preferably used for this construction for moving the rail-formed plates in the direction of the optical axis in response to the slide of the plates.

Another preferred embodiment is described now, in which photo film information is optically read from photo film for the purpose of automatically changing the space size of the photo film passageway.

Figure 25:
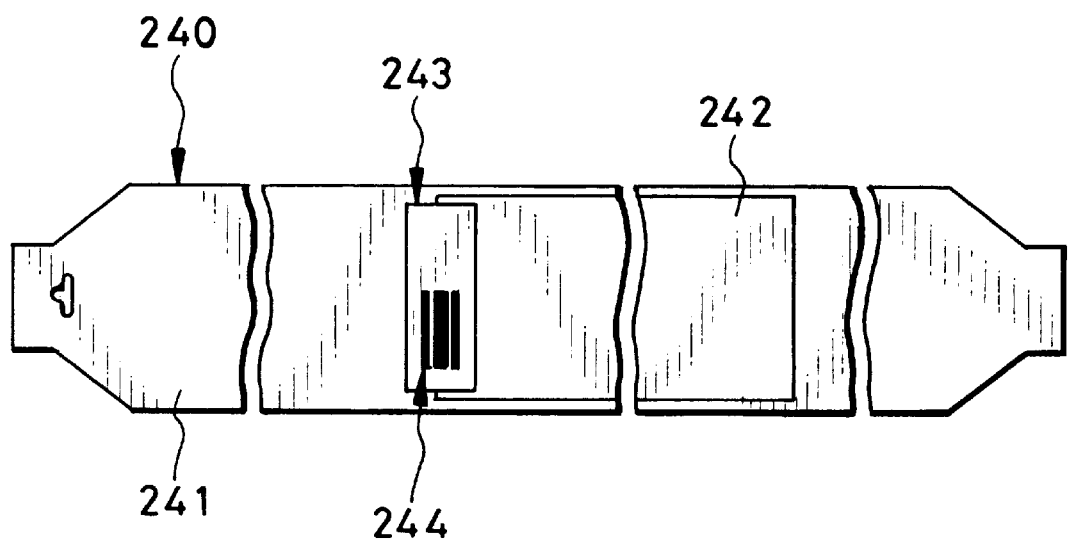
FIG. 25 is a plan, partially broken, illustrating the 120-type roll photo film being unwound.
Figure 26:
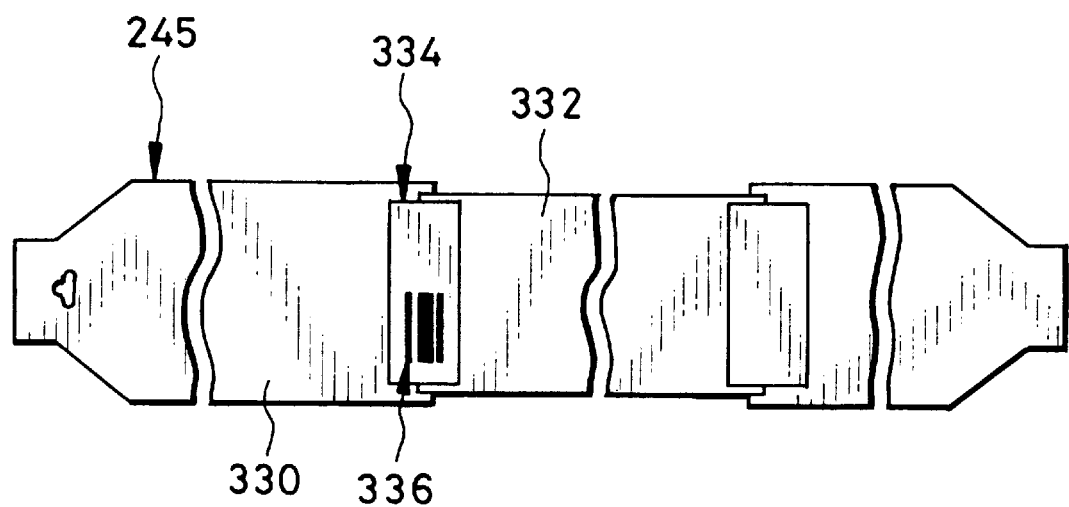
FIG. 26 is a plan, partially broken, illustrating the 220-type roll photo film being unwound.

In FIG. 25, a 120-type roll photo film 240 as a paper-backed type includes a photo filmstrip 242 and backing paper 241. An adhesive connective tape 243 for their connection has a bar code 244 printed thereon for representing the photo film information. In FIG. 26, a 220-type roll photo film 245 as a non-paper-backed type includes a photo filmstrip 332 and a leader sheet 330. An adhesive connective tape 334 for their connection has a bar code 336 printed thereon. For each frame created on either photo filmstrip, see an exposure aperture 273 depicted in FIG. 28.

Figure 27:
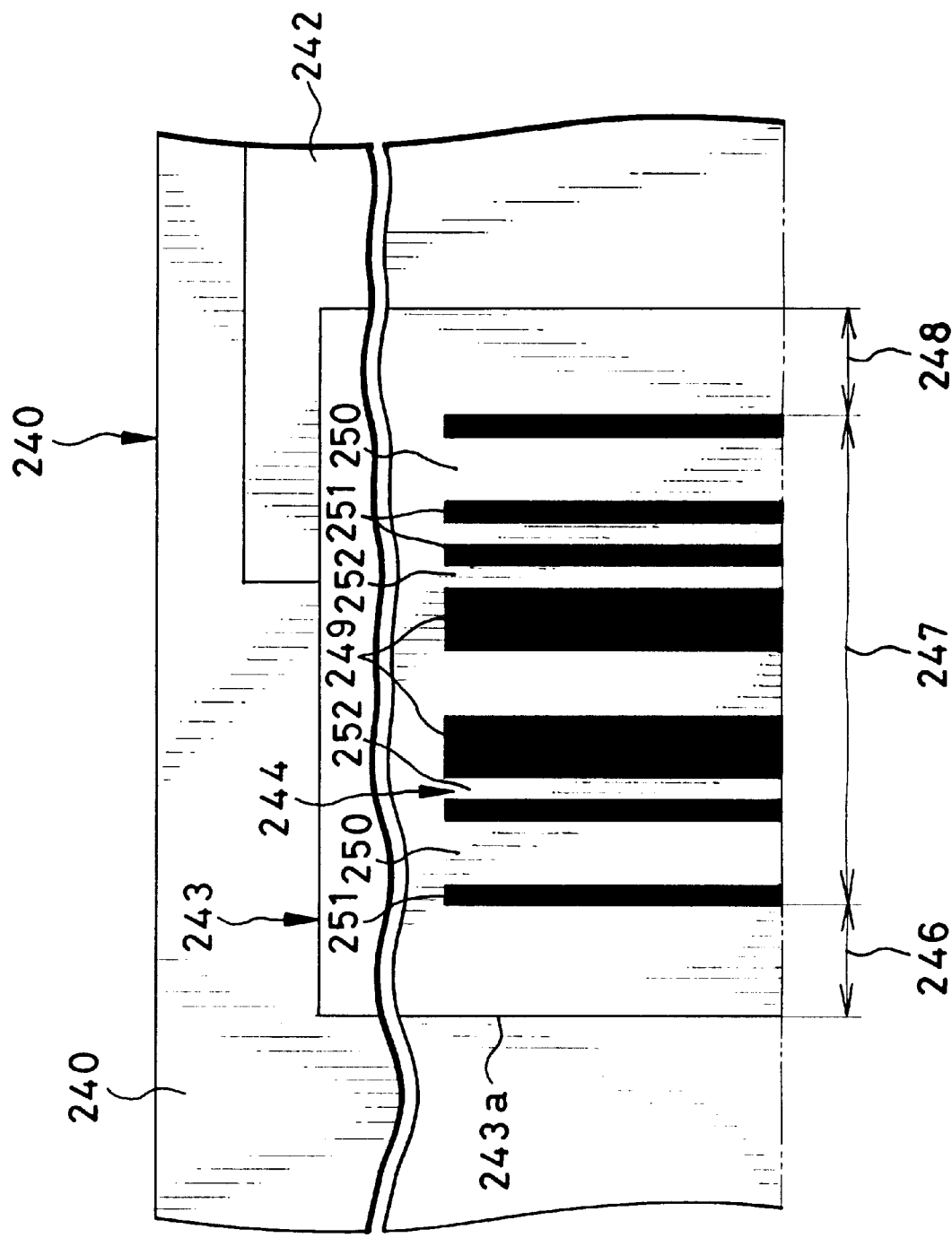
FIG. 27 is a plan, partially cutaway, illustrating a connective tape of the roll photo film.

In FIG. 27, the bar code 244 consists of a combination of black bars printed with ink on a white surface of the connective tape 243 and arranged in a longitudinal direction of the photo filmstrip 242. The bar code 244 includes a first quiet zone 246, a data bar section or module zone 247 and a second quiet zone 248 arranged in a direction away from a tape edge 243a of the connective tape 243 located in the advancing direction. The module zone 247 includes black bars having a low reflection level and white bars having a high reflection level. The white bars include one or more wide white bars and one or more narrow white bars. The black bars include one or more wide black bars and one or more narrow black bars. Those bars are combined as various bar combinations each of which represents photo film information of kinds including the photo film type, photo film sensitivity, statuses of monochromatic or color photo film, and statuses of negative or reversal photo film.

Each one wide bar has a width 2.5 times as great as a width of one narrow bar. Each wide bar represents a logical value of "1", each narrow bar represents a logical value of "0", both irrespective of the difference between black and white.

In the starting position of the module zone 247, there are three (3) bars in a width range 4.5 times as great as one module width. Those three bars constitute a type discerning character, which represents one of the types of the photo film. For the 120-type roll photo film, the type discerning character is defined "001" and represented by a narrow black bar 251, a narrow white bar 252 and a wide black bar 249 in the order listed. For the 220-type roll photo film, the type discerning character is defined "100". Consequently it is possible according to the type discerning character to detect which of the 120 and 220 types the roll photo film is, and whether the roll photo film has backing paper behind the photo filmstrip. Note that a reference numeral 250 designates a wide white bar.

The remaining part of the module zone 247 constitutes a plurality of characters, which represent information of the photo film type, the number of the available frames, the photo film sensitivity and the like.

Figure 28:
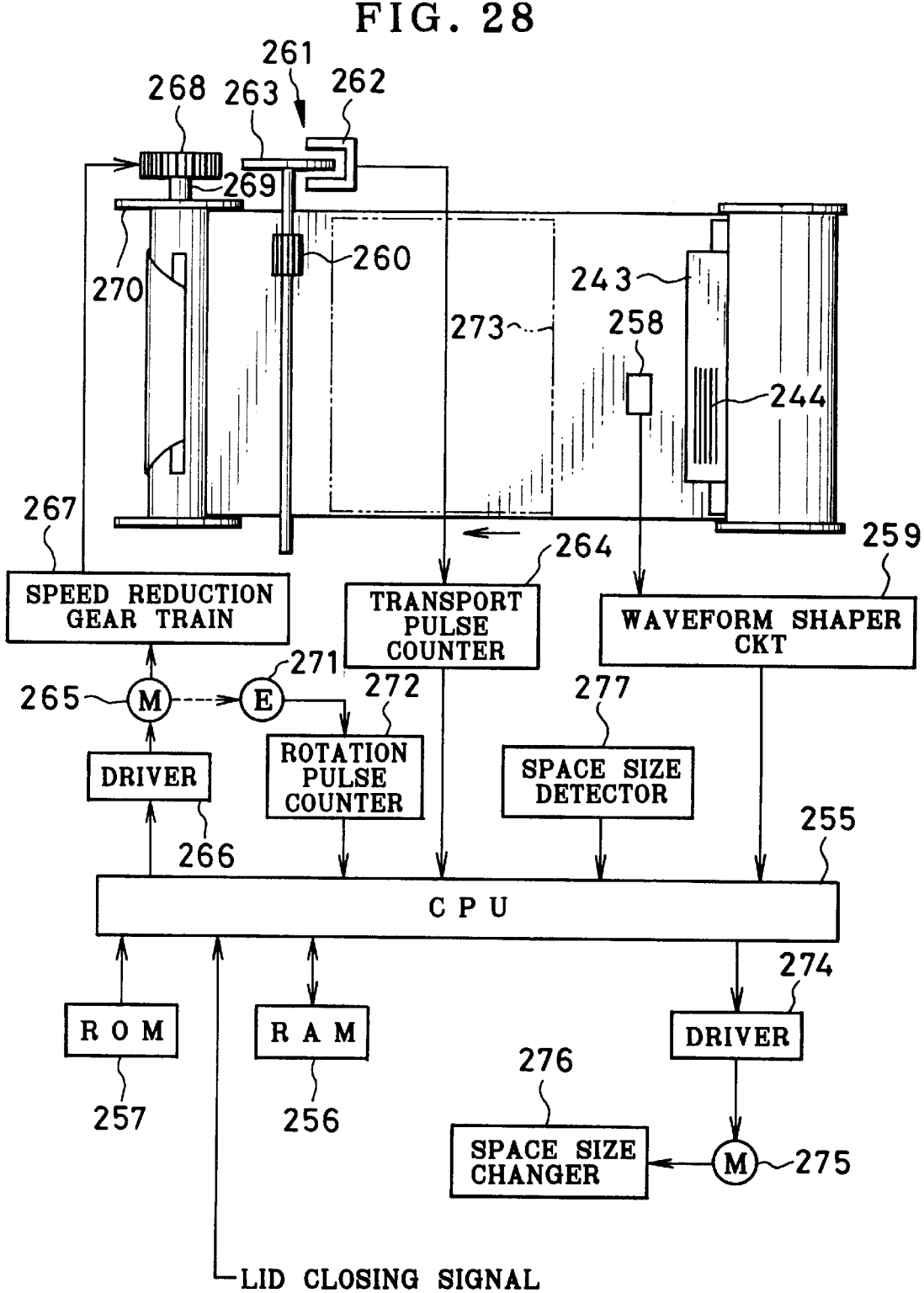
FIG. 28 is an explanatory view in an elevation and a diagram, illustrating another preferred camera for use with the roll photo film.

In FIG. 28, there are a RAM 256 and a ROM 257, both of which are connected to a CPU 255 as controller of the camera. RAM 256 stores information of the photo film type, the photo film sensitivity, the photo film status of monochromatic or color and negative or reversal, and the number of available frames, all of which have been read. ROM 257 stores a program for control in various sequences. CPU 255 controls various components of the camera according to the program stored in ROM 257, and recognizes the information of the bar code 244, including the photo film type, the photo film sensitivity, the photo film status of monochromatic or color and negative or reversal, and the number of available frames.

A photo sensor 258 as bar code reader generates a photoelectric signal, which is sent to a waveform shaper circuit 259 included in the bar code reader. The waveform shaper circuit 259 shapes the photoelectric signal by use of a suitably determined threshold level into a reflection signal at one of three levels. The reflection signal has the Low (L) level if the photo sensor 258 detects the backing paper 241, the leader sheet 330 and the black bars. The reflection signal has the High (H) level if the photo sensor 258 detects the white bars and the first quiet zone 246 and the second quiet zone 248.

When the photo filmstrip 242, 332 is confronted with the photo sensor 258, then the waveform shaper circuit 259 generates the signal at an "M level", which is lower than the High level and higher than the Low level, because an emulsion surface of the photo filmstrip 242, 332 has a reflection factor higher than the backing paper 241, the leader sheet 330 and the black bars and lower than the white bars and the first quiet zone 246 and the second quiet zone 248. The reflection signal is sent to CPU 255 for detection of the photo filmstrip 242, 332 and reading of the bar code 244, 336.

A photo film transport encoder 261 is coupled with the shaft of a counter roller 260. The photo film transport encoder 261 includes an encoder disk or plate 262, a photo interrupter 263 and a pulse generator (not shown). The encoder disk 262 has a plurality of radially and regularly arranged slits or recesses, and is rotatable together with the shaft of the counter roller 260. The photo interrupter 263 monitors passage of the slits in the encoder disk 262. The pulse generator is connected to the photo interrupter 263, and generates an encode pulse upon detection of one of the slits at the photo interrupter 263. It is to be noted that a surface of the encode disk may have a pattern of portions of low reflection and high reflection instead of the slits or recesses. A reflection type of photo sensor may be used instead of the photo interrupter 263 to generate the encode pulse.

The photo film transport encoder 261 generates one encode pulse each time that the counter roller 260 makes rotation at a predetermined unit angle, or each time that the photo film is transported by a predetermined unit length. This is encode pulse is herein referred to as "transport pulse". There occur approximately 40 transport pulses when the photo filmstrip 242, 332 is moved by one frame. The transport pulses are sent to a transport pulse counter 264.

The transport pulse counter 264 measures a length by which the photo film is transported, and count a count value Cs. CPU 255 resets the count value Cs as zero (0). Each time that the transport pulse counter 264 receives an input of the transport pulse, the transport pulse counter 264 steps the count value Cs incrementally one by one. The count value Cs is sent to CPU 255 for the purpose of controlling the transport of the photo film both in the advancement and the rewinding.

A winder motor 265 for transporting of the photo film is controlled by CPU 255 and driven by a driver 266. Rotation of the winder motor 265 is transmitted by a speed reduction gear train 267 to a gear 268, which is disposed on the top of the photo film take-up chamber. A drive shaft 269 protrudes from the bottom of the gear 268, and rotates a take-up spool 270 in the winding direction.

A spool rotation encoder 271 is connected to the winder motor 265. The spool rotation encoder 271 is structurally the same as the photo film transport encoder 264. The spool rotation encoder 271 generates one encode pulse each time that the winder motor 265 makes rotation by a unit angle. This is encode pulse is herein referred to as "rotation pulse". There occur approximately 7 transport pulses when the photo filmstrip 3 is moved by one millimeter (1 mm) during movement of the connective tape 243 past the photo sensor 258. The spool rotation encoder 271 generates a sufficient number of rotation pulses for measurement of each bar of the bar code 244. The rotation pulses are sent to a rotation pulse counter 272.

The rotation pulse counter 272 is used to measure widths of the respective bars of the bar code 244, 336. CPU 255 resets a count value Cm of the rotation pulse counter 272 as zero (0). Each time that one rotation pulse is generated, CPU 255 steps up the count value Cm of the rotation pulse counter 272. The count value Cm is input to CPU 255. CPU 255 judges that a present one of the bars of the module zone 247 is either narrow or wide according to the count value Cm, to read the information of the bar code 244, 336.

Note that a roll diameter about the take-up spool 270 increases according to an increase of a length of the photo film being wound. There is no proportionality in the relationship between the number of the rotation pulses and the transported length of the photo film. However there is only a very small change in the roll diameter while the connective tape 243 is moved past the photo sensor 258. The relationship between the number of the rotation pulses and the transported length of the photo film can be approximated proportionally. It is possible to measure widths of the bars of the module zone 247 according to the number of the rotation pulses.

In short, a bar code reader is constituted by the combination of the photo sensor 258, the waveform shaper circuit 259, the spool rotation encoder 271, the rotation pulse counter 272 and CPU 255.

After CPU 255 receives the lid closing signal, the photo film is transported to set a first frame at an exposure aperture 273. When CPU 255 drives the winder motor 265 to start the photo film transport, the photo sensor 258 starts operation for detecting the connective tape 243. In the course of transport of the leader sheet or the leader portion of the backing paper, the connective tape 243 becomes present at the photo sensor 258. The first quiet zone 246 of the bar code 244 is confronted with the photo sensor 258 to change the reflection signal output by the waveform shaper circuit 259 from the "Low" level to the "High" level. Upon this change of the signal, CPU 255 judges that the connective tape 243 is present, and starts measuring the widths of the bars in the module zone 247 by effecting the bar code reading routine.

To measure the module width, the rotation pulse counter 272 is started in response to turning of the reflection signal to the "High" level. The count value Cm is incrementally stepped each time that the winder motor 265 rotates by the unit angle. Then a black bar comes present at the photo sensor 258, to change the reflection signal from the "High" level to the "Low" level. In response to this change, CPU 255 resets the count value Cm at zero (0), and continues counting the rotation pulses. The count value Cm is read upon next change of the reflection signal from the "High" level to the "Low" level. Again CPU 255 resets the count value Cm at zero (0), and restarts counting the rotation pulses. The count value Cm being read is first width data, which is written to RAM 256. The first width data depends upon the number of the rotation pulses generated while a first one of the black bars in the module zone 247 is moved past the photo sensor 258, and represents the width of the black bar.

Then a white bar becomes present at the photo sensor 258 to change the reflection signal from the "Low" level to the "High" level. In response to this CPU 255 reads out the count value Cm, and then resets the count value Cm as zero (0), to start counting the rotation pulses. The obtained count value Cm is written to RAM 256 as second width data. The second width data represents the width of the white bar. Similarly the count value Cm is read out each time that the reflection signal changes from the "High" level to the "Low" level, or from the latter to the former. The following width data including the third width data is written to RAM 256.

After the second quiet zone 248 moves past the photo sensor 258, the photo filmstrip becomes confronted with the photo sensor 258 to turn the reflection signal to the "M level". Then width measurement of the bars is finished. The count value Cm upon change of the reflection signal to the "M level" is not written to RAM 256. In this manner, the number of rotation pulses generated while each bar moves past the photo sensor 258 is written to RAM 256 as width data, to evaluate the widths of the bars.

After this CPU 255 evaluates to which the width data corresponds of narrow and wide bars, according to what is written to RAM 256, so that CPU 255 determines a logical value. The initial character as type discerning character includes one wide bar and two narrow bars. The total of the first, second and third width data is 4.5 times as great as width data of one narrow bar.

CPU 255 calculates "reference data" according to the total of the first, second and third width data. The "reference data" is the number of rotation pulses corresponding to an average of the width of one wide bar and the width of one narrow bar. CPU 255 compares the width data with the reference data, and obtains a logical value associated with the width data. If the width data is greater than the reference data, then CPU 255 sets the logical value "1" as an associated bar is wide. If the width data is smaller than the reference data, then CPU 255 sets the logical value "0" as an associated bar is narrow.

After evaluating the logical values, CPU 255 detects which of the 120 and 220 types the roll photo film is, according to the sequence of the logical values associated with the first, second and third width data. Similarly, CPU 255 detects one of the photo film statuses, the value of the photo film sensitivity, the number of the available frames.

The information of the bar code 244 being so detected, if there is no error in reading the bar code 244, CPU 255 writes the photo film type and other information to RAM 256.

Then CPU 255 causes a driver 274 to drive a motor 275. The motor 275 actuates a space size changer 276 for changing the space size of the photo film passageway. The space size changer 276 is caused to set the space size in accordance with the photo film type being detected. A region for the first frame on the photo film has not yet reached the exposure aperture 273, so that the change of the space size is harmless before the reach of the frame. Note that the reading of the bar code 244 may be during a winding operation of the leader sheet or leader portion before closing the back lid.

A space size detector 277 detects the space position of the photo film passageway, and generates a set finish signal when the photo film passageway is exactly set at the space size corresponding to the photo film type. When CPU 255 receives the set finish signal from the space size detector 277, CPU 255 stops the motor 275.

When the reflection signal of the "M" level is sent to CPU 255, CPU 255 detects that the photo film has reached the photo sensor 258. CPU 255 resets the count value Cs at zero (0) for photo film transportation enough to set a first frame at the exposure aperture 273, before the transport pulse counter 264 is caused to count.

The counter roller 260 is rotated by the photo film being transported. The transport pulse is generated each time that the photo filmstrip is transported by the unit length, to step the count value Cs incrementally.

CPU 255 monitors the count value Cs of the transport pulse counter 264. When the count value Cs comes up to a preset value C1, CPU 255 stops the winder motor 265 to stop transporting the photo film. The value C1 is defined as the number of the transport pulses generated in the period beginning upon reach of the photo film to the photo sensor 258 and ending upon setting of the first frame at the exposure aperture 273. The value C1 is previous determined in the course of the manufacture. This being so, the first frame is set at the exposure aperture 273.

It is possible to construct the space size changer 276 by use of any of the mechanisms depicted in FIGS. 17, 20 and 23. In FIG. 17, the solenoid 181 corresponds to a changer drive device constituted by the motor 275 and the driver 274. In FIGS. 20 and 23, the motor 195 corresponds to the changer drive device. If the motor 195 is used, the space size of the photo film passageway cannot be changed during the photo film transport. The space size may be changed immediately after setting a first frame.

Examples of the space size changer 276 described with reference to FIG. 28 can be the constructions described by referring to FIGS. 3, 8 and 12. The selector members or dials in those drawings may be eliminated, while a motor, a solenoid or other drive devices can be used instead. Examples of the space size detector 277 can be the combination of the brush 215 and the patterned plate 216 of FIG. 20, and can be other suitable structures known in the art of camera.

In general, the photo film is wound continuously after taking a final exposure. The entirety of the photo film including the backing paper is wound about the take-up spool. There is no rewinding operation in any Brownie camera. However it is possible to use the present invention in a camera in which the photo film is wound back about the initial spool after taking a final exposure to the photo filmstrip. Such a camera incorporates a rotatable take-up spool in a photo film take-up chamber. It is unnecessary to use a single-use take-up spool which would require being exchanged.

Note that the bar code in the present invention is not limited to that depicted in FIG. 27. Bar codes of other forms may be used. Also the widths of the bars may be measured by counting transport pulses generated by the transport encoder. For this operation, it is necessary to heighten the resolving power of the transport encoder to measure the width of each narrow bar precisely, to heighten the number of transport pulses generated per unit length of transporting the photo film. Also it is possible on the photo film to prerecord two lines including the bar code and clock marks arranged at a constant pitch. Two photo sensors may be used to detect the bar code and the clock marks at the same time, so that the bar widths may be measured upon detection of each of the clock marks.

Another preferred embodiment is described now, in which photo film type is detected from a bar code on the photo film, and an in-focus position of a taking lens is compensated in consideration of a difference in thickness of the photo film.

Figure 29:
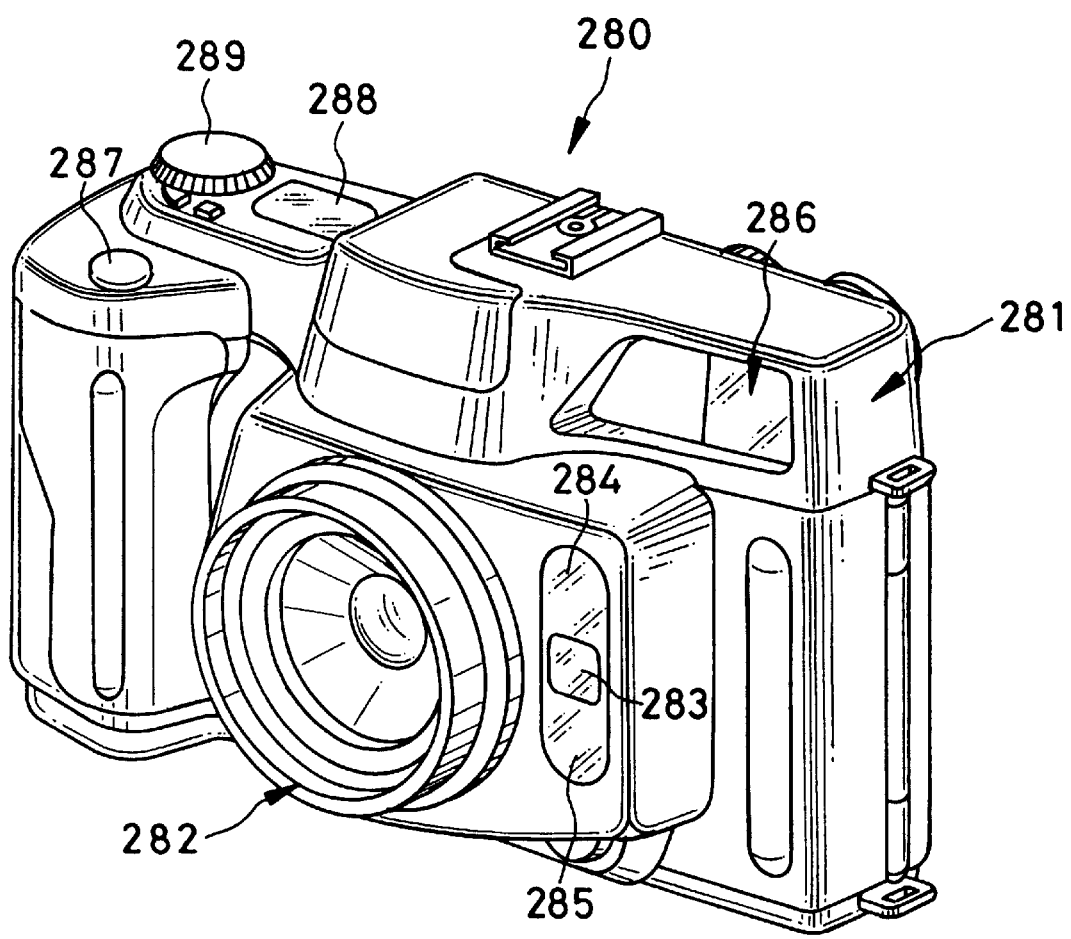
FIG. 29 is a perspective illustrating still another preferred camera.

In FIG. 29, a camera 280 has a camera body 281, in which there are a taking lens or lens optical system 282, a photometric window 283, rangefinding windows 284 and 285 and a viewfinder 286. The taking lens 282 has a focal length of 60 mm. The photometric window 283 operates for control of exposure. The rangefinding windows 284 and 285 are included in an auto-focussing (AF) unit. A top of the camera body 281 has a shutter release button 287, a liquid crystal display (LCD) panel 288 and a dial 289. The LCD panel 288 indicates various kinds of information required for taking an exposure. The dial 289 is rotatable to step up and down each of values of various relevant parameters.

The taking lens 282 is moved to an in-focus position corresponding to an object distance of a targeted object measured through the rangefinding windows 284 and 285. The shutter release button 287 is depressible to both a halfway position and a fully depressed position deeper than the halfway position, and when depressed to the halfway position, causes operations of rangefinding and photometry to be effected, and when depressed to the fully depressed position, causes an exposure to be taken. Also the shutter release button 287 is a manual operable button for commanding an operation of a first frame setting.

In the present embodiment, the photo film passageway in the camera is not changeable in the space size. The photo film passageway is originally determined with a space size defined by the greater thickness of the 120-type roll photo film. The pressure plate of the present camera is disposed in a stationary manner with its front surface positioned between the above-described two positions including the one for the 120-type photo film and the other for the 220-type photo film.

Figure 30:
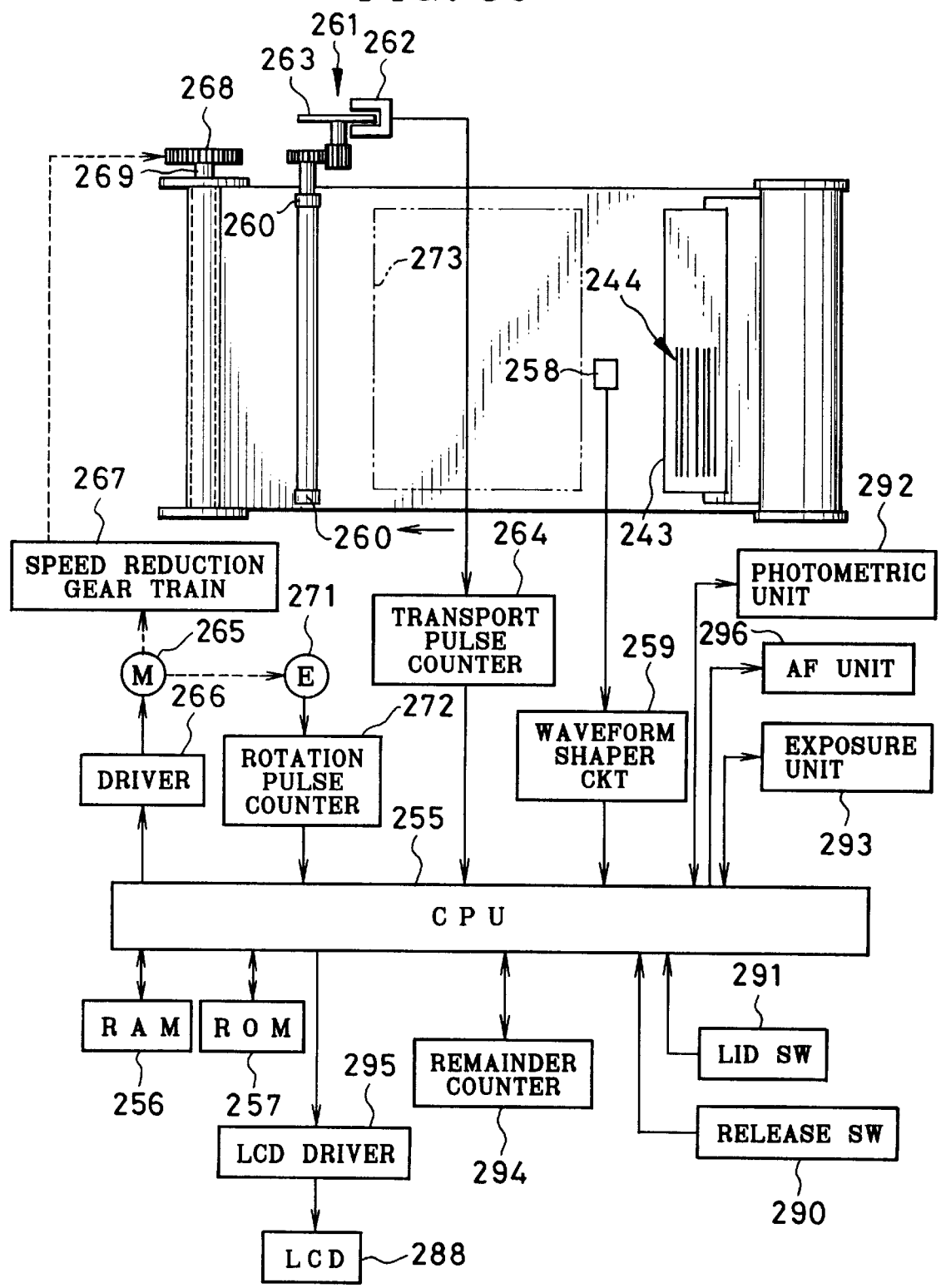
FIG. 30 is an explanatory view in an elevation and a diagram, illustrating the camera of FIG. 29.

A release switch 290 of FIG. 30 is associated with the shutter release button 287. The release switch 290 is actuated in response to depression of the shutter release button 287. When the shutter release button 287 is depressed to the halfway position, the release switch 290 generates a halfway depressed signal. When the shutter release button 287 is depressed to the fully depressed position, the release switch 290 generates a fully depressed signal. The halfway and fully depressed signals are sent to CPU 255. Note that the halfway and fully depressed signals are herein referred to commonly as a release signal, typically when no difference between them is required. In FIG. 30, elements similar to those depicted in FIG. 28 are designated with identical reference numerals.

A lid switch 291 is turned on and off upon opening and closing operations of the back lid of the camera 280, and generates an opening/closing signal. The opening/closing signal is at a "Low" level when the back lid is open, and at a "High" level when the back lid is closed. The opening/closing signal is sent to CPU 255 for detection of the open/closed states of the back lid.

A photometric unit 292 measures brightness of the targeted object by use of a photometric sensor disposed inside the photometric window 283, and sends a result of the measurement to CPU 255. CPU 255 calculates a light value according to the measured brightness and the photo film sensitivity, to determine an optimized exposure amount.

An exposure unit 293 is constituted by a set of aperture stop blades, a shutter blade, an aperture stop mechanism and a shutter mechanism. The set of the aperture stop blades are incorporated in the taking lens 282. The aperture stop mechanism and the shutter mechanism are combinations of a motor and circuits for driving respectively the set of the aperture stop blades and the shutter blade. Values of the aperture stop and the shutter speed are set in the exposure unit 293 according to the exposure amount determined in CPU 255. When the shutter release button 287 is depressed fully, the exposure unit 293 actuates the aperture stop mechanism and the shutter mechanism, to expose the photo film with the aperture stop value and the shutter speed as determined. Each time after taking one exposure in a frame, the exposure unit 293 sends an exposure finish signal to CPU 255.

A remainder counter 294 counts the number of remaining ones of the available frames. As an initial count value of the count value Cf of the remainder counter 294, the number of the available frames detected by reading the bar code 244 is set. Each time after taking one exposure, the count value Cf is decrementally stepped. Note that RAM 256 may be used for counting the remaining frames instead of using the remainder counter 294. Moreover that RAM 256 may be used for counting the transport pulses and the rotation pulses instead of using the transport pulse counter 264 and the rotation pulse counter 272. An LCD driver 295 is controlled by CPU 255, and causes the LCD panel 288 to indicate values of the aperture stop, the number of the remaining available frames, the photo film type of the loaded photo film, and other information.

Figure 31:
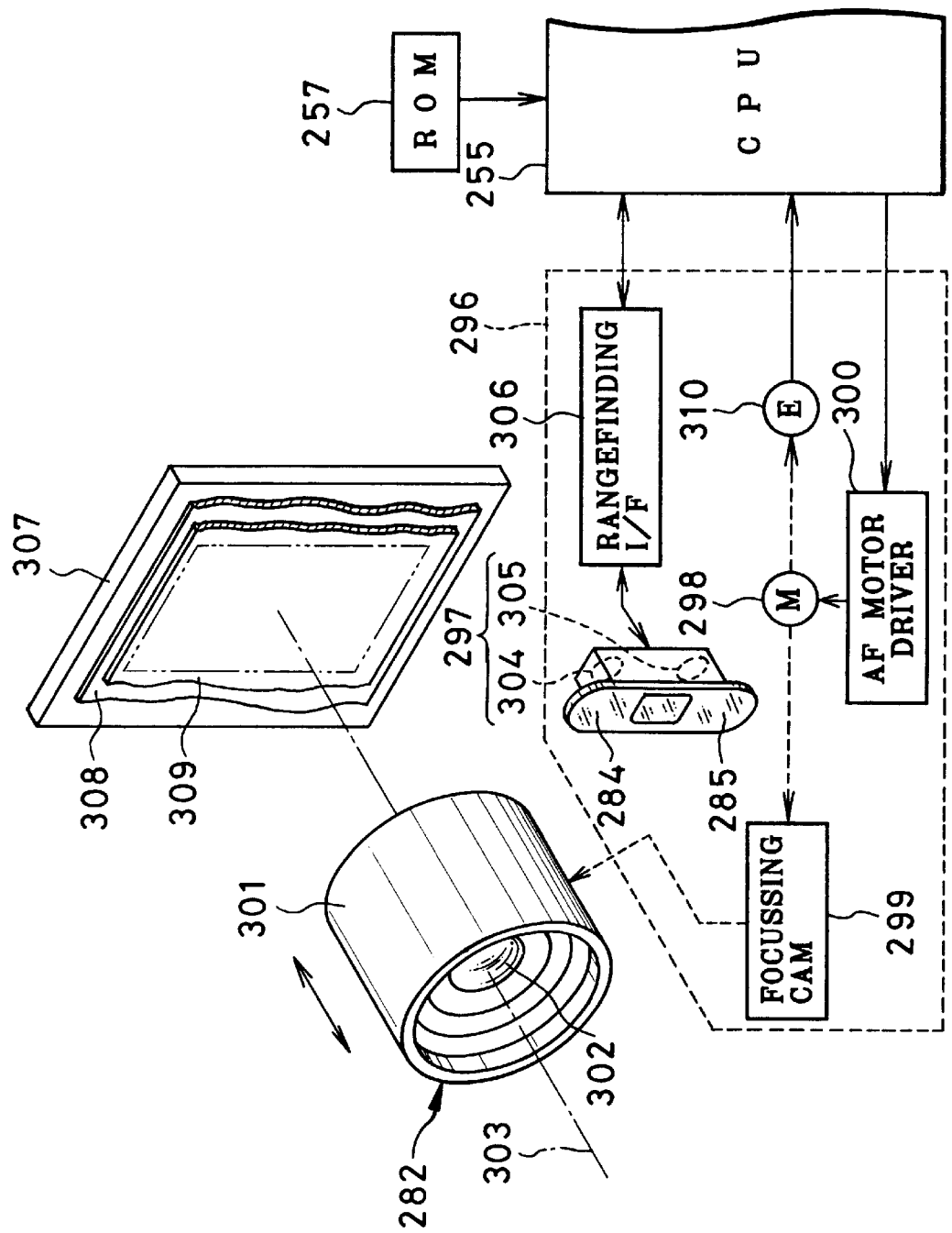
FIG. 31 is an explanatory view in perspective, illustrating a taking lens and a structure for rangefinding.

In FIG. 31, an auto-focussing (AF) unit 296 is constituted by a rangefinding unit 297, an auto-focussing (AF) motor 298, a focussing cam 299 and a motor driver 300. The rangefinding unit 297 is disposed inside the rangefinding windows 284 and 285. The taking lens 282 is constituted by a lens barrel 301 and plural lens elements 302 arranged inside the lens barrel 301. The taking lens 282 is a well-known unitedly advancing type in which the combination of all the lens elements 302 is advanced simply by moving the lens barrel 301 for the purpose of focussing.

The focussing cam 299 is associated with the lens barrel 301. The motor driver 300 is controlled by CPU 255, and drives the AF motor 298 to rotate it in both directions, forward and reverse. The rotation of the AF motor 298 is transmitted to the focussing cam 299, which moves the lens barrel 301 forwards and rearwards, straight on a photographic optical axis 303 of the taking lens 282. Accordingly an advancing amount of the taking lens 282 is changed.

The rangefinding unit 297 is an infrared active type known in the art of camera. A light-emitting element 304 of the rangefinding unit 297 projects an infrared beam through the rangefinding window 284 forwards from the camera body 281 at a suitable angle. The beam is reflected by a targeted object, and received by a light-receiving element 305 through the rangefinding window 285. The rangefinding unit 297 photoelectrically generates a rangefinding signal at a signal level corresponding to a beam incidence position of the reflected beam on the light-receiving element 305, namely an incidence angle of the reflected beam. The rangefinding signal is converted by a rangefinding interface (I/F) 306 into rangefinding data according to the signal level, so that the rangefinding data is sent to CPU 255.

In the camera 280, a pressure plate 307 is stationary. A position of an emulsion surface of a photo filmstrip 309 differs according to types of the roll photo film, and depends on existence and lack of backing paper 308. In calculating an object distance of the object, CPU 255 initially obtains a distance between the object and a virtually defined reference focal plane in accordance with the rangefinding data, before CPU 255 calculates the advancing amount of the taking lens 282 according to the obtained object distance. The advancing amount is compensated by use of a compensating amount associated with the type of the photo film as detected by reading the bar code 244. An image of the targeted object is sharply created on the photo film without changing the space size of the photo film passageway.

A first compensating amount associated with the 220 type is stored in ROM 257, which also stores a second compensating amount associated with the 120 type. The first and second compensating amounts are predetermined in consideration of the position of the pressure plate 307, the thickness of the backing paper 308 and the like. The first compensating amount is "+0.1 mm", and is used for raising the advancing amount of the taking lens 282 by 0.1 mm, or shifting the taking lens 282 toward the targeted object. The second compensating amount is "−0.2 mm", and is used for lowering the advancing amount of the taking lens 282 by 0.2 mm, or shifting the taking lens 282 toward the photo film.

Note that the advancing amount of the taking lens 282 is an amount of moving from a home position of the taking lens 282. The home position is predetermined in such a manner that the taking lens 282 stopped in the home position can focus an object located at a distance of infinity at the above-described reference focal plane.

An encoder 310 is connected to the AF motor 298, and generates an encode pulse each time the drive shaft rotates by a predetermined angle. CPU 255 counts the number of the pulses from the encoder 310, and detects the advancing amount of the taking lens 282 with reference to a home position, to control rotation of the AF motor 298.

The operation of the present embodiment is described now by referring to FIGS. 32–35. CPU 255 unceasingly executes the main routine of FIG. 33. CPU 255 monitors the release signal and the opening/closing signal, and checks changes in those signals. After loading of the photo film, the back lid is closed. In response to this the opening/closing signal from the lid switch 291 is changed from the "Low" level to the "High" level. CPU 255 sets an FFS command in an inner register for the purpose of the first frame setting.

After the back lid is closed, the user depressed the shutter release button 287 either to the halfway position or to the fully depressed position. Responsively a release signal from the release switch 290 is sent to CPU 255. CPU 255 executes a release operation.

Figure 34:
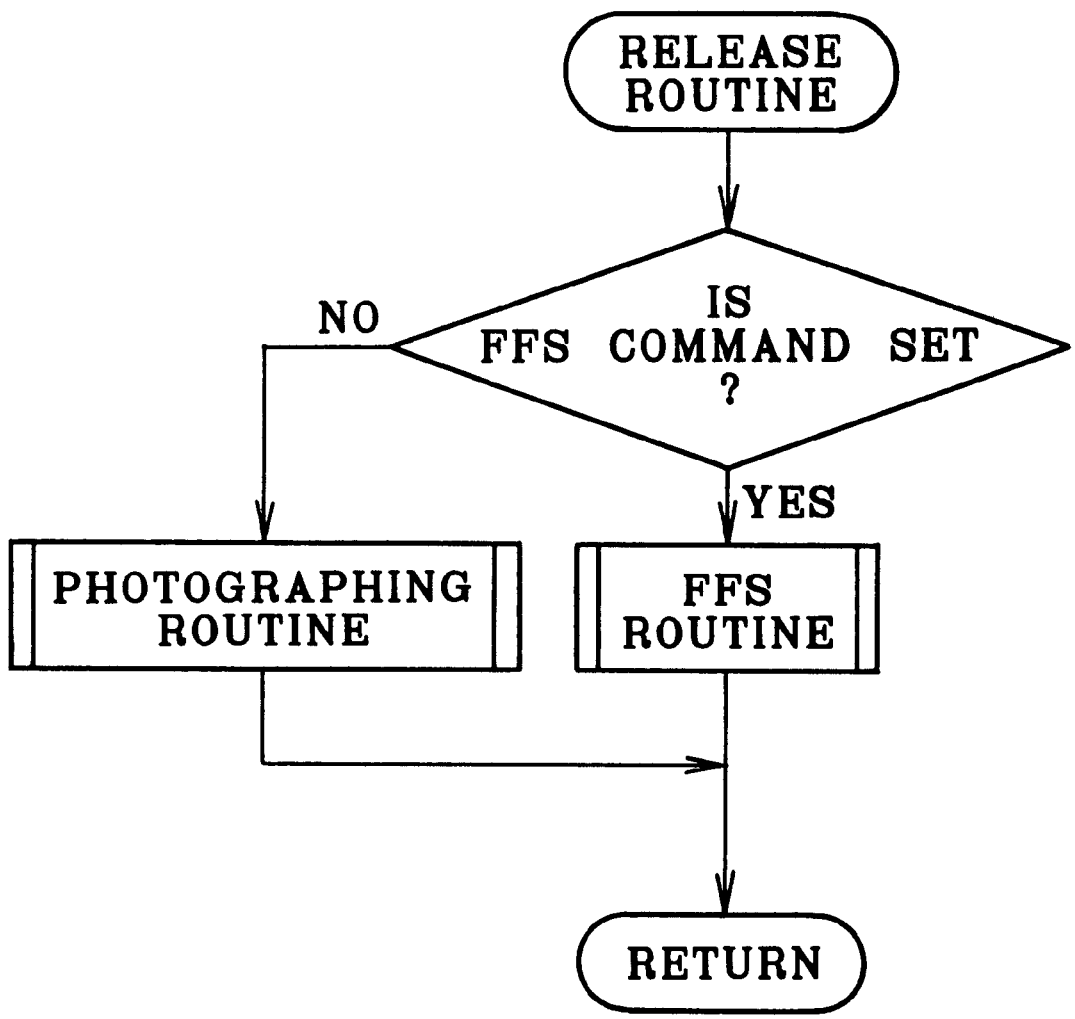
FIG. 34 is a flow chart illustrating a release routine.
Figure 35:
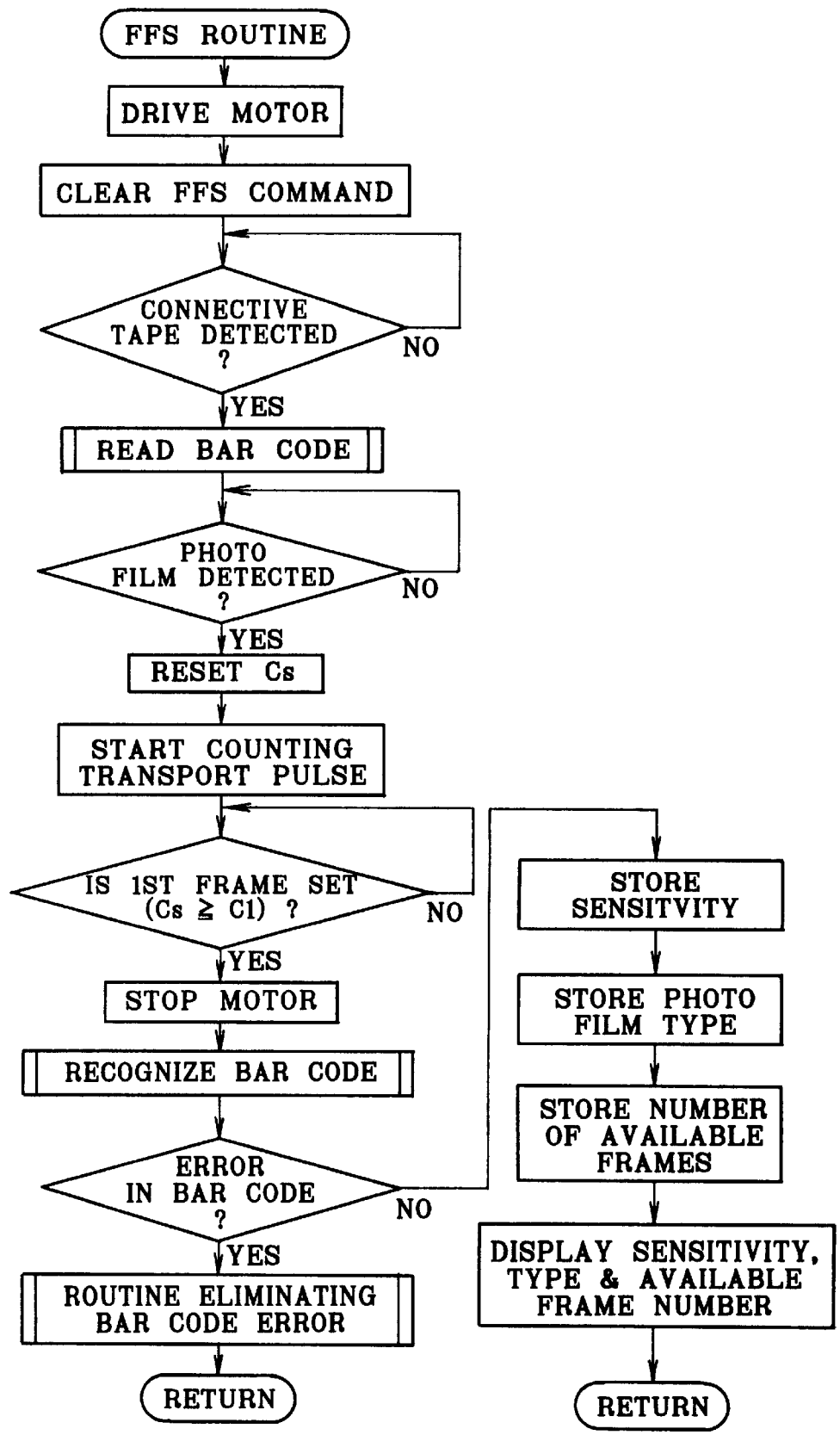
FIG. 35 is a flow chart illustrating an FFS routine for detecting information from a bar code.

In the release routine of FIG. 34, at first it is checked whether the FFS command is set in the inner register. As noted above, the FFS command has been set in the inner register since the back lid is closed. CPU 255 executes the FFS routine depicted in FIG. 35 without executes the photographing routine. Note that the FFS routine may be executed immediately after closing of the back lid, without receiving the release signal.

In the FFS routine, at first CPU 255 drives the motor 265. Then the FFS command in the inner register is cleared, so that a photographing routine will be effected upon next depression of the shutter release button 287. Rotation of the motor 265 is transmitted to the gear 268 by the speed reduction gear train 267. The take-up spool is rotated in the winding direction, to wind the photo film.

When the photo film starts being advanced, CPU 255 causes the photo sensor 258 to read the bar code 244 from the connective tape 243, and writes data of the bar code 244 to RAM 256. CPU 255 stops the motor 265 on the basis of the signal received the transport pulse counter 264, and controls the photo film to set its first frame on the exposure aperture 273.

After the motor 265 is stopped, CPU 255 determines the photo film type according to the data written in RAM 256. The bar code 244 being read, CPU 255 writes photo film sensitivity, the number of available frames and other information to RAM 256. The available frame number is set in the remainder counter 294 as an initial count value. Thereafter the LCD panel 288 is caused to display the photo film sensitivity, the photo film type, the available frame number. Now operation of the first frame setting is finished, with a first frame standing by for an exposure.

If there is failure in properly reading the bar code, then CPU 255 causes the LCD panel 288 to display an error to inform the user of the occurrence of the error. The user is enabled to exchange the photo film, before he operates the camera again for the first frame setting as described above. Note that it is possible to construct the dial 289 to input the photo film sensitivity, the photo film type and the number of the available frames.

Figure 32:
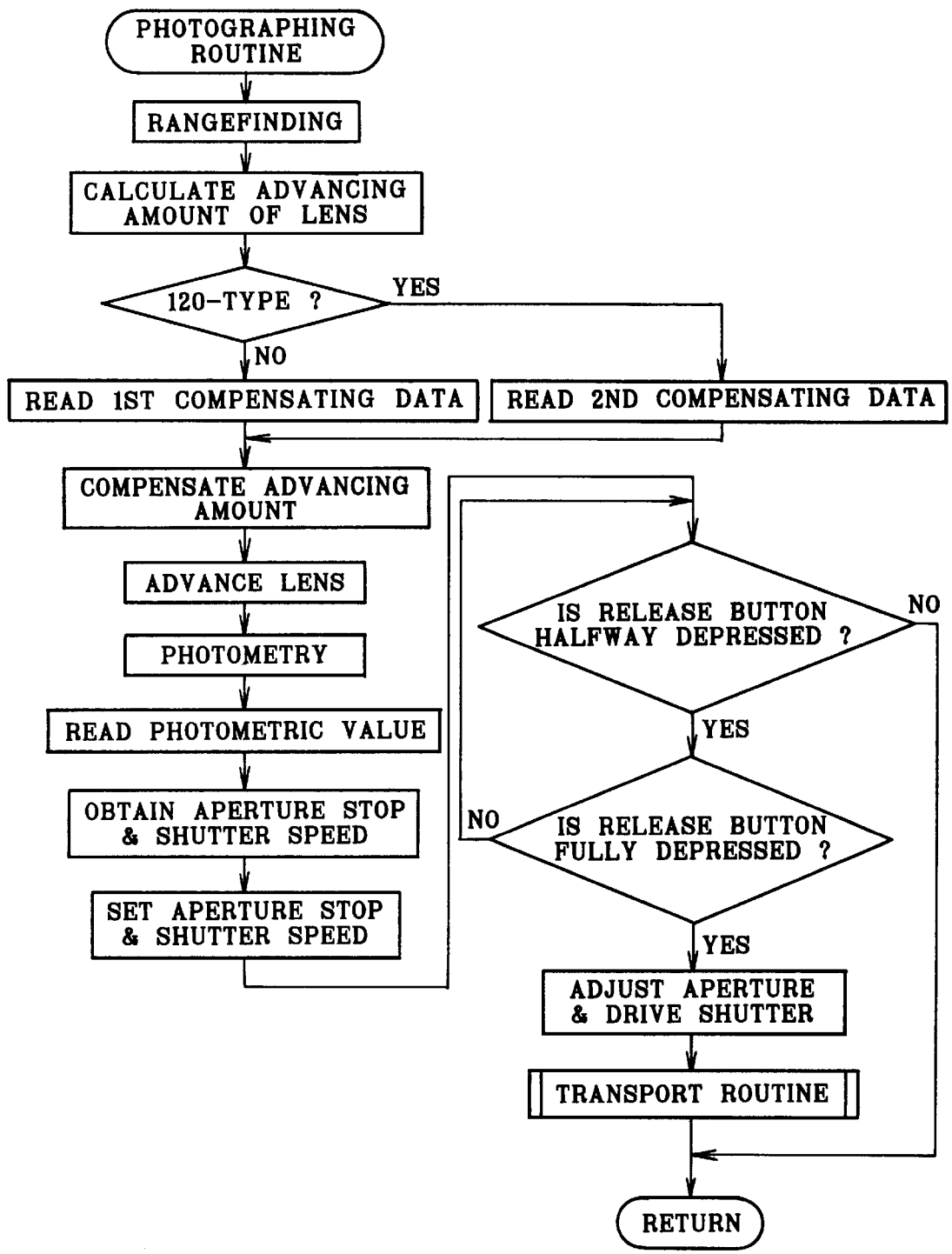
FIG. 32 is a flow chart illustrating a photographing routine of the camera.
Figure 33:
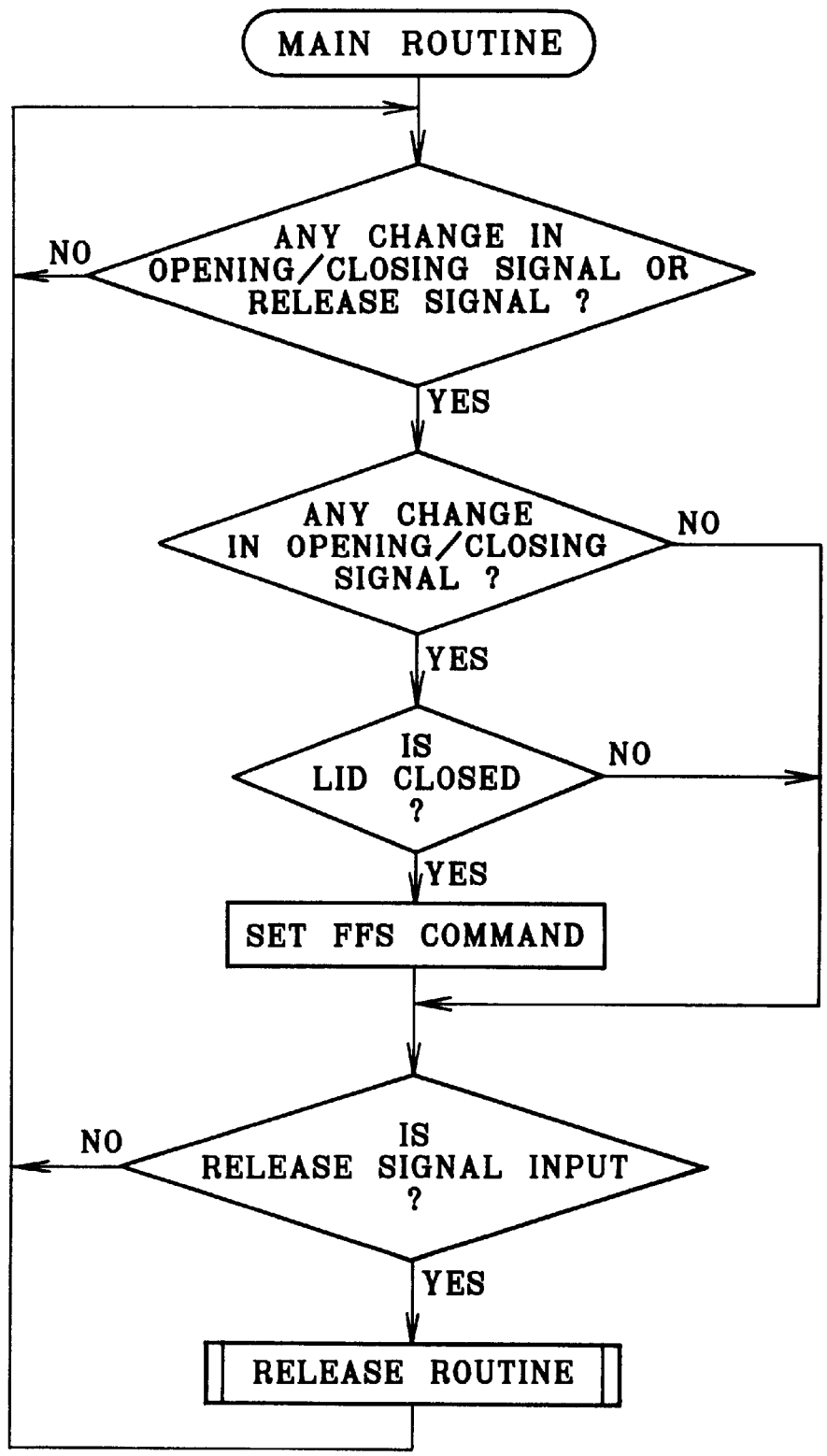
FIG. 33 is a flow chart illustrating a main routine.

After finishing setting the first frame, the user targets a targeted object through the viewfinder 286, frames a photographic field of view, and depresses the shutter release button 287 to take an exposure. Upon depression of the shutter release button 287 to the halfway position, the photographing routine of FIG. 32 is started.

CPU 255 causes the rangefinding unit 297 to operate via the rangefinding I/F 306. The light-emitting element 304 of the rangefinding unit 297 projects an infrared beam, which is reflected by the targeted object, and comes incident upon the rangefinding window 285. The incidence angle of the reflected beam at the rangefinding window 285 changes and depends on the object distance. If the incidence angle differs, the position of incidence upon the light-receiving element 305 differs, and is detected as photoelectric signal.

As the light-receiving element 305 photoelectrically generates the rangefinding signal at a signal level corresponding to a beam incidence position of the reflected beam on the light-receiving element 305, the rangefinding signal in accordance with the object distance is sent to the rangefinding I/F 306, which converts the rangefinding signal into rangefinding data, which is sent to CPU 255. CPU 255 obtains an object distance or distance between the object and a reference focussing plane according to the rangefinding data, and calculates an advancing amount by which the taking lens 282 should be advanced from its home position in accordance with the object distance.

Then CPU 255 evaluates which of the 120 and 220 types the loaded roll photo film is, in accordance with the type information written in RAM 256. The first or second compensating data associated with the selected one of the two types is read from ROM 257. The compensating data being read is used to compensate the above-described advancing amount.

Let the advancing amount calculated as "+4 mm" for the taking lens 282 according to the rangefinding of the rangefinding unit 297. If the 120-type roll photo film is used, the second compensating data is used for considering the compensating amount "−0.2 mm". Consequently the advancing amount of the taking lens 282 is "+3.8 mm". If in turn the 220-type roll photo film is used, the first compensating data is used for considering the compensating amount "+0.1 mm". Consequently the advancing amount of the taking lens 282 is "+4.1 mm".

After compensating the advancing amount, CPU 255 causes the motor driver 300 to drive the AF motor 298, to move the lens barrel 301 forwards. If the targeted object is located at the distance of infinity and if the 120-type roll photo film is loaded, then the compensated advancing amount is negative. In response to this the lens barrel 301 is moved backwards.

While the AF motor 298 is driven, CPU 255 counts the number of the encode pulses from the encoder 310. Upon the reach the encode pulse number to a value according to the advancing amount compensated in the above-described manner, the AF motor 298 is stopped. Then the taking lens 282 is stopped at the position of the compensated advanced amount. An image of the targeted object, which is located at its position measured by the rangefinding unit 297, is focussed on the emulsion surface of the photo filmstrip 309 set on the pressure plate 307.

After the taking lens 282 is advanced, CPU 255 actuates the rangefinding unit 297. According to the photometric result of the rangefinding unit 297, an optimized combination of the aperture stop and the shutter speed is calculated by CPU 255, which sets those values to the exposure unit 293. Then the shutter release button 287 is depressed to the fully depressed position, to cause the exposure unit 293 to take an exposure. If the shutter release button 287 stops being depressed only after depression to the halfway depressed position, the camera is in a standby state for exposing the first frame.

After taking an exposure to the first frame, the exposure finish signal is sent to CPU 255. In response to this the motor 265 is driven to transport the photo film by one frame, so that a second frame is set in the exposure station. A second exposure is taken in a similar manner.

This being so, the photo film type is discerned according to the information detected by reading the bar code. The in-focus position of the taking lens 282 is adjusted according to one of the two thicknesses of the photo film. There is no need of changing over the position of the pressure plate or the photo film rails and no need of changeability of the photo film passageway in a thickening or narrowing manner. An image of the targeted object can be focussed and photographed on the emulsion surface of the photo film even with the two different positions lying on the optical axis 303.

In the above embodiment, the bar code is read to input the photo film type to the camera. Alternatively the photo film type may be input by a manual operation. The above embodiment still has an advantage in heightening efficiency in the inputting operation and avoiding errors in the input information by automating the inputting operation of the photo film type with the bar code. Moreover, other signaling structures may be used instead of the bar code, including a notch formed in the roll photo film, an electrically connecting point disposed on the roll photo film, an optically readable indicia prerecorded on the roll photo film. A sensor of the camera may detect such structures, to input information of the photo film type, namely information of a position of the emulsion surface of the photo film. For example, existence or lack of a train of numbers, which are prerecorded on the rear of the backing paper of the roll photo film for the purpose of frame counting, may be detected. The number train exists on the 120-type roll photo film, in contrast with the 220-type roll photo film lacking the number train. For this operation, the back lid of the camera can have a detector confronted with the rear of the backing paper.

In the above embodiment, the taking lens is of the unitedly advancing type. Of course other types of taking lens in combination of a movable lens group and a stationary lens group may be used. Such types include an inner focussing type, a rear focussing type and a front-lens-group-rotating type. If the compensating amount is changed for the purpose of focussing an object image on the photo film surface in accordance with the object distance, it is preferable to use a set of compensating amounts preset for respective photo film types and for various stepwise values of the object distance. Such a set of the compensating amounts can be prepared in a form of table data. Of course it is possible alternatively to calculate the compensating amount according to equations preset for the photo film types and the object distance.

Instead of the infrared active type, the rangefinding unit of the present invention may be an active type by use of ultrasonic waves, or a passive type. Also auto-focussing may be effected by a device of focus detecting type, examples of which are a phase difference detecting type and a contrast detecting type. For this construction, object light passed through the taking lens can be detected by a sensor of the phase difference detecting type. The taking lens can be moved to a position determined in-focus according to a result of the detection of the sensor. Thereafter the taking lens can be shifted by the compensating amount depending on the photo film type, shortly before the shutter is released.

In the above embodiments, the compensated advancing amount of the taking lens compensates differences in the position of the photo film surface depending upon existence and lack of the backing paper or the thicknesses of the photo film. Furthermore the compensated advancing amount of the taking lens can compensate differences in the position of the photo film surface depending upon errors in the position of the pressure plate, or unexpected irregular forms of a sheet photo film holder or holder for supporting a sheet photo film, assuming that the camera is adapted to photography with sheet photo film. For example, EEPROM can be used, in which compensating amounts for advancing amounts of the taking lens may be stored in the course of manufacturing the camera. The compensating amounts can be previously obtained according to errors in the position of the pressure plate. It is therefore possible to eliminate complicated operation of keeping high precision in positioning the pressure plate being in the course of the manufacture. If a photo film holder should have a flexible characteristic of inevitable changes in the position of the photo film surface, such changes in the position can be absorbed.

Figure 36:
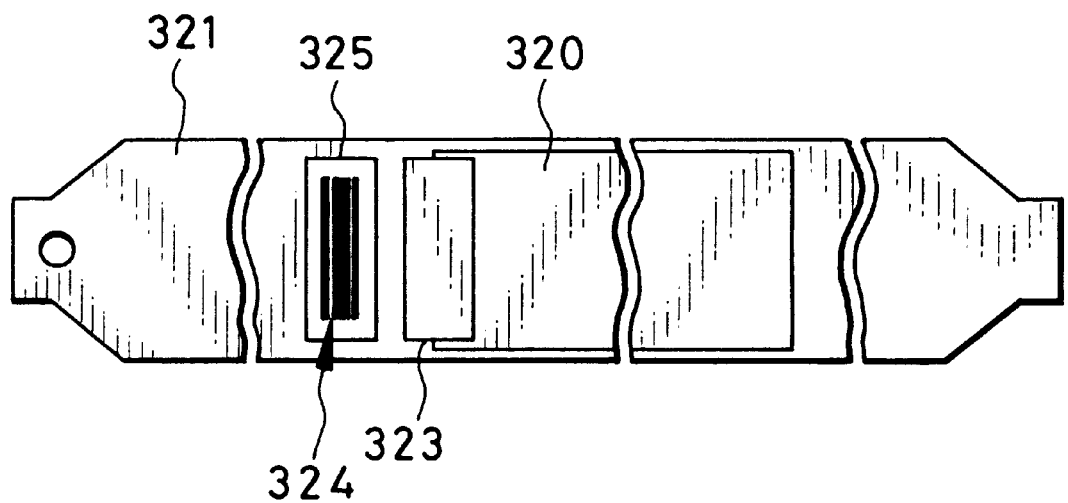
FIG. 36 is a plan, partially broken, illustrating another preferred arrangement of a bar code disposed on an additional tape.
Figure 37:
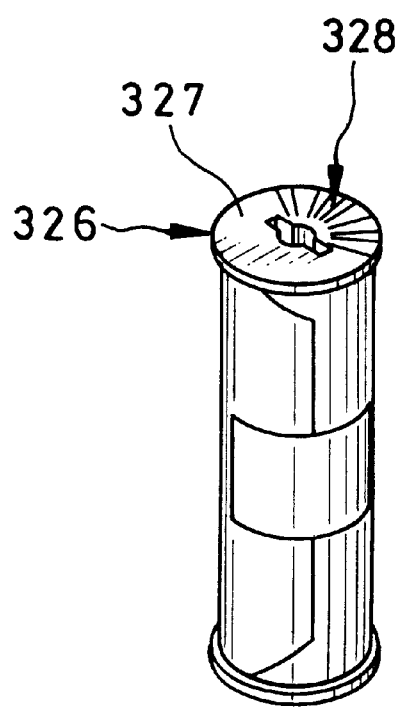
FIG. 37 is a perspective illustrating an embodiment in which a spool has a bar code associated with the roll photo film.

In the above embodiments, the bar code is printed on the connective tape. Alternatively a tape 325 having a bar code 324 of FIG. 36 may be added to backing paper 321. The tape 325 is disposed in a position between a front end of the backing paper 321 and an adhesive connective tape 323 connecting a photo filmstrip 320 with the backing paper 321. Furthermore the bar code 324 may be printed directly to the backing paper 321 in the position of the tape 325. In FIG. 37, a rotary bar code 328 may be arranged on a flange 327 of a spool 326 in a radial manner. A camera with this bar code can have a photo sensor disposed on a top wall of a photo film supply chamber. While the spool 326 rotates, the photo sensor can read the bar code 328.

In the above embodiments, the 120- and 220-type roll photo films are different in thickness only because of existence and lack of backing paper. Also a camera of the present invention may be used for two or more types of non-paper-backed photo films of strips of which a back-to-front thickness is different. In the above embodiment, the camera is a Brownie type and the roll photo film is either the 120 type or the 220 type. Of course the present invention is applicable to any type of camera and any type of photo film. Examples of the alternative photo film are 135 type and sheet film of 4×5 inches.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera loadable with a roll photo film of a paper-backed type and a non-paper-backed type, said paper-backed type including a photo filmstrip, and light-shielding backing paper overlaid on said photo filmstrip, and having a leader portion protruded from a front end of said photo filmstrip and a trailer portion protruded from a rear end of said photo filmstrip, said paper-backed type being wound about a spool with said trailer portion wound inwards, and said non-paper-backed type including a photo filmstrip, a light-shielding leader portion connected to a front end of said photo filmstrip, and a light-shielding trailer portion connected to a rear end of said photo filmstrip, said non-paper-backed type being wound about a spool with said trailer portion wound inwards, said camera comprising:

a camera body, having a photo film supply chamber and a photo film take-up chamber, said photo film supply chamber being loaded with said roll photo film, said photo film take-up chamber adapted to winding of said roll photo film after being exposed;

an exposure aperture, disposed between said photo film supply chamber and said photo film take-up chamber, for exposing said roll photo film;

a pair of rails, disposed along respective two edges of said exposure aperture extending substantially horizontally, for contacting sides of an emulsion surface of said roll photo film;

a pressure plate for contacting a back of said roll photo film to position said roll photo film on a rear of said exposure aperture, said pressure plate being disposed behind said exposure aperture to define a photo film passageway between said pressure plate and said rails;

an external selector, disposed on an outside of said camera body, for selecting one of said paper-backed type and said non-paper-backed type; and moving means, actuated by a shift of said external selector, for moving a set of said rails, relative to said camera body, toward or away from said pressure plate, wherein said moving means sets said photo film passageway at a first space size when said paper-backed type is selected, and sets said photo film passageway at a second space size when said non-paper-backed type is selected, said second space size being narrower than said first space size.

2. A camera as defined in claim 1, further comprising a back lid, mounted behind said camera body in an openable manner, said pressure plate being mounted on said back lid.

3. A camera as defined in claim 2, further comprising a rail member disposed behind said camera body, said rails being disposed on a rear of said rail member;

wherein said moving means moves said rail member toward or away from said pressure plate.

4. A camera as defined in claim 3, wherein said moving means includes:

plural through holes, formed through a rear wall of said camera body;

plural rod portions, disposed to project from a front of said rail member, inserted respectively in said through holes, and slidable between protruded and retracted positions, wherein said rail member is moved toward said pressure plate when rod portions are in said protruded position, and moved away from said pressure plate when rod portions are in said retracted position; and a rod slider for sliding said rod portions in response to a shift of said external selector.

5. A camera as defined in claim 4, further comprising:

an operable lock member, disposed on an outside of said camera body, and selectively set in locked and unlocked positions; and a lock mechanism for inhibiting said external selector from being operated when said operable lock member is set in said locked position.

6. A camera loaded with a roll photo film of a paper-backed type and a non-paper-backed type, said paper-backed type including a photo filmstrip, light-shielding backing paper overlaid on said photo filmstrip, and having a leader portion protruded from a front end of said photo filmstrip and a trailer portion protruded from a rear end of said photo filmstrip, and type information, prerecorded in a position between a front end of said leader portion and a first frame of said photo filmstrip to be set, for representing either of said paper-backed type and said non-paper-backed type, said paper-backed type being wound about a spool with said trailer portion wound inwards, and said non-paper-backed type including a photo filmstrip, a light-shielding leader portion connected to a front end of said photo filmstrip, a light-shielding trailer portion connected to a rear end of said photo filmstrip, and type information, prerecorded in a position between a front end of said leader portion and a first frame of said photo filmstrip to be set, for representing either of said paper-backed type and said non-paper-backed type, said non-paper-backed type being wound about a spool with said trailer portion wound inwards, said camera comprising:

a camera body, having a photo film supply chamber and a photo film take-up chamber, said photo film supply chamber being loaded with said roll photo film, said photo film take-up chamber adapted to winding of said roll photo film after being exposed;

an exposure aperture, disposed between said photo film supply chamber and said photo film take-up chamber, for exposing said roll photo film;

a pair of rails, disposed along respective two edges of said exposure aperture extending substantially horizontally, for contacting sides of an emulsion surface of said roll photo film;

a pressure plate for contacting a back of said roll photo film to position said roll photo film on a rear of said exposure aperture, said pressure plate being disposed behind said exposure aperture to define a photo film passageway between said pressure plate and said rails;

an information reader for reading said type information from said roll photo film while said roll photo film is transported;

moving means for moving at least one of said pressure plate and a set of said rails toward or away from a remaining one of said pressure plate and said set of said rails; and a controller for controlling said moving means in accordance with said type information read by said information reader, wherein said photo film passageway is set at a first space size when with said paper-backed type, and is set at a second space size when with said non-paper-backed type, said second space size being narrower than said first space size.

7. A camera as defined in claim 6, further comprising a space size detector for detecting a space size of said photo film passageway;

wherein said controller drives said moving means in accordance with said type information being read, and stops said moving means when said photo film passageway comes to have said first or second space size associated with said type information being read in accordance with a signal from said space size detector.

8. A camera as defined in claim 6, further comprising a rail member disposed behind said camera body, said rails being disposed on a rear of said rail member;

wherein said moving means moves said rail member toward or away from said pressure plate.

9. A camera as defined in claim 6, wherein said moving means moves said pressure plate toward or away from said rails.

10. A camera loadable with plural types of photo film, said plural types of photo film having at least first and second thicknesses, said camera comprising:

a lens optical system for forming an image of an object on said roll photo film;

a focussing mechanism for moving said lens optical system at least partially, to focus said lens optical system on said object;

an input unit for inputting information representing one of said plural types of photo film being loaded; and a controller for controlling said focussing mechanism in accordance with a signal from said input unit, to set said lens optical system in a first or second set position respectively in accordance with said first or second thickness, so as to sharpen said image of said object on said photo film of any of said plural types.

11. A camera as defined in claim 10, further comprising a rangefinding unit for measuring an object distance of said object;

wherein said controller obtains a set position of said lens optical system in accordance with said object distance measured by said rangefinding unit, compensates said set position in accordance with said first or second thickness respectively to obtain a first or second compensated set position, and sets said lens optical system in said first or second compensated set position.

12. A camera as defined in claim 11, wherein said lens optical system has a first focal surface when set in said first compensated set position, and has a second focal surface when set in said second compensated set position, said second thickness is smaller than said first thickness, and said second focal surface is located behind said first focal surface.

13. A camera as defined in claim 11, wherein said plural types include a paper-backed type and a non-paper-backed type;
 said paper-backed type includes a photo filmstrip, and light-shielding backing paper overlaid on said photo filmstrip, and having a leader portion protruded from a front end of said photo filmstrip and a trailer portion protruded from a rear end of said photo filmstrip, said paper-backed type being wound about a spool with said trailer portion wound inwards; and
 said non-paper-backed type includes a photo filmstrip, a light-shielding leader portion connected to a front end of said photo filmstrip, and a light-shielding trailer portion connected to a rear end of said photo filmstrip, said non-paper-backed type being wound about a spool with said trailer portion wound inwards.

14. A camera as defined in claim 13, further comprising:
 an exposure aperture, disposed behind said lens optical system, for exposing said photo film; and
 a pressure plate for contacting a back of said photo film to position said photo film on a rear of said exposure aperture, said pressure plate being disposed behind said exposure aperture in a stationary manner.

15. A camera as defined in claim 11, wherein said photo film further includes a bar code, prerecorded on a surface thereof, for representing photo film information including information of either of said paper-backed type and said non-paper-backed type;
 said input unit includes a bar code reader for reading said bar code to send a signal of said bar code to said controller, said set position of said lens optical system being compensated in accordance with said bar code.

16. A camera as defined in claim 15, wherein said photo film further comprises a connective tape for securing said backing paper or said leader portion to said photo filmstrip, said bar code being prerecorded on said connective tape.

17. A camera as defined in claim 15, wherein said bar code is prerecorded on said leader portion.

18. A camera as defined in claim 15, wherein said bar code is prerecorded on an end face of said spool.

19. A focussing method for a camera loadable with plural types of photo film, said plural types of photo film having at least first and second thicknesses, said focussing method comprising a step of:
 setting a lens optical system in a first or second set position respectively in accordance with said first or second thickness of one of said plural types of photo film being loaded, so as to sharpen an image of an object on said photo film of any of said plural types.

20. A focussing method as defined in claim 19, further comprising steps of:
 measuring an object distance of said object;
 obtaining a set position of said lens optical system in accordance with said object distance measured by said rangefinding unit; and
 compensating said set position in accordance with said first or second thickness respectively to obtain a first or second compensated set position, said lens optical system being in said first or second compensated set position.

21. A focussing method as defined in claim 20, wherein said lens optical system has a first focal surface when set in said first compensated set position, and has a second focal surface when set in said second compensated set position, said second thickness is smaller than said first thickness, and said second focal surface is located behind said first focal surface in said camera.

22. A focussing method as defined in claim 20, wherein said plural types include a paper-backed type and a non-paper-backed type;
 said paper-backed type includes a photo filmstrip, and light-shielding backing paper overlaid on said photo filmstrip, and having a leader portion protruded from a front end of said photo filmstrip and a trailer portion protruded from a rear end of said photo filmstrip, said paper-backed type being wound about a spool with said trailer portion wound inwards; and
 said non-paper-backed type includes a photo filmstrip, a light-shielding leader portion connected to a front end of said photo filmstrip, and a light-shielding trailer portion connected to a rear end of said photo filmstrip, said non-paper-backed type being wound about a spool with said trailer portion wound inwards.

23. A focussing method as defined in claim 22, wherein said camera includes:
 an exposure aperture, disposed behind said lens optical system, for exposing said photo film; and
 a pressure plate for contacting a back of said photo film to position said photo film on a rear of said exposure aperture, said pressure plate being disposed behind said exposure aperture in a stationary manner.

24. A focussing method as defined in claim 19, wherein said photo film further includes a bar code, prerecorded on a surface thereof, for representing photo film information including information of either of said paper-backed type and said non-paper-backed type;
 further comprising a step of reading said bar code to send a signal of said bar code to said controller, said set position of said lens optical system being compensated in accordance with said bar code.

25. A camera loadable with a roll photo film of a paper-backed type and a non-paper-backed type, said paper-backed type including a photo filmstrip, and light-shielding backing paper overlaid on said photo filmstrip, and having a leader portion protruded from a front end of said photo filmstrip and a trailer portion protruded from a rear end of said photo filmstrip, said paper-backed type being wound about a spool with said trailer portion wound inwards, and said non-paper-backed type including a photo filmstrip, a light-shielding leader portion connected to a front end of said photo filmstrip, and a light-shielding trailer portion connected to a rear end of said photo filmstrip, said non-paper-backed type being wound about a spool with said trailer portion wound inwards, said camera comprising:
 a camera body, having a photo film supply chamber and a photo film take-up chamber, said photo film supply chamber being loaded with said roll photo film, said photo film take-up chamber adapted to winding of said roll photo film after being exposed;
 an exposure aperture, disposed between said photo film supply chamber and said photo film take-up chamber, for exposing said roll photo film;
 a pair of rails, disposed along respective two edges of said exposure aperture extending substantially horizontally, for contacting sides of an emulsion surface of said roll photo film;
 a pressure plate for contacting a back of said roll photo film to position said roll photo film on a rear of said exposure aperture, said pressure plate being disposed behind said exposure aperture to define a photo film passageway between said pressure plate and said rails;
 an external selector, disposed on an outside of said camera body, for selecting one of said paper-backed type and said non-paper-backed type;

moving means, actuated by a shift of said external selector, for moving said pressure plate toward or away from a set of said rails, wherein said moving means sets said photo film passageway at a first space size when said paper-backed type is selected, and sets said photo film passageway at a second space size when said non-paper-backed type is selected, said second space size being narrower than said first space size;

a back lid, mounted behind said camera body in an openable manner, said pressure plate being mounted on said back lid;

a pair of plate contact projections, formed on said camera body, disposed in respective positions outside said rails with respect to said exposure aperture, oriented substantially in parallel with said rails, and protruded toward said pressure plate over said rails, wherein said moving means moves said pressure plate between front and rear positions, wherein said pressure plate contacts said plate contact projections when moved in said front position, to set said photo film passageway in said second space size, and comes away from said plate contact projections when moved in said rear position, to set said photo film passageway in said first space size;

wherein said moving means includes:

a pressure plate spring, disposed between said pressure plate and said back lid, for biasing said pressure plate toward said plate contact projections;

plural through holes formed in said pressure plate behind said plate contact projections;

plural push pins, inserted respectively in said through holes, and having a length greater than a thickness of said pressure plate; and a changeover mechanism, disposed behind said push pins, shifted between first and second positions by a shift of said external selector, for changing over operation of said pressure plate spring to said pressure plate;

wherein said changeover mechanism, when shifted in said first position, pushes a rear end of said push pins for sliding said push pins forwards with respect to said pressure plate, whereby bias of said pressure plate spring to said pressure plate is rendered ineffective, to cause said push pins to push said plate contact projections and to allow said pressure plate to move away from said plate contact projections;

wherein said changeover mechanism, when shifted in said second position, comes away from a rear end of said push pins for rendering effective said bias of said pressure plate spring to said pressure plate, to cause said pressure plate to contact said plate contact projections, whereby said push pins are slid backwards with respect to said pressure plate by said plate contact projections.

26. A camera as defined in claim 25, wherein said changeover mechanism includes:

a slider plate, disposed between said pressure plate spring and said pressure plate, slidable in a substantially horizontal direction between said first and second positions, and when in said first position, located behind said push pins, for pushing said push pins; and an inclined portion, disposed on said slider plate to extend in said substantially horizontal direction, inclined toward said back lid, located behind each of said push pins when said slider plate is in said second position, for allowing said push pins to slide backwards.

27. A camera as defined in claim 26, further comprising a plate support mechanism, disposed between said back lid and said pressure plate, for supporting said pressure plate in a movable manner with respect to said back lid.

28. A camera as defined in claim 27, wherein said plate support mechanism includes:

plural support pins secured to a rear surface of said pressure plate;

plural support plates, secured to a front surface of said back lid, and disposed respectively behind said support pins; and a support opening, formed through each of said support plates, for receiving insertion of each of said support pins in a slidable manner, to support said pressure plate on said back lid.

29. A camera loadable with a roll photo film of a paper-backed type and a non-paper-backed type, said paper-backed type including a photo filmstrip, and light-shielding backing paper overlaid on said photo filmstrip, and having a leader portion protruded from a front end of said photo filmstrip and a trailer portion protruded from a rear end of said photo filmstrip, said paper-backed type being wound about a spool with said trailer portion wound inwards, and said non-paper-backed type including a photo filmstrip, a light-shielding leader portion connected to a front end of said photo filmstrip, and a light-shielding trailer portion connected to a rear end of said photo filmstrip, said non-paper-backed type being wound about a spool with said trailer portion wound inwards, said camera comprising:

a camera body, having a photo film supply chamber and a photo film take-up chamber, said photo film supply chamber being loaded with said roll photo film, said photo film take-up chamber adapted to winding of said roll photo film after being exposed;

an exposure aperture, disposed between said photo film supply chamber and said photo film take-up chamber, for exposing said roll photo film;

a pair of rails, disposed along respective two edges of said exposure aperture extending substantially horizontally, for contacting sides of an emulsion surface of said roll photo film;

a pressure plate for contacting a back of said roll photo film to position said roll photo film on a rear of said exposure aperture, said pressure plate being disposed behind said exposure aperture to define a photo film passageway between said pressure plate and said rails;

an external selector, disposed on an outside of said camera body, for selecting one of said paper-backed type and said non-paper-backed type;

moving means, actuated by a shift of said external selector, for moving said pressure plate toward or away from a set of said rails, wherein said moving means sets said photo film passageway at a first space size when said paper-backed type is selected, and sets said photo film passageway at a second space size when said non-paper-backed type is selected, said second space size being narrower than said first space size;

a back lid, mounted behind said camera body in an openable manner, said pressure plate being mounted on said back lid;

a pair of plate contact projections, formed on said camera body, disposed in respective positions outside said rails with respect to said exposure aperture, oriented substantially in parallel with said rails, and protruded toward said pressure plate over said rails, wherein said moving means moves said pressure plate between front and rear positions, wherein said pressure plate contacts said plate contact projections when moved in said front position, to set said photo film passageway in said second space size, and comes away from said plate contact projections when moved in said rear position, to set said photo film passageway in said first space size;

wherein said moving means includes:
- a pressure plate spring, disposed between said pressure plate and said back lid, for biasing said pressure plate toward said plate contact projections;
- plural through holes, formed through a rear wall of said camera body, said rear wall having said plate contact projections;
- plural push pins, inserted respectively in said through holes, and slidable between protruded and retracted positions, wherein a rear end of said push pins, when slid in said protruded position, comes to a level behind said plate contact projections, to push said pressure plate backwards, and said rear end of said push pins, when slid in said retracted position, comes flush with, or to a level in front of, said plate contact projections, to allow said pressure plate spring to push said pressure plate to said front position; and
- a pin slider for sliding said push pins in response to a shift of said external selector.

30. A camera as defined in claim 29, wherein said pin slider includes:
- at least one slider plate, disposed in front of said rear wall of said camera body, and slid in a substantially horizontal direction between first and second lateral positions by a shift of said external selector; and
- an inclined portion, disposed on said slider plate to extend in said substantially horizontal direction, inclined toward said back lid, and when slid in said first lateral position, located away from a front of each of said push pins, for allowing said push pins to slide to said retracted position, and when slid in said second lateral position, located in front of each of said push pins, for sliding said push pins to said protruded position.

31. A camera as defined in claim 29, wherein said pin slider includes:
- a solenoid, having a plunger shiftable between first and second conditions locally;
- a transmission mechanism, coupled to said plunger of said solenoid, for driving said push pins in response to a shift of said solenoid; and
- a controller for controlling said solenoid according to a shift of said external selector, wherein said controller, while said paper-backed type is set at said external selector, shifts said solenoid to said first condition to cause said transmission mechanism to set said push pins in said protruded position, and while said non-paper-backed type is set at said external selector, shifts said solenoid to said second condition to cause said transmission mechanism to set said push pins in said retracted position.

32. A camera as defined in claim 31, further comprising:
a power switch, disposed on said camera body, externally operable, for supply power when turned on;

a lens optical system for forming an image of an object on said roll photo film at said exposure aperture;

a movable lens barrel for supporting said lens optical system therein, said movable lens barrel being movable on a photographic optical axis between collapsed and advanced positions, and when in said collapsed position, contained in said camera body, and when in said advanced position, protruded forwards from said camera body; and a lens moving mechanism, controlled by said controller, for moving said movable lens barrel between said collapsed and advanced positions, wherein said movable lens barrel, while said power switch remains turned off, is in said collapsed position, for causing a rear end there to push said transmission mechanism, to keep said push pins in said retracted position.

33. A camera as defined in claim 29, wherein said pin slider includes:
- a motor;
- a first transmission mechanism for moving said push pins when said motor rotates; and
- a controller for controlling said motor according to a shift of said external selector, wherein said controller, while said paper-backed type is set at said external selector, rotates said motor to a first rotational position to cause said first transmission mechanism to set said push pins in said protruded position, and while said non-paper-backed type is set at said external selector, rotates said motor to a second rotational position to cause said first transmission mechanism to set said push pins in said retracted position.

34. A camera as defined in claim 33, further comprising:
- a take-up spool located in said photo film take-up chamber, said leader portion being retained on said take-up spool, for winding said roll photo film thereabout when rotated;
- a spool drive shaft for rotating said take-up spool;
- a second transmission mechanism for transmitting rotation of said motor to said spool drive shaft;

wherein said pin slider further includes a planetary gear mechanism for transmitting rotation of said motor selectively to said first and second transmission mechanisms, wherein said planetary gear mechanism, when said motor rotates in a first direction, couples said motor to said first transmission mechanism, and when said motor rotates in a second direction, couples said motor to said second transmission mechanism.

35. A camera as defined in claim 34, wherein said pin slider further includes a position detector for detecting a position of said push pins;

wherein said controller, while said motor is driven, evaluates said position of said push pins in accordance with a signal from said position detector, and when said push pins are moved to said either protruded or retracted position associated with said shift of said external selector, stops said motor.

* * * * *